United States Patent
Fugino et al.

(10) Patent No.: US 6,339,592 B2
(45) Date of Patent: *Jan. 15, 2002

(54) APPARATUS AND METHOD OF CONNECTING COMPUTER NETWORK TO TELEPHONE

(75) Inventors: Nobutsugu Fugino; Takashi Nishigaya; Tamio Saito; Ichiro Iida, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,356

(22) Filed: Oct. 31, 1997

(30) Foreign Application Priority Data

Dec. 11, 1996 (JP) ............................. 8-330574

(51) Int. Cl.⁷ ............................... H04L 12/66
(52) U.S. Cl. ....................... 370/352; 370/401
(58) Field of Search ................ 370/352, 354–356, 370/400, 401; 379/349, 389, 215

(56) References Cited

U.S. PATENT DOCUMENTS

| 5,726,984 A | * | 3/1998 | Kubler et al. ............... 370/349 |
| 5,809,128 A | * | 9/1998 | McMullin ................... 379/215 |
| 5,818,836 A | * | 10/1998 | DuVal ......................... 370/389 |
| 5,867,495 A | * | 2/1999 | Elloitt et al. ................ 370/352 |

* cited by examiner

*Primary Examiner*—Hassan Kizou
*Assistant Examiner*—John Pezzlo
(74) *Attorney, Agent, or Firm*—Staas & Halsey LLP

(57) ABSTRACT

When a source subscriber activates a voice communications unit of a computer, an agent process unit in a computer center receives a data stream transmitted from a voice communications unit. The agent process unit activates a voice communications unit capable of communicating with the voice communications unit, and transfers the data stream from the voice communications unit to the voice communications unit. A network control unit transmits a telephone number stored in a telephone number storage unit. Thus, communications can be established between the computer and a telephone terminal.

26 Claims, 49 Drawing Sheets

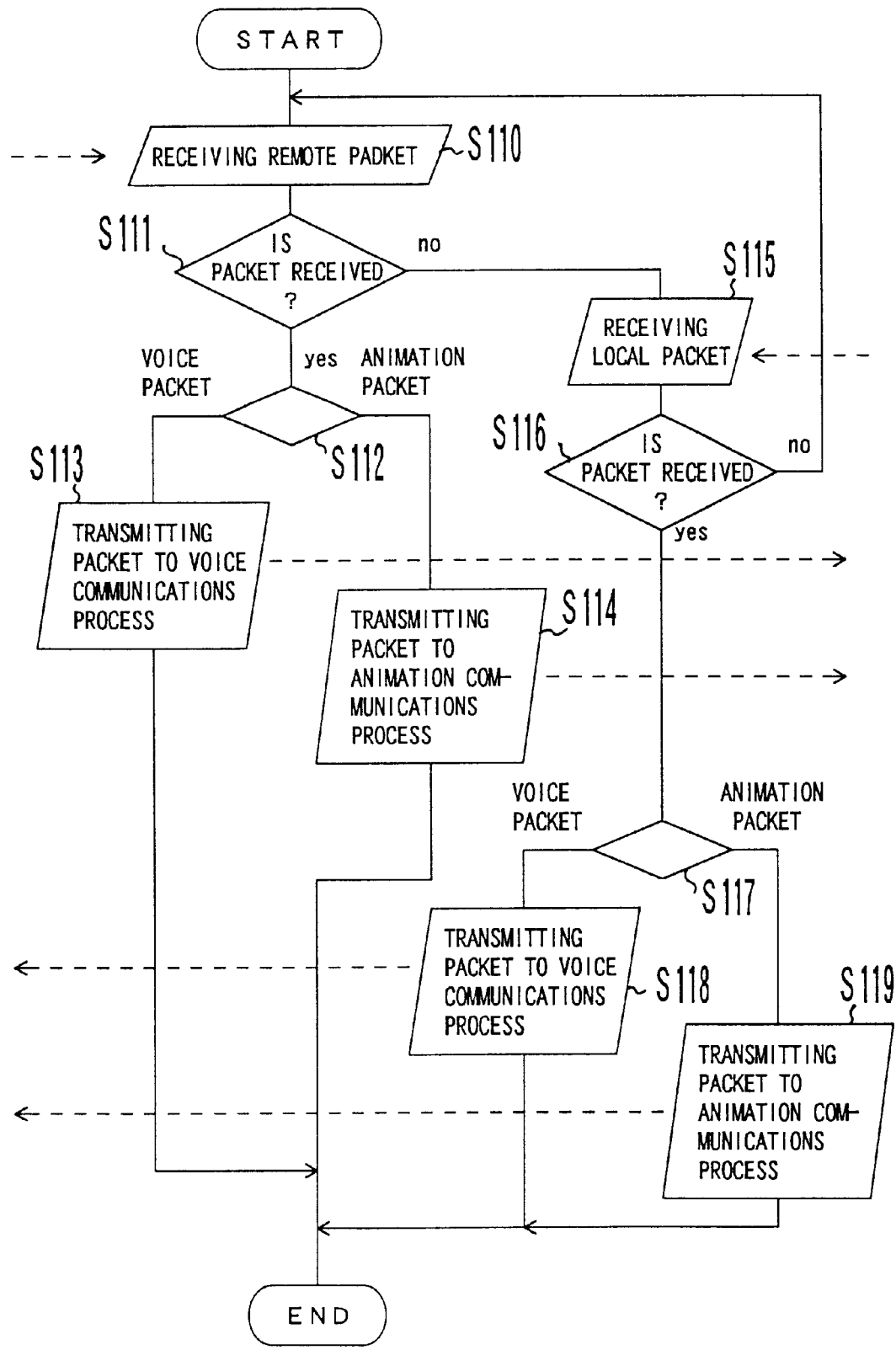
F I G. 17

| ENTRY NUMBER | ENTERED TELEPHONE NUMBER | CENTER ADDRESS |
|---|---|---|
| 01 | 044-111-2222 | 123.456.78.01 |
| 02 | 045-222-3333 | 123.456.78.02 |
| 03 | 03-3333-4444 | 123.456.78.03 |
| ... | ... | ... |

FIG. 33

| STATION NUMBER | CENTER ADDRESS |
|---|---|
| 03 | 123.456.78.03 |
| 044 | 123.456.78.01 |
| 045 | 123.456.78.02 |
| ... | ... |

FIG. 34

APPARATUS AND METHOD OF CONNECTING COMPUTER NETWORK TO TELEPHONE

BACKGROUND OF THE INVENTION

1. Field of the Invention

The present invention relates to a method, connection device, transmission device, and telephone terminal for connecting a computer network to a telephone, and more specifically to a method and apparatus for connecting a voice communications system used in a computer network to a telephone connected to a public telephone network, etc.

2. Description of the Related Art

Conventionally, a voice communications system is used between computers having the function of setting voice communications in a voice communications process using an Internet phone in the Internet.

FIG. 1 shows the first conventional technology.

Conventionally, as in the example shown in FIG. 1, voice communications are established from a computer 300 connected to a computer network 2 comprising an optical fiber, an Ethernet cable, etc. to another computer 300' dial-up-IP-connected to a telephone network 4 through a modem 304 using voice communications processes 302 and 302' such as an Internet phone, etc. Voice/data conversion units 301 and 301' convert a voice signal received through a microphone into voice data and output the data, or receive digitized voice data, convert it into a voice signal, and output the signal to a speaker, etc.

However, in the dial-up-IP connection commonly used by individual users, a line between the user and the Internet is originally optimized for voice communications. Nevertheless, as shown in FIG. 1, modulated, demodulated, or coded non-voice data are transmitted through the line. Additionally, coded voice signals are transmitted through the same line. As a result, there arises the problem that this method is inferior in transmission efficiency and quality to the method of exclusively transmitting voice signals as in the common telephone systems.

When a wireless circuit of, for example, a portable telephone, etc. is used, frequency (line) resources are limited, thereby wasting line resources and deteriorating transmission quality. This holds true with a telephone network using a digital method as well as using an analog method.

To solve the above described problem, a conversion unit for converting voice data and voice signals is provided between a computer network and a user telephone line so that the voice data transmitted through the computer network can be converted into voice signals before arriving at the telephone line. It is assumed that the Net2Phone disclosed by the IDT (International Discount Telecommunication Co.) corresponds to this system.

FIG. 2 shows the second conventional technology. In the example shown in FIG. 2, a gateway unit 305 for converting a voice data packet into a voice signal for use in the telephone network 4 is provided in the computer network 2 (for example, the Internet) to transmit a signal to an existing telephone network 4. The gateway unit 305 comprises the voice communications process 302' corresponding to the voice communications process 302 of the computer 300, the voice/data conversion unit 301', and a network control unit (NCU) 306.

However, in this method, it is necessary to newly provide an exclusive voice communications process or improve an existing voice communications process to transmit a signal to a telephone line.

The voice communications process should be improved for each voice communications process. However, it is not economical to improve all voice communications processes now in the market.

SUMMARY OF THE INVENTION

The present invention aims at solving the problem that the transmission efficiency and quality are reduced when voice communications are sent through a communications network, and at allowing a telephone call to be issued from the computer network through a public telephone network, etc. using an existing voice communications process.

The system of transmitting a telephone call from a computer network according to the first aspect of the present invention includes a computer center having one or more first computers capable of setting voice communications and one or more second computers connected to the first computers through the computer network, and one or more telephone terminals connected to the computer center through a telephone network. The first computer includes a first voice communications unit for use between computers and a first voice/data conversion unit functionally connected to the first voice communications unit. The computer center includes one or more second voice/data conversion units, a network control unit connected to the second voice/data conversion unit, an agent process unit, and a telephone number storage unit functionally connected to the agent process unit. When the first voice communications unit is activated in the first computer, the data stream transmitted from the first voice communications unit is received by the agent process unit of the computer center. The agent process unit activates the second voice communications unit, transfers the data stream to the activated second voice communications unit, and sends it to the telephone number stored in the telephone number storage unit by the network control unit, thereby establishing communications between the first computer and the telephone terminal.

The system of transmitting a telephone call from a computer network according to the second aspect of the present invention includes a computer center having one or more first computers capable of setting voice communications and one or more second computers connected to the first computers through the computer network, and one or more telephone terminals connected to the computer center through a telephone network. The first computer includes a first voice communications unit for use between computer networks, a first voice/data conversion unit functionally connected to the first voice communications unit, and a first agent process unit. The computer center includes one or more second voice communications units, a second voice/data conversion unit functionally connected to the second voice communications unit, a network control unit connected to the second voice/data conversion unit, a second agent process unit, and a telephone number storage unit functionally connected to the second agent process unit. When the first agent process unit is activated in the first computer, the first agent process unit communicates with the second agent process unit and activates the first voice communications unit in such a way that the first voice communications unit communicates with the second voice communications unit. The second agent process unit activates the second voice communications unit, and transmits a signal to a telephone number stored in the telephone number storage unit through the network control unit to establish communications between the first computer and the telephone terminal.

The system of transmitting a telephone call from a computer network according to the third aspect of the present invention includes a computer center having one or more first computers capable of setting voice communications and one or more second computers connected to the first computers through the computer network, and one or more telephone terminals connected to the computer center through a telephone network. The first computer includes a first voice communications unit for use between computer networks, a first voice/data conversion unit functionally connected to the first voice communications unit, and a browser unit. The computer center includes one or more second voice communications units, a second voice/data conversion unit functionally connected to the second voice communications unit, a network control unit connected to the second voice/data conversion unit, a second agent process unit, a server unit, and a telephone number storage unit. When the server unit is accessed by the browser unit in the first computer and a specific instruction is issued, the first agent process unit is transmitted from the server unit to the browser unit. The first agent process unit is activated in the first computer, the server unit activates the second agent process unit in the computer center, and the first agent process unit activates the first voice communications unit in a way that the first voice communications unit can communicate with the second voice communications unit. The second agent process unit activates the second voice communications unit, and transmits a signal to the telephone number stored in the telephone number storage unit, thereby establishing communications between the first computer and the telephone terminal.

The system of transmitting a telephone call from a computer network according to the fourth aspect of the present invention includes a computer center having one or more first computers capable of setting voice communications and one or more second computers connected to the first computers through the computer network, and one or more telephone terminals connected to the computer center through a telephone network. The first computer includes a first voice communications unit for use between computer networks, and a first voice/data conversion unit functionally connected to the first voice communications unit. The computer center includes one or more second voice communications units, a second voice/data conversion unit functionally connected to the second voice communications unit, a first network control unit connected to the second voice/data conversion unit, an agent process unit, a server unit, a telephone number storage unit, and a first data communications interface unit. The telephone terminal includes a second network control unit, a second data communications interface unit, a voice communications interface unit, and a second browser unit. When the second browser unit of the telephone terminal accesses the server unit through the data communications interface unit of the computer center and issues a specific instruction, the computer center activates the agent process unit. The activated agent process unit activates the second voice communications unit in a way that the second voice communications unit can communicate with the first voice communications unit in the first computer connected to the computer network, disconnects the communications with the telephone terminal, switches the connection of the first network control unit from the first data communications interface unit to the first voice/data conversion unit, and transmits a signal to the telephone terminal. The telephone terminal disconnects the communications with the computer center, switches the connection to the second network control unit 34 from the second data communications interface unit to the voice communications interface unit to enter a call waiting state and answer the call from the telephone network, thereby establishing communications between the first computer and the telephone terminal.

The system of transmitting a telephone call from a computer network according to the fifth aspect of the present invention includes a computer center having one or more first computers capable of setting voice communications and one or more second computers connected to the first computers through the computer network, and one or more telephone terminals connected to the computer center through a telephone network. The first computer includes a first voice/data conversion unit and a browser unit. The computer center includes one or more second voice communications units for use between computer networks, a second voice/data conversion unit functionally connected to the second voice communications unit, a network control unit connected to the second voice/data conversion unit, a server unit, and a telephone number storage unit. When the server unit is accessed by the browser unit in the first computer and a specific instruction is issued, the first voice communications unit is transmitted to the first computer by the server unit. The first voice communications unit is activated in the first computer in a way that the first voice communications unit can communicate with the second voice communications unit. The second voice communications unit is activated in the first computer in a way that the second voice communications unit can communicate with the first voice communications unit. The network control unit transmits a signal to the telephone number stored in the telephone number storage unit, thereby establishing the communications between the first computer and the telephone terminal.

The connection unit between the computer network and the telephone according to the first aspect of the present invention is a connection unit which has one or more computers connected to the computer network and the telephone network and connects the computer network with the telephone terminal. The connection unit includes a voice communications unit for establishing voice communications between computer networks; a voice/data conversion unit, functionally connected to the voice communications unit, for converting voice data into a voice signal or vice versa; a telephone number storage unit for storing a destination telephone number; and an agent process unit for transferring to the voice communications unit a data stream transmitted from another computer connected to the computer network, and instructing the network control unit to transmit a signal to the telephone number stored in the telephone number storage unit.

The connection unit between the computer network and the telephone according to the second aspect of the present invention is a connection unit which has one or more computers connected to the computer network and the telephone network and connects the computer network with the telephone terminal. The connection unit includes a voice communications unit for establishing voice communications between computer networks; a voice/data conversion unit, functionally connected to the voice communications unit, for converting voice data into a voice signal or vice versa; a telephone number storage unit for storing a destination telephone number; a network control unit for issuing, connecting, and disconnecting a call to a telephone network; an agent process unit for communicating with another agent process unit in another computer connected to the computer network, activating the voice communications unit upon receipt of a voice communications connection request, and instructing the network control unit to transmit a signal to the telephone number stored in the telephone number storage unit.

The connection unit between the computer network and the telephone according to the third aspect of the present invention is a connection unit which has one or more computers connected to the computer network and the telephone network and connects the computer network with the telephone terminal. The connection unit includes a voice communications unit for establishing voice communications between computer networks; a voice/data conversion unit, functionally connected to the voice communications unit, for converting voice data into a voice signal or vice versa; a telephone number storage unit for storing a destination telephone number; a server unit for transmitting an agent process unit for operating in another computer, which has issued an instruction, when the server unit receives a specific instruction from browser unit in the other computer connected to the computer network; and an agent process unit for communicating with the agent process unit transmitted to the other computer, activating the voice communications unit upon receipt of a voice communications connection request, and instructing the network control unit to transmit a signal to the telephone number stored in the telephone number storage unit.

The connection unit between the computer network and the telephone according to the fourth aspect of the present invention is a connection unit which has one or more computers connected to the computer network and the telephone network and connects the computer network with the telephone terminal. The connection unit includes a network control unit for issuing, connecting, and disconnecting a call to a telephone network; a data communications interface unit for receiving data or a specific instruction transferred from a telephone terminal capable of establishing data communications through the network control unit; a voice communications unit for establishing voice communications between computer networks; a voice/data conversion unit, functionally connected to the voice communications unit, for converting a voice data into a voice signal or vice versa; a telephone number storage unit for storing a destination telephone number; an agent process unit for activating the voice communications unit in a way that it can communicate with another computer connected through a computer network, disconnecting the communications with the telephone terminal which has issued the specific instruction, switching the connection to the network control unit from the data communications interface unit to the voice/data conversion unit, and instructing the network control unit to transmit a signal to the telephone terminal; and a server unit for activating the agent process unit at the specific instruction from the data communications interface unit.

The transmission unit for issuing a call from the computer network to the telephone according to the first aspect of the present invention is a transmission unit, for transmission from the computer network to a telephone terminal, having one or more computers connected to a computer center through a computer network. The transmission unit includes a voice communications unit for establishing voice communications between computer networks; a voice/data conversion unit, functionally connected to the voice communications unit, for converting voice data into a voice signal or vice versa; and an agent process unit for communicating with a corresponding agent process unit in the computer center and activating the voice communications unit.

The transmission unit for issuing a call from the computer network to the telephone according to the second aspect of the present invention is a transmission unit, for transmission from the computer network to a telephone terminal, having one or more computers connected to a computer center through a computer network. The transmission unit includes a browser unit for communicating with a corresponding server unit of the computer center and issuing a specific instruction; a voice communications unit for establishing voice communications between computer networks activated by an agent process unit from the computer center at the specific instruction; and a voice/data conversion unit, functionally connected to the voice communications unit, for converting a voice data into a voice signal or vice versa.

The telephone terminal according to the present invention is a telephone terminal for communicating with a computer connected to a computer network through a computer center connected to a telephone network and the computer network. The telephone terminal includes a data communications interface unit; a voice communications interface unit; a browser unit for accessing a server unit in the computer center through the data communications interface unit and issuing a specific instruction; and a network control unit for disconnecting the communications with the computer center after issuing the specific instruction, switching the connection from the data communications interface unit to the voice communications interface unit to enter a call waiting state, and answering the call arriving from the telephone network According to the present invention described above, the connections of the network control unit of the computer center to the network control unit of the telephone terminal are switched from respective data communications interface units to the voice/data conversion units or the voice communications interface units. Thus, a telephone call is connected from the computer to the telephone terminal, thereby establishing the voice communications.

After terminating the voice communications, the connections of the network control units in the computer center and the telephone terminal are switched back to respective data communications interfaces, thereby permitting the data communications through an issue or response from the computer center or the telephone terminal and continuing the data communications.

BRIEF DESCRIPTION OF THE DRAWINGS

FIG. 17 is a flowchart showing the process of transmitting and receiving a packet shown in FIG. 16;

FIG. 33 shows an example of the configuration of the database of the telephone numbers according to an embodiment of the tenth aspect of the present invention;

FIG. 34 shows another example of the configuration of the database of the telephone numbers according to an embodiment of the tenth aspect of the present invention;

DESCRIPTION OF THE PREFERRED EMBODIMENTS

Figure 1:
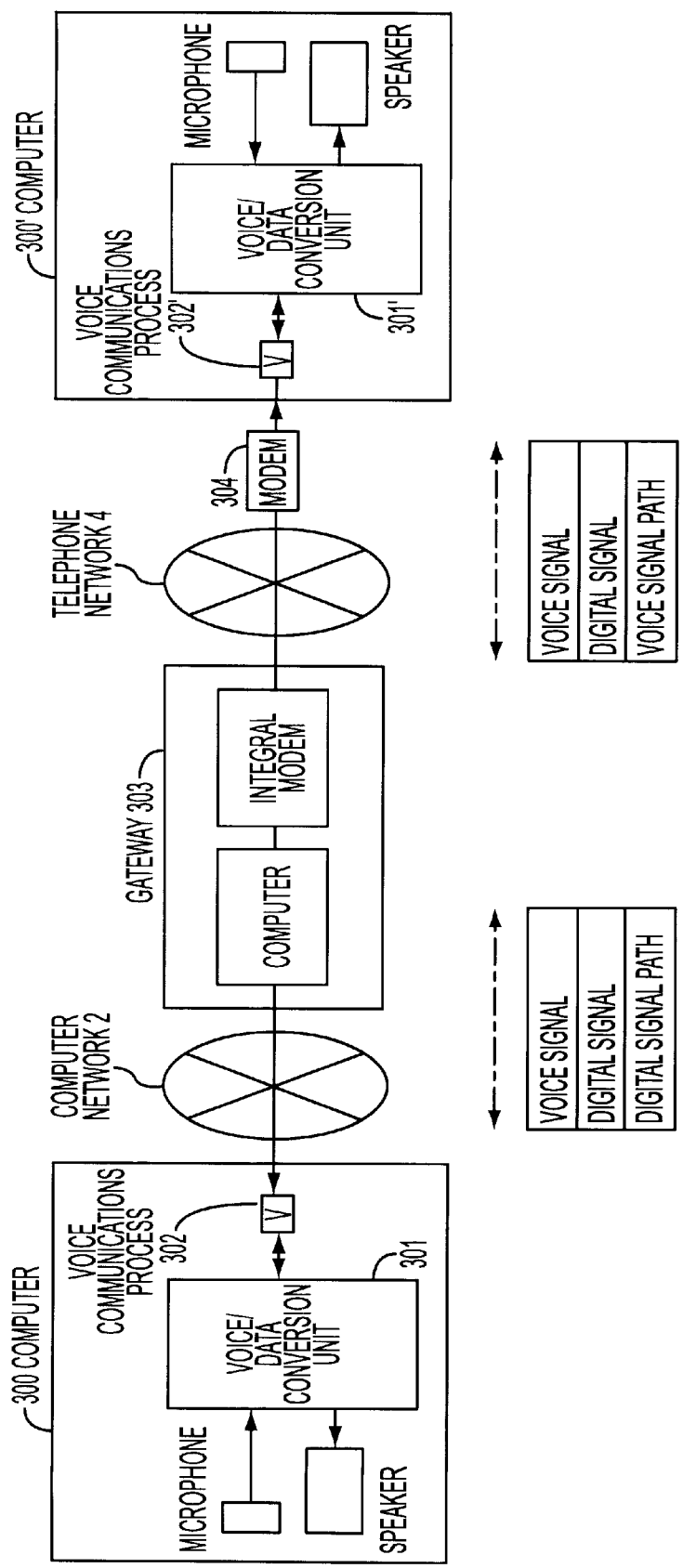
FIGS. 1 and 2 show the prior art.
Figure 2:
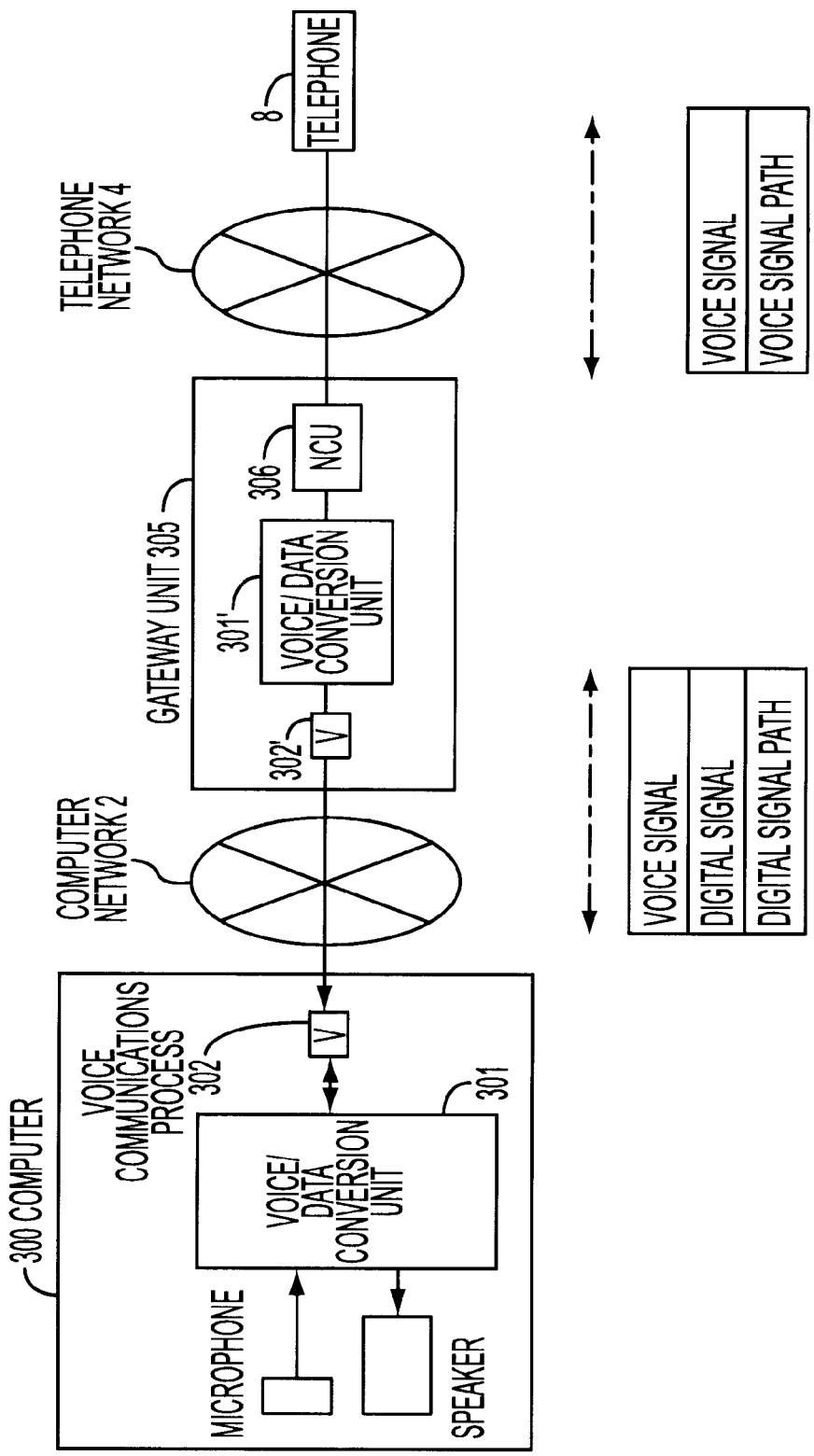
Figure 3:
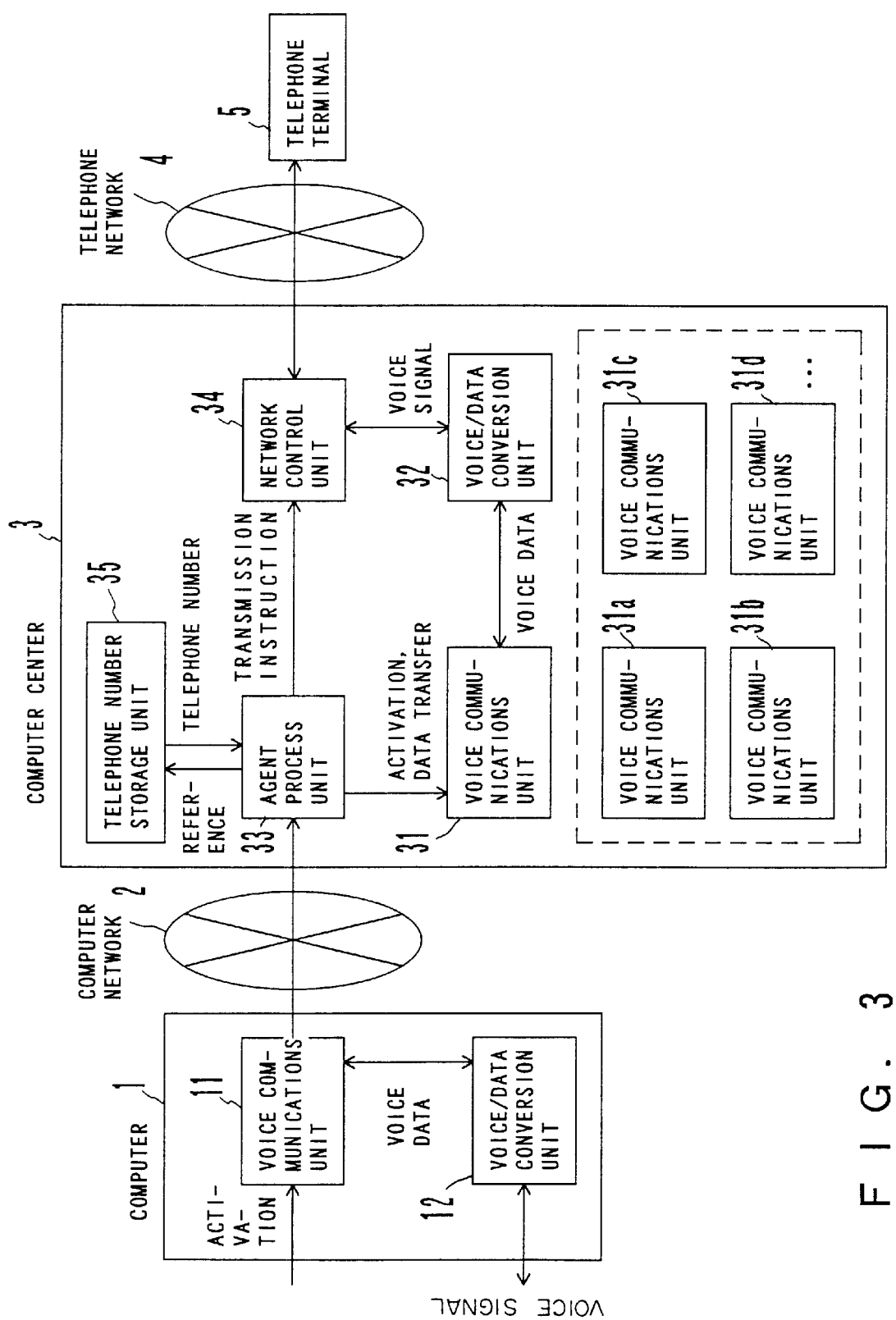
FIG. 3 shows the outline of the present invention.

FIG. 3 shows the outline of the present invention.

In FIG. 3, 1 is a computer, 2 is a computer network, 3 is a computer center, 4 is a telephone network, and 5 is a telephone terminal. The computer 1 comprises a voice communications unit 11 and a voice/data conversion unit 12. The computer center 3 comprises one or more voice communications units 31, a voice/data conversion unit 32, an agent process unit 33, a network control unit 34, and a telephone number storage unit 35.

The voice communications units 11 and 31 are processes of mutually establishing voice communications between computer networks.

The voice/data conversion units 12 and 32 are functionally connected to the voice communications units 11 and 31 respectively to convert voice data into a voice signal and vice versa.

The agent process unit 33 activates the voice communications unit 31, receives a data stream transmitted from the voice communications unit 11 when the source subscriber activates the voice communications unit 11 in the computer 1, and transmits the data stream to the voice communications unit 31. In the descriptions below, an agent process unit or an agent is an autonomously operating process (program or software) and comprises an interface for communicating with another process.

The telephone number storage unit 35 is functionally connected to the agent process unit 33 and stores the telephone number of the telephone terminal 5.

The network control unit 34 transmits a signal to the telephone number stored in the telephone number storage unit 35 at an instruction from the agent process unit 33 to transmit a signal, and controls the communications with the telephone terminal 5 through the telephone network 4. Here, transmitting a signal to the telephone number indicates transmitting a signal to the telephone terminal specified by the telephone number.

The first aspect of the present invention is realized by the computer 1 of a source subscriber and the computer center 3 for connecting the computer 1 to the telephone terminal 5.

The computer 1 comprises the voice communications unit 11 and the voice/data conversion unit 12 functionally connected to the voice communications unit 11. The computer center 3 comprises the agent process unit 33, the voice communications unit 31, the voice/data conversion unit 32 functionally connected to the voice communications unit 31, the network control unit 34 connected to the voice/data conversion unit 32, and the telephone number storage unit 35 functionally connected to the agent process unit 33.

When a source subscriber activates the voice communications unit 11, the agent process unit 33 receives a data stream transmitted from the voice communications unit 11. The agent process unit 33 activates the voice communications unit 31 and transmits the received data stream to the voice communications unit 31. The network control unit 34 transmits a signal to the telephone number stored in the telephone number storage unit 35. Thus, the computer 1 can communicate with the telephone terminal 5.

The voice data packet is converted back to a voice signal by the voice/data conversion unit 32 and transferred to the network control unit 34, and then transmitted through the telephone network 4 by the network control unit 34.

According to the first aspect of the present invention, the data stream from the voice communications unit 11 of the computer 1 on the source subscriber side is received by the agent process unit 33 of the computer center 3 on the destination subscriber side. Therefore, the data format and the protocol should be compatible with those of the voice communications unit 11 of the computer 1. Accordingly, the system cannot be flexibly extended, and it is not economical to improve various voice communications processes now in the market.

The second aspect of the present invention aims at solving the above described problem, and isolating the communications between agents from the communications between voice communications processes, improving the flexibility in the communications between a source subscriber and a destination subscriber, and easily improving various voice communications processes by providing agents on both of the source and destination subscriber sides.

Therefore, according to the second aspect of the present invention, the computer 1 on the source subscriber side comprises the voice communications unit 11; the voice/data conversion unit 12 functionally connected to the voice communications unit 11; and the agent process unit (not shown in the attached drawings) for communicating with the agent process unit 33 of the computer center 3.

When a source subscriber activates the first agent process unit of the computer 1, the first agent process unit communicates with the agent process unit 33 of the computer center 3. The first agent process unit activates the voice communications unit 11 in such a way that the voice communications unit 11 can communicate with the voice communications unit 31 of the computer center 3. In the computer center 3, the agent process unit 33 activates the voice communications unit 31 and transmits a signal to the telephone number stored in the telephone number storage unit 35 through the network control unit 34.

The voice data packet is converted back to a voice signal by the voice/data conversion unit 32, transferred to the network control unit 34, and transmitted through the telephone network 4 by the network control unit 34.

According to the second aspect of the present invention, the computer 1 on the source subscriber side should be preliminarily provided with the first agent process unit. Accordingly, there is the problem that the present invention cannot be applied to a computer without this agent process unit.

The third aspect of the present invention aims at solving the above described problem and allowing a computer not originally provided with an agent process unit to communicate with the telephone terminal 5.

According to the third aspect of the present invention, the computer 1 on the source subscriber side comprises the voice communications unit 11 for communication through computer networks; the voice/data conversion unit 12 functionally connected to the voice communications unit 11; and a WWW (World Wide Web) browser (not shown in the attached drawings). The computer center 3 comprises one or more voice communications units 31 for communication through computer networks; the voice/data conversion unit 32 functionally connected to the voice communications unit 31; the network control unit 34 connected to the voice/data conversion unit 32; and a WWW server (not shown in the attached drawings).

When a source subscriber accesses the WWW server in the computer center 3 through the WWW browser of the computer 1 and issues a specific instruction, the first agent process unit is transmitted from the WWW server to the WWW browser and activated in the computer 1, and the WWW server activates the agent process unit 33 in the computer center 3. In the computer 1, the first agent process unit 33 activates the voice communications unit 11 in such a way that the voice communications unit 11 can communicate with the voice communications unit 31. The agent process unit 33 in the computer center 3 activates the voice communications unit 31, and transmits a signal through the network control unit 34 to the telephone number stored in the telephone number storage unit 35.

The voice data packet is converted back to a voice signal by the voice/data conversion unit 32, transferred to the network control unit 34, and transmitted through the telephone network 4 through the network control unit 34.

According to the first through the third aspects of the present invention, the telephone number of a destination telephone terminal 5 is specified, and therefore it is difficult to perform a flexible operation in selecting a destination terminal. The invention according to the fourth aspect has been developed to solve the problem and preliminarily rewrite the telephone number.

The fourth aspect of the present invention further comprises a telephone number writing unit (not shown in the attached drawings) for writing a destination telephone number to the telephone number storage unit 35 in the computer center 3 to preliminarily write a destination telephone number to the telephone number storage unit 35 at an instruction from a source or a destination subscriber.

Since a destination telephone number can be written to the telephone number storage unit 35 according to this aspect of the present invention before transmitting a signal, the destination can be optionally altered.

Since a destination telephone number should be preliminarily written when the source subscriber specifies the number according to the fourth aspect of the present invention, it is very inconvenient for a user. The fifth aspect of the present invention has been developed to solve the above described problem and specify a telephone number online.

Therefore, the computer center 3 according to the fifth aspect of the present invention comprises a telephone number writing unit (not shown in the attached drawings) for writing a destination telephone number to the telephone number storage unit 35 online, and preliminarily writes the destination telephone number to the telephone number storage unit 35 by the telephone number writing unit at an online instruction from the source subscriber.

Since a destination telephone number can be written online from the computer 1 to the telephone number storage unit 35 when a signal is to be transmitted according to this aspect of the present invention, the destination can be easily specified as necessary.

According to the fifth aspect of the present invention, it is often inconvenient for a user to individually input telephone numbers. Therefore, the sixth aspect of the present invention has been developed to solve the above described problem, and the source subscriber can specify a specific character string indicating a destination subscriber instead of a telephone number.

Therefore, the sixth aspect of the present invention comprises in the telephone number storage unit 35 a storage unit for storing a character string indicating a destination subscriber, and a storage unit for storing the telephone number of the destination subscriber corresponding to the character string. When the source subscriber online inputs a character string indicating the destination subscriber, the agent process unit 33 refers to the telephone number storage unit 35 when a telephone call is issued, converts the specified character string into a destination telephone number, and transmits a signal to the telephone number.

According to this aspect of the present invention, a signal can be transmitted to the corresponding telephone terminal 5 without specifying the telephone number by online inputting a character string such as a destination subscriber name, etc.

Since a telephone number should be input through a computer according to the fourth aspect of the present invention, there is the problem that the telephone number cannot be specified without a computer.

The seventh aspect of the present invention aims at solving the above described problem and specifying the telephone number through the telephone terminal 5.

According to the seventh aspect of the present invention, the computer center 3 comprises a telephone number receiving unit (not shown in the attached drawings) for receiving from the network control unit 34 a telephone number to be stored in the telephone number storage unit 35, and the agent process unit 33 writes in advance to the telephone number storage unit 35 the telephone number received by the network control unit 34 and then by the telephone number receiving unit.

According to this aspect of the present invention, when a telephone call is received by the network control unit 34, the telephone number is received by the telephone number receiving unit and the agent process unit 33 writes the telephone number to the telephone number storage unit 35. Thus, the telephone number from the telephone terminal 5 of the destination subscriber can be specified.

The eighth aspect of the present invention aims at providing a method of automatically setting a destination subscriber without inputting the destination by the source or destination subscriber.

According to the eighth aspect of the present invention, the computer center 3 monitors the location of the user (destination subscriber) using another agent process unit (not shown in the attached drawings) for monitoring the position of the destination subscriber, and writes to the telephone number storage unit 35 the telephone number of the destination subscriber at the monitored location.

According to this aspect of the present invention, when the destination subscriber moves his or her location, another agent process unit for monitoring the location of a user detects the location of the destination subscriber and writes the telephone number of the location to the telephone number storage unit 35. Therefore, the destination can be automatically set.

According to the eighth aspect of the present invention, there is the problem that a call is issued to the telephone terminal 5 even if the destination subscriber is headed for the computer connected to a computer network.

The ninth aspect of the present invention aims at providing a method of receiving a call by a computer when the destination subscriber is headed for the computer (not shown in the attached drawings) connected to a computer network.

Therefore, according to the ninth aspect of the present invention, when the destination subscriber uses a computer connected to a computer network, the agent process unit 33 writes to the telephone number storage unit 35 an address or information such as an identifier, etc. indicating the computer being used by the destination subscriber. In this case, a call is not issued to the telephone terminal 5, but a packet from the first voice communications unit is transferred to the voice communications unit of the computer of the destination subscriber, or the first agent process unit activates the first voice communications unit in such a way that the first voice communications unit can communicate with the voice communications unit of the destination subscriber. Thus, communications can be established between computers.

According to this aspect of the present invention, when a destination subscriber is headed for a computer, communications are established not between the computer 1 on the source subscriber side and the telephone terminal 5 but between the computer 1 and the computer being used by the destination subscriber.

According to the ninth aspect of the present invention, when the area to which the computer center 3 belongs is physically apart from the area to which the destination telephone number belongs, there is the problem that the fee for the use of the telephone network 4 becomes high.

The tenth aspect of the present invention aims at solving the above described problem and providing a connection method for a lower fee for the use of a public telephone network.

Therefore, according to the tenth aspect of the present invention, when two or more computer centers 3 are connected to the computer network 2, the agent process unit 33 of the first computer center 3 refers to the telephone number storage unit 35 when a connection request is received from a source subscriber, and checks whether or not another second computer (not shown in the attached drawings) physically close to the area, to which the telephone number of the destination subscriber belongs, exists. If it exists, the packet from the source subscriber is transferred to the computer center, and the voice communications unit 11 of the computer 1 is connected to the voice communications unit in the other second computer center.

According to this aspect of the present invention, when the agent process unit 33 of a single computer center 3 receives a connection request from a source subscriber, it checks the telephone number storage unit 35, and transfers the packet to another computer center physically close to the area to which the telephone number belongs. If the computer center 3 is physically close to the area to which the telephone number belongs, the computer center 3 activates the voice communications unit 31 and connects the voice communications unit 31 to the voice communications unit 11 of the computer 1. As a result, the fee, which is variable depending on the distance between communicators, for the use of the public telephone network, etc. can be reduced.

According to the first through tenth aspects of the present invention, there is the problem that no calls can be issued from a telephone. The eleventh aspect of the present invention aims at solving this problem and providing a practical method of issuing a call from a telephone.

Therefore, the computer center 3 comprises the first data communications interface (not shown in the attached drawings), and the telephone terminal 5 comprises a second network control unit (not shown in the attached drawings), a second data communications interface (not shown in the attached drawings), a voice communications interface (not shown in the attached drawings), and a second WWW browser (not shown in the attached drawings).

When the second WWW browser of the telephone terminal 5 accesses the WWW server (not shown in the attached drawings) of the computer center 3 through the data communications interface between the telephone terminal 5 and the computer center 3 and a specific instruction is issued, the agent process unit 33 is activated in the computer center 3.

The agent process unit 33 activates the voice communications unit 31 in such a way that the voice communications unit 31 can communicate with the voice communications unit 11 in the computer 1 connected to the computer network 2, disconnects the communications with the telephone terminal 5, switches the connection to the network control unit 34 from the data communications interface to the voice/data conversion unit 32, and issues a call to the telephone terminal 5.

In the telephone terminal 5, the communications between the telephone terminal 5 and the computer center 3 is disconnected. The connection to the second network control unit is switched from the second data communications interface to the second voice communications interface to enter a call waiting state and answer a call from the telephone network 4. Thus, the communications between the computer 1 and the telephone terminal 5 can be established.

According to this aspect of the present invention, if the second WWW browser of the telephone terminal 5 accesses the WWW server of the computer center 3 through the second data communications interface of the telephone terminal 5 and the first data communications interface of the computer center 3, and a specific instruction is issued, then the communications with the telephone terminal 5 are temporarily disconnected in the computer center 3 and a call is issued from the computer center 3 to the telephone terminal 5. The telephone terminal 5 answers the call, thereby practically receiving the call from the telephone terminal 5.

According to the above described aspects of the present invention, a transferred data stream refers to voice data. According to the twelfth aspect of the present invention, a further transferred data stream refers to voice data and animation data, thereby successfully transmitting and receiving voice and animation data and realizing services such as TV telephones.

The thirteenth aspect of the present invention relates to the configuration of the computer center 3 which realizes the first aspect of the present invention.

The computer center 3 comprises the voice communications unit 31 for establishing voice communications between computer networks; the voice/data conversion unit 32 for converting voice data into a voice signal and vice versa; the telephone number storage unit 35 for storing destination telephone numbers; the network control unit 34 for issuing a call to, connecting to, and disconnecting from the telephone network 4; and the agent process unit 33 for receiving the data stream transmitted from another computer 1 connected to the computer network 2, activating the voice communications unit 31, transferring the data stream to the voice communications unit 31, and issuing an instruction to issue a call to the telephone number stored in the telephone number storage unit 35 through the network control unit 34. With this configuration, the computer center 3 can transmit a call from the computer network 2 to the telephone terminal 5.

The fourteenth aspect of the present invention relates to the configuration of the computer center 3 which realizes the second aspect of the present invention.

The configuration of the computer center 3 is almost the same as that described in conjunction with the thirteenth aspect of the present invention. However, the agent process unit 33 does not directly communicate with the voice communications unit 11 in the computer 1, but communicates with the agent process unit of the computer 1. Thus, the agent process unit 33 realizes the transmission and reception of voice data between the first voice communications unit in the computer 1 and the voice communications unit 31 in the computer center 3 with the agent process unit in the computer 1 cooperating with the agent process unit 33.

The fifteenth aspect of the present invention relates to the configuration of the computer center 3 which realizes the third aspect of the present invention.

The computer center 3 comprises the voice communications unit 31 for communications between computer networks; the voice/data conversion unit 32 functionally connected to the voice communications unit 31; the network control unit 34 connected to the voice/data conversion unit 32; and the WWW server (not shown in the attached drawings). Upon receipt of a specific instruction from the WWW browser of the computer 1, the WWW server transmits to an agent process unit operating in the computer 1 which issued the instruction. The agent process unit 33 of the computer center 3 communicates with the agent process unit transmitted to the computer 1, activates the voice communications unit 31 upon receipt of a voice communications connection request, and issues to the network control unit 34 an instruction to call up the telephone number stored in the telephone number storage unit 35.

The sixteenth aspect of the present invention relates to the configuration of the computer center 3 which realizes the eleventh aspect of the present invention.

The computer center 3 comprises the voice communications unit 31; the voice/data conversion unit 32; the agent process unit 33; the network control unit 34; the telephone number storage unit 35; a first data communications interface (not shown in the attached drawings); and a WWW server (not shown in the attached drawings).

When the WWW browser of the telephone terminal 5 issues a specific instruction to the WWW server of the computer center 3, the agent process unit 33 is activated in the computer center 3. The agent process unit 33 activates the voice communications unit 31 in such a way that the voice communications unit 31 can communicate with the voice communications unit 11 in the computer 1 connected to the computer network 2, disconnects the communications with the telephone terminal 5, switches the connection to the network control unit 34 from the data communications interface to the voice/data conversion unit 32, and calls the telephone terminal 5.

The seventeenth aspect of the present invention relates to the configuration of the computer 1 which realizes the invention according to the second aspect described above.

The computer 1 on the source subscriber side comprises the voice communications unit 11 for establishing communications between computer networks;

the voice/data conversion unit 12, functionally connected to the voice communications unit 11, for converting voice data into a voice signal and vice versa; and an agent process unit for communicating with the agent process unit 33 in the computer center 3 and activating the voice communications unit 11.

The eighteenth aspect of the present invention relates to the configuration of the computer 1 which realizes the third aspect of the present invention.

The computer 1 comprises the voice communications unit 11; the voice/data conversion unit 12; and a WWW browser for communicating with a corresponding WWW server of the computer center 3 and transmitting a specific instruction, requests to transmit an agent process unit to the computer center 3 through the WWW browser, and activates the voice communications unit 11 through the agent process unit transmitted from the computer center 3.

The nineteenth aspect of the present invention relates to the configuration of the telephone terminal 5 which realizes the eleventh aspect of the present invention.

The telephone terminal 5 according to the nineteenth aspect of the present invention comprises a data communications interface; a voice communications interface; a WWW browser for accessing the WWW server of the computer center 3 through the data communications interface and issuing a specific instruction; and a network control unit for disconnecting the communications with the computer center 3 after the specific instruction, switching the connection from the data communications interface to the voice communications interface, entering a call waiting state, and answering a call from the telephone network 4.

According to the conventional technology, the user has to use, prepare, and select the same voice communications process unit as that in the computer center 3. Therefore, it is inconvenient for users.

According to the second aspect of the present invention, the computer center 3 described in conjunction with the first aspect described above further comprises variations of voice communications units 31 (31a, 31b, 31c, 31d, . . . ), and automatically selects an appropriate voice communications unit 31x.

The agent process unit 33 recognizes the type of the voice communications unit 11 from the data stream received from the voice communications unit 11, selects the voice communications unit 31x which can communicate with the voice communications unit 11 in the computer 1 from among the plurality of voice communications units 31 (31a, 31b, 31c, 31d, . . . ), activates the voice communications unit 31x, transfers the data stream to the voice communications unit 31x, and communicates with the voice communications unit 31x.

According to this invention, communications can be established in a corresponding voice communications process by recognizing the type of the voice communications unit 11 from the data stream received from the voice communications unit 11 even if various existing voice communications processes are used by the computer 1.

According to the twenty-first aspect of the present invention, the computer center 3 according to the second or third aspect of the present invention further comprises plural types of the voice communications units 31 (31a, 31b, 31c, 31d, . . . ), and automatically selects an appropriate voice communications unit 31x.

When an agent process unit (not shown in the attached drawings) of the computer 1 activates the voice communications unit 11, the type of the voice communications unit 11 is transmitted to the agent process unit 33 of the computer center 3, and the agent process unit 33 selects the voice communications unit 31x which can communicate with the voice communications unit 11 from among the voice communications units 31 (31a, 31b, 31c, 31d, . . . ) of the computer center 3, and then activates the selected unit. The voice communications unit 31x communicates with the voice communications unit 11 of the computer 1.

According to the conventional technology or the invention according to the other aspects described above, it is inconvenient for a user to prepare a voice communications process unit.

According to the twenty-second aspect of the present invention, the computer 1 comprises the voice/data conversion unit 12 and a WWW browser (not shown in the attached drawings). The computer center 3 comprises one or more voice communications units 31, the voice/data conversion unit 32 functionally connected to the voice communications unit 31, the network control unit 34 connected to the voice/data conversion unit 32, a WWW server (not shown in the attached drawings), and the telephone number storage unit 35.

When a source subscriber accesses the WWW server of the computer center 3 through the WWW browser and issues a specific instruction, the voice communications unit 31 is transmitted from the WWW server to the WWW browser of the computer 1. In the computer 1, the voice communications unit 11 is activated in such a way that it is allowed to communicate with the voice communications unit 31. In the computer center 3, the WWW server activates the voice communications unit 31 in such a way that the voice communications unit 31 can communicate with the voice communications unit 11, and transmits a signal addressed to the telephone number stored in the telephone number storage unit 35 through the network control unit 34. Thus, communications can be established between the computer 1 and the telephone terminal 5.

At the request from the WWW browser of the computer 1, the computer center 3 transmits the voice communications unit 11 capable of communicating with the voice communications unit 31 through the WWW server. As a result, the voice communications unit 11 can communicate with the voice communications unit 31 activated in the computer center 3.

According to the twenty-third aspect of the present invention, the telephone terminal 5 further comprises a third agent process unit (not shown in the attached drawings) to improve the convenience to a user by, for example, allowing the computer center 3 to be accessed again through the WWW browser after voice communications.

If the WWW server (not shown in the attached drawings) of the computer center 3 is accessed by the second WWW browser (not shown in the attached drawings) of the telephone terminal 5 through the data communications interface (not shown in the attached drawings) between the telephone terminal 5 and the computer center 3, and a specific instruction is issued, then the agent process unit 33 is activated in the computer center 3. The agent process unit 33 activates the voice communications unit 31 in such a way that the voice communications unit 31 can communicate with the voice communications unit 11 in another computer 1 connected to the computer network 2, disconnects the communications with the telephone terminal 5, switches the connection to the network control unit 34 from the data communications interface to the second voice/data conversion unit 32, and transmits a signal to the telephone terminal 5.

When the communications terminate, the connection to the network control unit 34 is switched from the second voice/data conversion unit 32 to the data communications interface, and transmits a signal to the telephone terminal 5 or answers the call from the telephone terminal 5.

In the telephone terminal 5, the third agent process unit disconnects the communications with the computer center 3, switches the connection to the network control unit (not shown in the attached drawings) from the data communications interface to the voice communications interface, and answers the call from the computer center 3. If the communications terminate, the connection of the network control unit is switched from the voice communications interface to the data communications interface, and the computer center 3 is answered or receives a signal, thereby establishing communications between the computer 1 and the telephone terminal 5.

Figure 4:
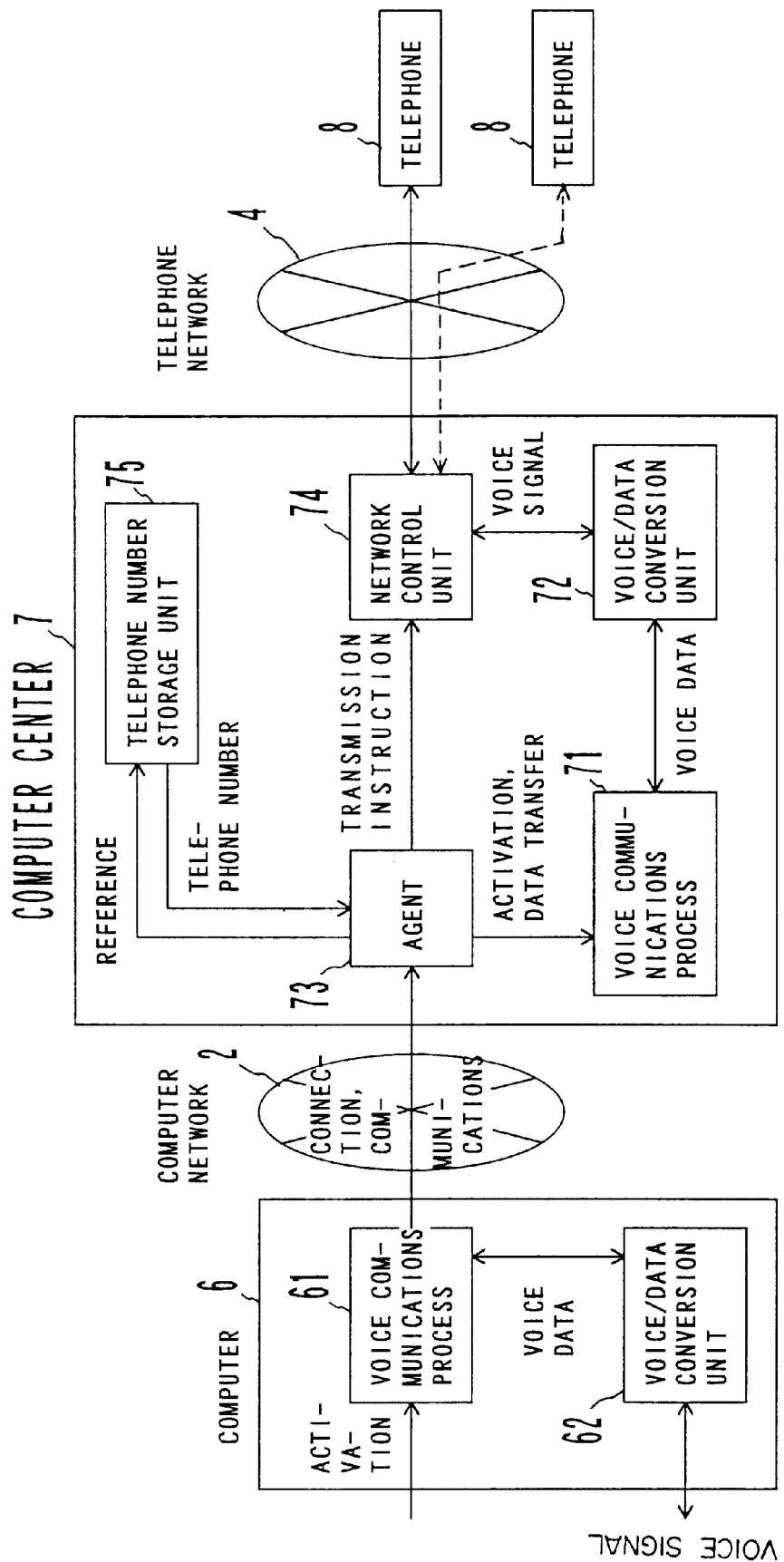
FIG. 4 shows the configuration according to an embodiment of the first and the thirteenth aspects of the present invention.

FIG. 4 shows the configuration according to an embodiment corresponding to the first and thirteenth aspects according to the present invention. The example shown in FIG. 4 shows the voice communications between one computer 6 and a computer center 7 containing one computer.

The computer network 2 can be a LAN (local area network), a WAN (wide area network), or can be the Internet connecting these networks, and comprises an Ethercable, optical fibers, private lines, a router, a bridge, a hub, and a switching unit, etc.

The telephone network 4 can be an analog telephone network or a digital telephone network (ISDN short for Integrated Services Digital Network), or an analog or digital wireless communications network.

The computer 6 comprises a voice communications process 61 and a voice/data conversion unit 62. The computer center 7 comprises a voice communications process 71, a voice/data conversion unit 72, an agent 73, a network control unit 74, and a telephone number storage unit 75.

The voice communications processes 61 and 71 establish voice communications between computer networks using, for example, a VAT (visual audio tool), an Internetphone, etc. The voice/data conversion units 62 and 72 convert a voice signal into voice data and vice versa.

The agent 73 activates the voice communications process 71, receives the data stream transmitted from the voice communications process 61 in the computer 6 connected through the computer network 2, transfers it to the voice communications process 71, obtains the telephone number of a telephone 8 of the destination by referring to the telephone number storage unit 75, and instructs the network control unit 74 to send a signal to the obtained telephone number.

The network control unit 74 controls the communications with the telephone 8 through the telephone network 4 at an issue instruction from an agent. The telephone number storage unit 75 stores telephone numbers, etc. of one or more telephones 8.

Figure 5:
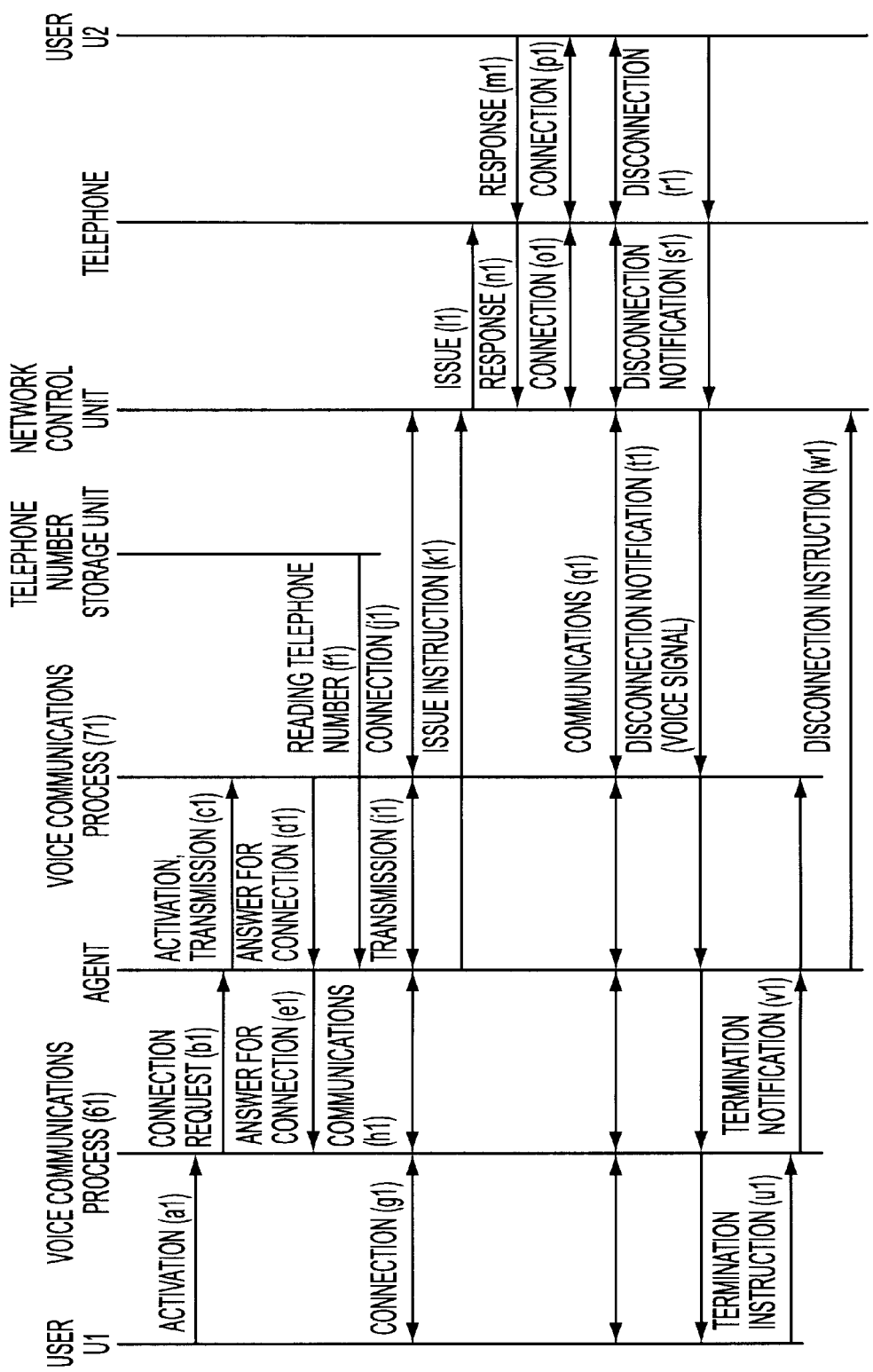
FIG. 5 shows the sequence of the operations with the configuration shown in FIG. 4.

FIG. 5 shows the sequence of the processes in which a user U1 of the computer 6 of a source subscriber transmits a signal to a user U2 of the telephone 8 with the configuration shown in FIG. 4.

First, the user U1 activates the voice communications process 61 (a1). Normally, the user U1 activates the voice communications process 61 by, for example, entering 'vat machine2.domain2/2222' or 'vat 123.456.78.12/2222'. The 'vat' is a command name referring to the voice communications process 61. The 'machine2.domain2' indicates the machine name and the domain name of the computer center 7 containing the agent 73. The '123.456.78.12' indicates the IP address of the machine containing the agent 73. The '2222' preceded by the '/' indicates the port number.

Next, the voice communications process 61 issues a connection request to the agent 73 through the computer network 2 (b1).

Upon receipt of the connection request, the agent 73 activates the voice communications process 71 and transfers data (c1). Normally, the voice communications process 71 is activated by the agent 73 by entering a command such as 'vat machine1.domain1/1111' or 'vat 987.654.32.10/1111'.

In this example, the port number of the agent 73 is different from the port number of the voice communications process 71. If they are assigned the same port number, the computer center 7 should comprise two or more computers because the agent 73 and the voice communications process 71 cannot be contained in the same computer.

The activated voice communications process 71 answers the agent 73 for connection (d1). The agent 73 further answers the voice communications process 61 of the computer 6 for connection (e1). The agent 73 reads the telephone number of the destination subscriber from the telephone number storage unit 75 (f1).

The user U1 is connected to the voice communications process 61 (g1). The voice communications process 61 communicates with the agent 73 (h1). A call is transferred between the agent 73 and the voice communications process 71 (i1). The voice communications process 71 is connected to the network control unit 74 (j1).

Then, an issue instruction is issued to the network control unit 74 from the agent 73 (k1), and the network control unit 74 transmits the instruction to the telephone 8 of the destination subscriber (l1).

When the user U2 answers through the telephone 8 (m1), the network control unit 74 receives an answer signal from the telephone 8 (n1), and the telephone 8 is connected to the user U2 (o1 and p1). Thus, the user U1 can communicate with the user U2, and they start communications (q1).

When the user U2 disconnects the telephone 8 (r1), the network control unit 74 receives a disconnection signal from the telephone 8 (s1), and transfers a disconnection notification (voice signal)(t1). When the user U1 receives the disconnection notification and instructs the voice communications process 61 to terminate the process (u1), the voice communications process 61 transmits a termination notification to the agent 73, and the agent 73 transfers the termination notification to the voice communications process 71 (v1), and instructs the network control unit 74 to disconnect the process (w1).

An instruction from the agent 73 to the network control unit 74 to issue a signal is, for example, expressed by 'ATDT1234567' (when an AT command is issued) or by 'CRN1234567' (when a V.25bis command is issued). The '1234567' is a destination telephone number. Similarly, the disconnection instruction can be expressed by the '+++' followed by 'ATHO' (AT command) or 'RST' (V.25bits which can be replaced with a reset statement).

Figure 6:
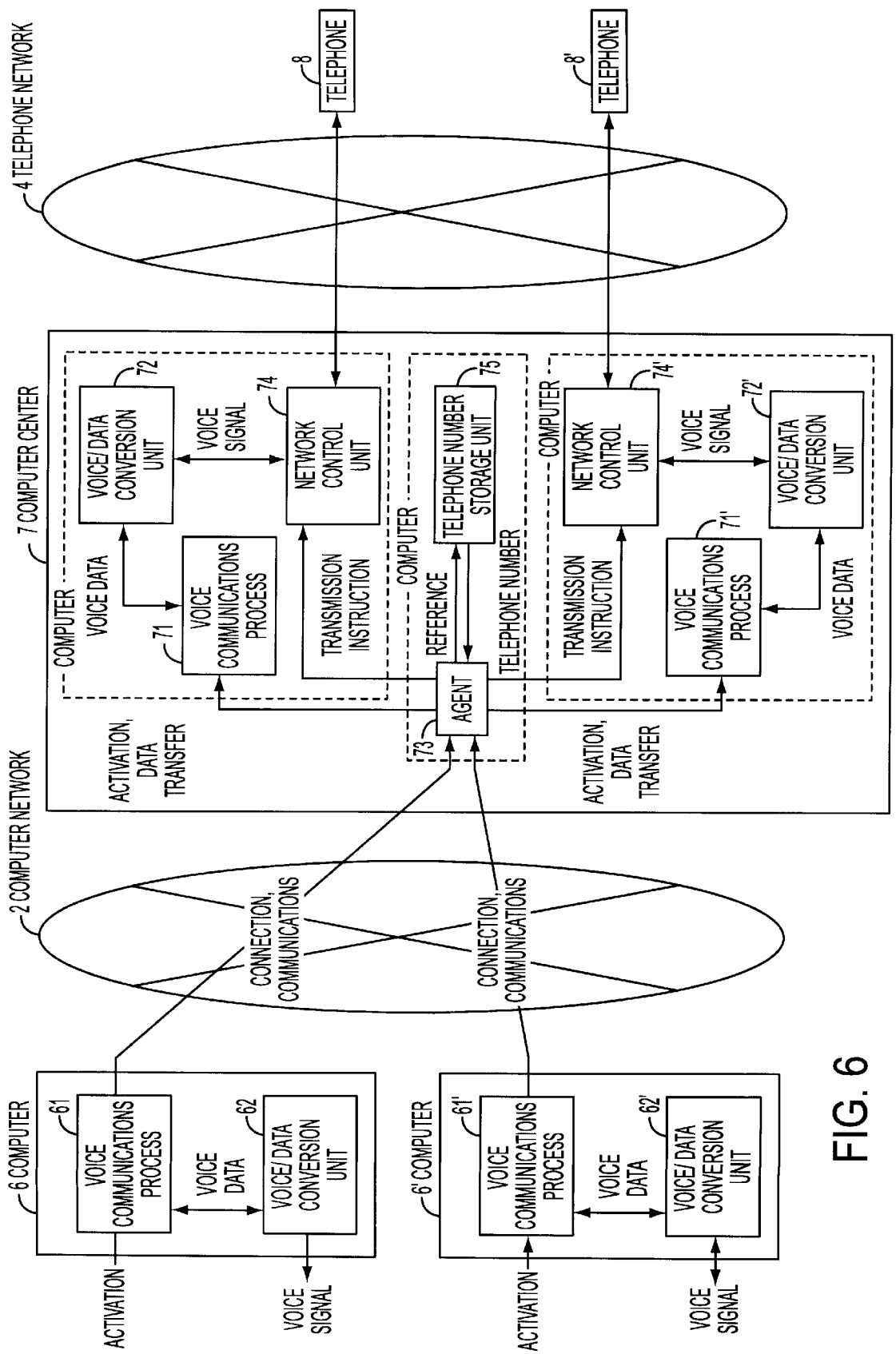
FIG. 6 shows the configuration according to another embodiment of the first aspect of the present invention.

FIG. 6 shows an example of the configuration according to another embodiment of the first aspect of the present invention. FIG. 6 shows an example of the voice communications established between two computers 6 and 6' and the computer center 7 containing three computers.

One computer in the computer center 7 comprises the agent 73 and the telephone number storage unit 75. It further comprises two computers respectively including voice communications processes 71 and 71', voice/data conversion units 72 and 72', and network control units 74 and 74'.

When connections are made by the voice communications processes 61 and 61', the agent 73 assigns the connections to the voice communications processes 71 and 71' respectively and performs the processes in the sequence shown in FIG. 5.

Figure 7:
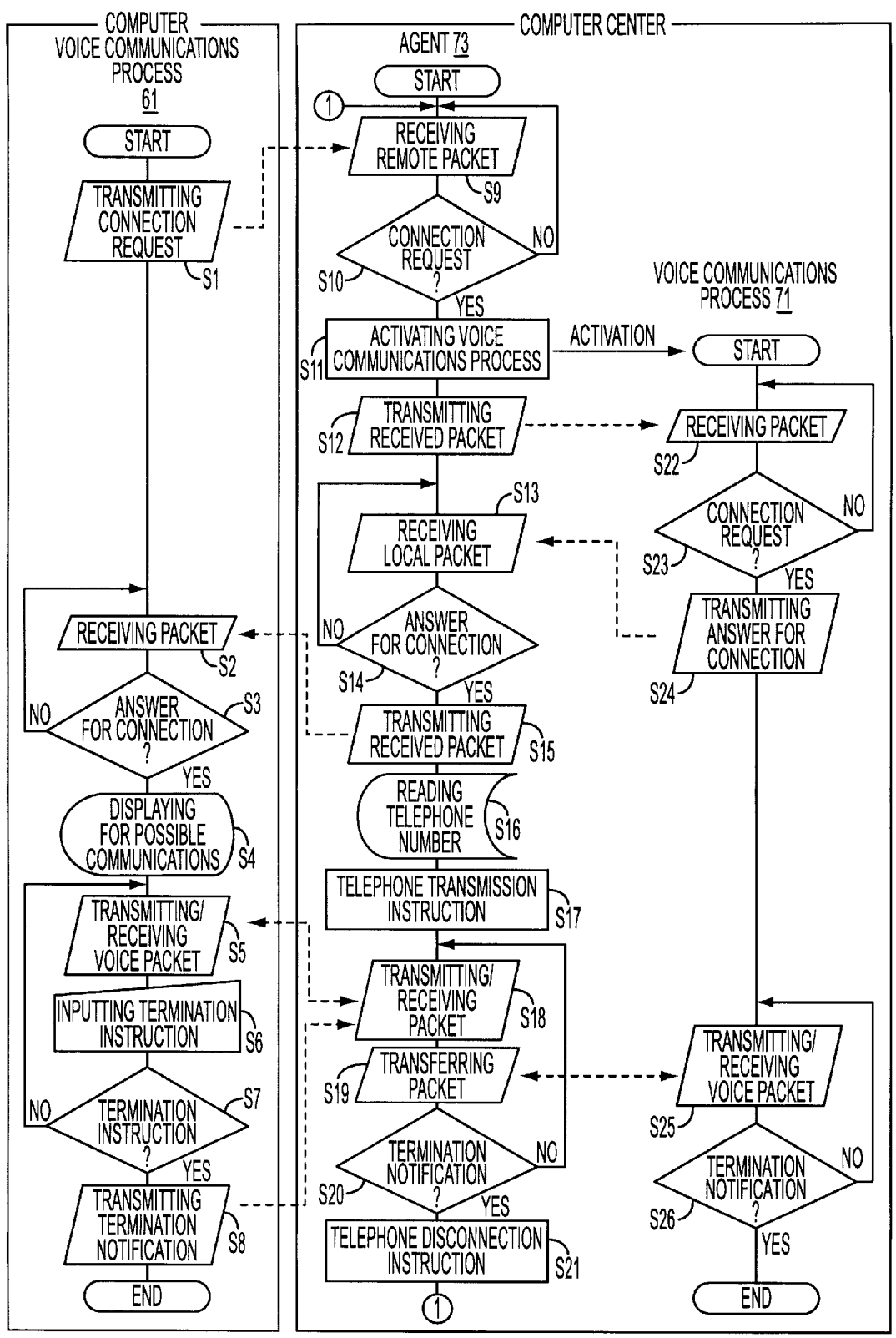
FIG. 7 is a flowchart showing the process performed in the voice communications process of a computer and the agent and the voice communications process of a computer center according to an embodiment shown in FIGS. 3–6.

FIG. 7 is a flowchart showing the processes performed by the voice communications process and the agent of the computer center, and the voice communications process of the computer according to the embodiments described by referring to FIGS. 3 through 6.

The voice communications process 61 of the computer 1 transmits a connection request to the agent 73 of the computer center in step S1 when the process starts. After the voice communications process 61 transmits the connection request, it enters a state in step S2 in which a packet from the agent 73 can be received. In step S3, it is determined whether or not an answer for connection has been received from the agent 73. If it is determined in step S3 that no answers for connection have been received, then the processes in steps S2 and S3 are repeated and a wait state continues until an answer for connection is received. When an answer for connection is received in step S3, it is announced and displayed on the screen of the computer that communications can be established in step S4. In step S5, a voice packet is transmitted to and received from the agent 73 for communications. In step S6, a communications termination instruction is able to be accepted. In step S7, it is determined whether or not the termination instruction has been input.

If it is determined in step S7 that the termination instruction has not been input, then control is returned to step S5, the voice packet is transmitted and received, and the voice communications continues. If it is determined in step S7 that the communications termination instruction has been received, control is passed to step S8, a termination notification is transmitted to the agent 73, and the process terminates.

When the process starts, the agent 73 of the computer center enters a remote packet reception state in step S9. It is determined in step S10 whether or not a remote packet contains a connection request. If the remote packet contains no connection request, control is returned to step S9 to wait for a remote packet to be received. If it is determined in step S10 that the remote packet contains a connection request, then the voice communications process 71 in the computer center is activated in step S11, and a received packet is transmitted to the voice communications process 71 in step S12.

In step S13, a local packet can be received from the voice communications process 71 in the computer center. In step S14, it is determined whether or not the local packet contains an answer for connection. If the local packet does not contain an answer for connection, then control is returned to step S13, and a local packet containing a request for connection is awaited from the voice communications process 71. If it is determined in step S14 that a local packet contains an answer for connection, the packet received in step S15 is transmitted to the voice communications process 61 of the computer. In step S16, a telephone number is read from the telephone number storage unit. In step S17, a telephone call instruction is issued to a network control unit. Thus, a telephone line is properly connected.

In step S18, a voice packet can be transmitted and received with the voice communications process 61 of the computer. In step S19, the voice packet received from the voice communications process 61 is transferred to the voice communications process 71, and a voice packet is received from the voice communications process 71. It is determined in step S20 whether or not the voice packet contains a termination notification. If it is determined that the packet does not contain the termination notification, then control is returned to step S18 and a voice packet can be transmitted and received. At this time, the voice packet received from the voice communications process 71 in step S19 is transmitted to the voice communications process 61 of the computer. Thus, voice communications can be established between the computer and the telephone connected to the computer center.

If it is determined in step S20 that a voice packet contains a termination notification, then control is passed to step S21, a telephone disconnection instruction is transmitted to the network control unit, and control is returned to step S9 to be ready for a subsequent session.

The voice communications process 71 activated in step S11 of the agent 73 enters a state in which a packet is received from the agent 73 in step S22, when the voice communications process 71 is activated. In step S23, it is determined whether or not the received packet contains a connection request. If the received packet does not contain a connection request, then control is returned to step S22, and a packet containing a connection request is awaited. If it is determined that the packet contains a connection request in step S23, an answer for connection is transmitted to the agent 73 in step S24. In step S25, a voice packet from the network control unit is also transferred to the agent 73. In step S26, it is determined whether or not a termination notification is contained in the voice packet transmitted or received in step S25. If it is not contained, the voice packet transmission and reception processes are repeated. If it is contained, the process terminates.

Figure 8:
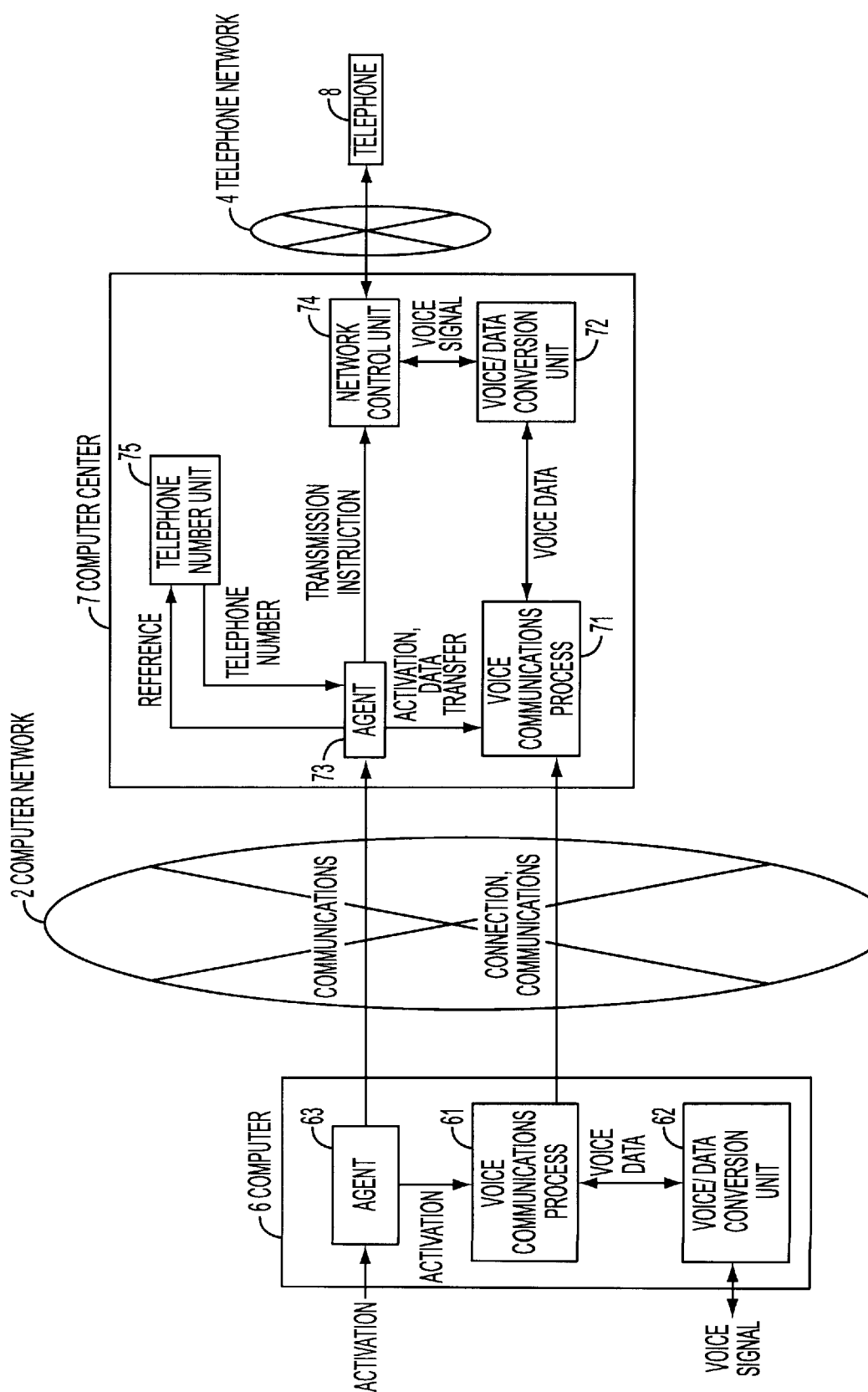
FIG. 8 shows the configuration according to an embodiment of the second, fourteenth, and seventeenth aspects of the present invention.

FIG. 8 shows the configuration according to an embodiment of the second, fourteenth, and seventeenth aspects of the present invention. In FIG. 8, voice communications are established between one computer and a computer center comprising another computer.

In FIG. 8, the computer 6 comprises the voice communications process 61, the voice/data conversion unit 62, and the agent 63. Like the computer center 7 shown in FIG. 4, the computer center 7 comprises the voice communications process 71; the voice/data conversion unit 72, the agent 73, the network control unit 74, and the telephone number storage unit 75.

Each component of the computer center 7 is almost the same as the component of the computer center 7 shown in FIG. 4. The computer 6 communicates with the agent 73 and comprises the agent 63 for activating the voice communications process 61.

Figure 9:
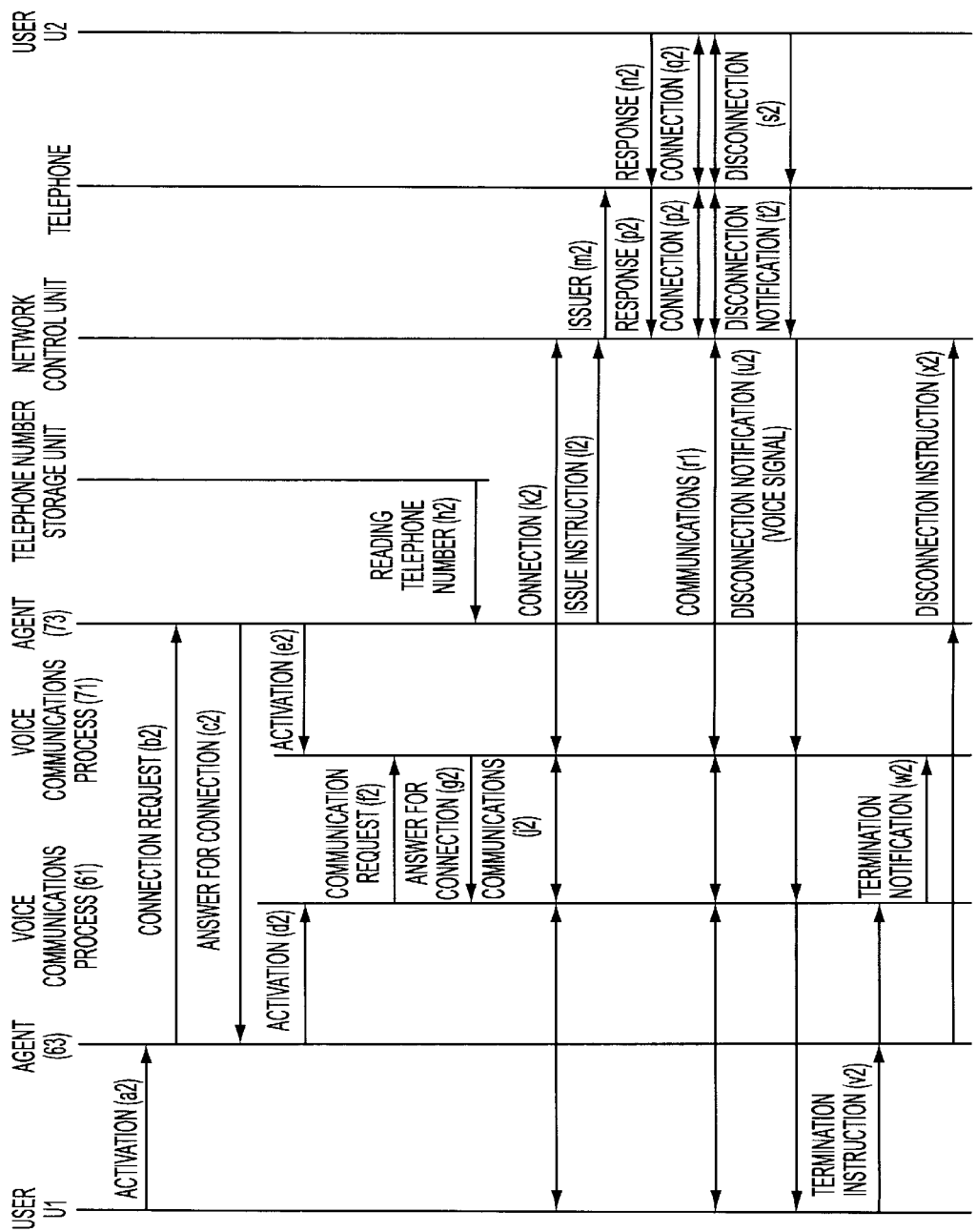
FIG. 9 shows the sequence of the operations with the configuration shown in FIG. 8.

FIG. 9 shows the sequence of the processes performed when the user U1 of the source subscriber's computer 6 calls up the user U2 of the telephone 8 with the configuration shown in FIG. 8.

First, the user U1 activates the agent 63 (a2), and the agent 63 transmits a connection request to the agent 73 of the computer center 7 (b2). When the agent 73 answers for connection (c2), the agent 63 activates the voice communications process 61 (d2). The agent 73 activates the voice communications process 71 (e2). The activation of the voice communications processes 61 and 71 is the same as the activation of the invention according to the first aspect described above.

Next, the voice communications process 61 transmits a connection request to the voice communications process 71 (f2), and obtains from the voice communications process 71 an answer for connection (g2).

The agent 73 reads the telephone number of the destination from the telephone number storage unit 75 (h2).

The user U1 is connected to the voice communications process 61 (i2), the voice communications process 61 communicates with the voice communications process 71 (j2), and the voice communications process 71 is connected to the network control unit 74 (k2). Then, the agent 73 issues a call instruction to the network control unit 74 (l2), and the network control unit 74 calls up the destination telephone 8 (m2). The call instruction to the network control unit 74 is the same as that in the case of the first aspect of the present invention.

When the user U2 answers on the telephone 8 (n2), the network control unit 74 receives an answer signal from the telephone 8 (o2), and the telephone 8 is connected (p2 and q2) to the user U2. Thus, communications are established between the users U1 and U2 (r2).

When the communications are over and the user U2 disconnects the communications (s2), the network control unit 74 receives a disconnection signal from the telephone 8 (t2), and transfers a disconnection notification (voice signal) (u2). When the user U1 who received the disconnection notification instructs the voice communications process 61 through the agent 63 to terminate the process (v2), the voice communications process 61 transmits a termination notification to the voice communications process 71 (w2). The agent 63 further transmits a disconnection instruction to the agent 73, and the agent 73 transmits a disconnection instruction to the network control unit 74 (x2). The disconnection instruction is the same as that according to the first aspect of the present invention.

Figure 10:
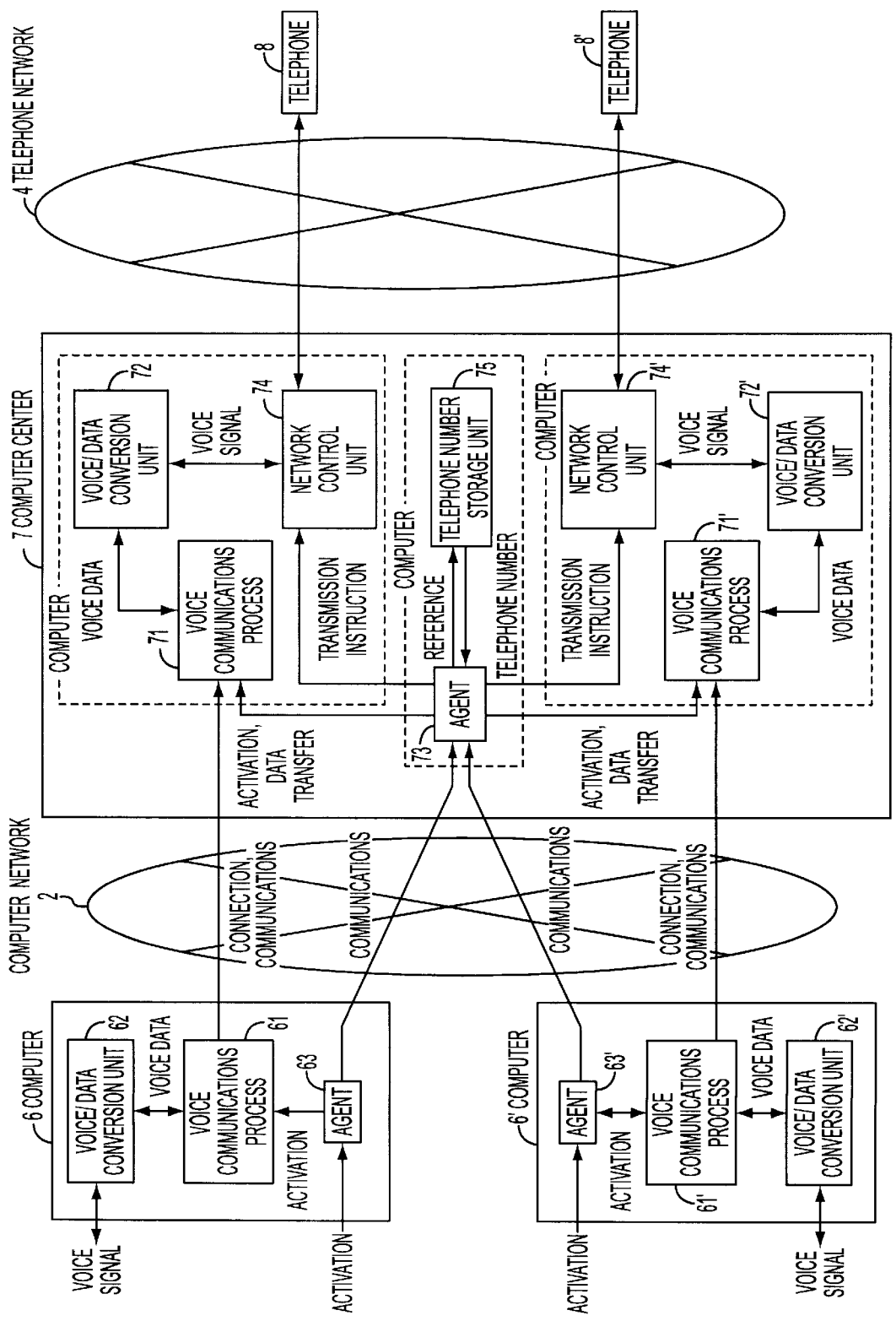
FIG. 10 shows the configuration according to another embodiment of the second aspect of the present invention.

FIG. 10 shows an example of the configuration according to another embodiment of the second aspect of the present invention. In FIG. 10, voice communications are established between the two computers 6 and 6' and the computer center 7 comprising three computers.

When communications requests are received from the agents 63 and 63', the agent 73 activates, connects, and establishes between the voice communications processes 71 and 71' at respective communications requests according to the sequence shown in FIG. 9.

Figure 11:
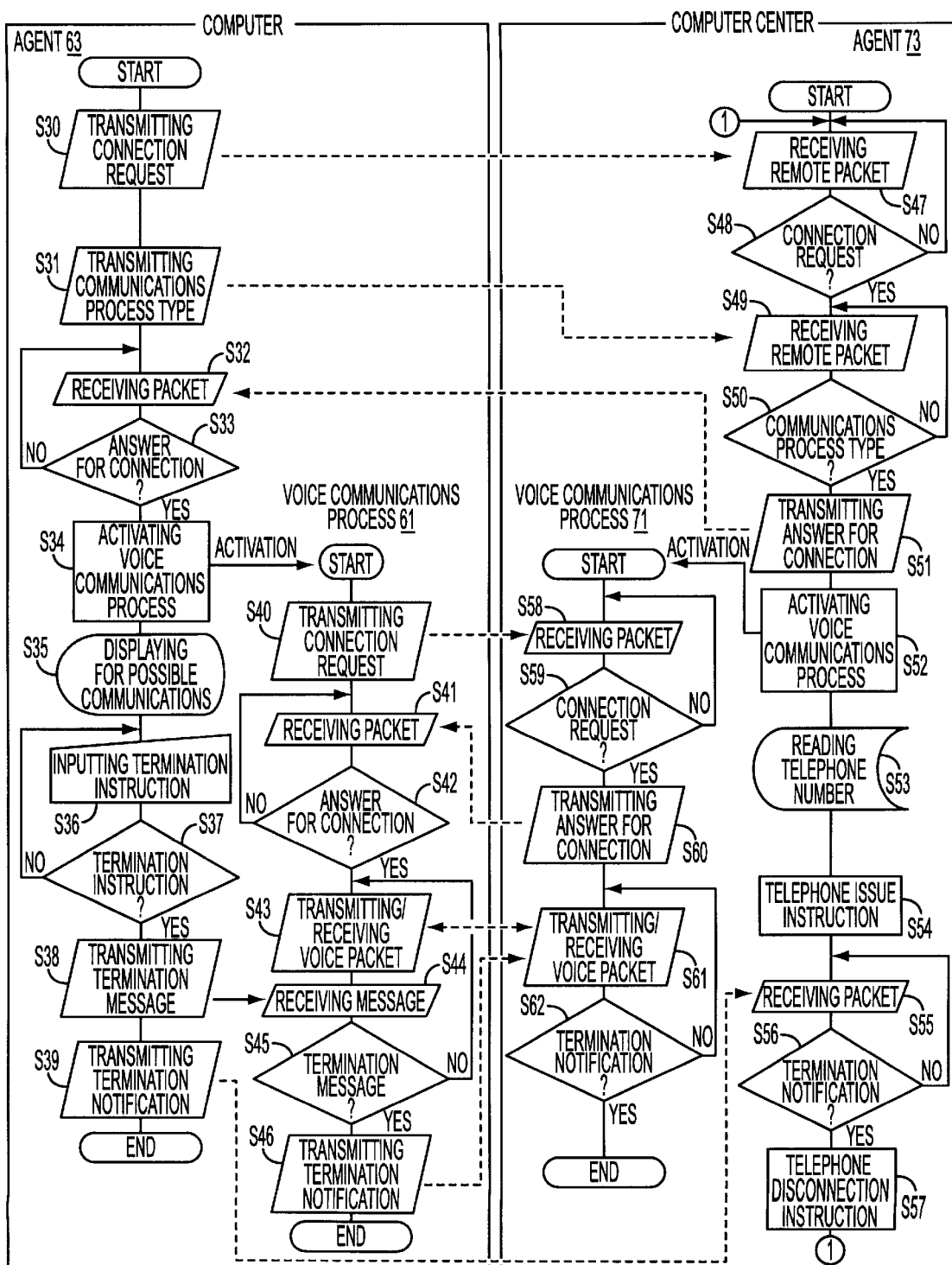
FIG. 11 is a flowchart showing the process performed in the agents and the voice communications processes of the computer and the computer center according to the embodiments shown in FIGS. 8 through 10.

FIG. 11 is a flowchart of the processes performed by the agents and voice communications processes of the computer and the computer center according to the embodiment shown in FIGS. 8 through 10.

When the agent 63 on the computer side is activated, a connection request is transmitted to the agent 73 of the computer center in step S30. Then, in step S31, the communications process type is transmitted to the agent 73, and a packet can be received from the agent 73 in step S32. When a packet is received, it is determined in step S33 whether or not it contains an answer to the connection request. If the packet does not contain an answer for connection, the processes in steps S32 and S33 are repeated until an answer for connection can be received. If it is determined that the packet received in step S33 contains an answer for connection, processing is passed to step S34 and the voice communications process 61 in the computer is activated, and the display screen of the computer displays that the communications can be established in step S35.

Then, in step S36, a communications termination instruction can be input from the computer. When any instruction is received, it is determined in step S37 whether or not it is a termination instruction. If it is not a termination instruction, the processes in steps S36 and S37 are repeated. If it is determined that it is a termination instruction, then a termination message is transmitted to the voice communications process 61 in step S38. A termination notification is transmitted to the agent 73 of the computer center in step S39, thereby terminating the process.

On the other hand, when the voice communications process 61 of the agent 63 is activated in step S34, it transmits a connection request to the voice communications process 71 of the computer center in step S40, and enters a packet reception state in step S41. It is determined in step S42 whether or not the packet received in step S41 contains an answer to the connection request. If it does not contain an answer for connection, then the processes in steps S41 and S42 are repeated. If it is an answer for connection, then processing is passed to step S43.

In step S43, a voice packet is transmitted to and received from the voice communications process 71. In step S44, a message can be received from the agent 63 when it arrives. In step S45, it is determined whether or not the message received in step S44 is a termination massage. If it is not a termination message, processing is returned to step S43 and a voice packet continues to be transmitted and received. If the message received from the agent 63 in step S45 is a termination message, then a termination notification is transmitted to the voice communications process 71 in step S46, thereby terminating the process.

When the agent 73 on the computer center side is activated, a remote packet from the agent 63 on the computer side is awaited in step S47. In step S48, it is determined whether or not the remote packet contains a connection request. If it does not contain a connection request, processing is returned to step S47 and another remote packet is awaited. If it is determined in step S48 that the remote packet contains a connection request, another remote packet from the agent 63 is awaited in step S49. In step S50, it is determined whether or not the packet specifies the type of the communications process. If it is not a packet specifying the type of communications process, the processes in steps S49 and S50 are repeated until a packet specifying the type of communications process arrives. If it is determined in step S50 that the received packet specifies the type of communications process, then an answer-for-connection packet is transmitted to the agent 63 in step S51. In step S52, the voice communications process 71 on the computer center side is activated, and a telephone number is read from the telephone number storage unit in step S53. In step S54, the network control unit 74 is instructed to issue a telephone call.

In step S55, a packet from the agent 63 is awaited. When any packet is received, it is determined whether it contains a termination notification (step S56). If it does not contain a termination notification, processing is returned to step S55, and a termination notification is awaited. If it is determined that the packet contains a termination notification, then the network control unit is instructed to disconnect a telephone in step S57, and processing is returned to step S47 in preparation for the next session.

When the voice communications process 71 of the agent 73 is activated in step S52, it waits for a packet from the voice communications process 61 in step S58. If any packet is received, it is determined in step S59 whether or not the transmitted packet contains a connection request. If the packet does not contain a connection request, then processing is returned to step S58, and the process is repeated until a packet containing a connection request arrives.

If a received packet contains a connection request in step S59, then an answer for connection is transmitted to the voice communications process 61 in step S60, and a voice packet is transmitted to and received from the voice communications process 61 in step S61. In step S62, it is determined whether or not the voice packet received in step S61 contains a termination notification. If it does not contain a termination notification, then processing is returned to step S61 and a voice packet is continuously transmitted and received. If it is determined in step S62 that the voice packet contains a termination notification, then the process terminates.

Figure 12:
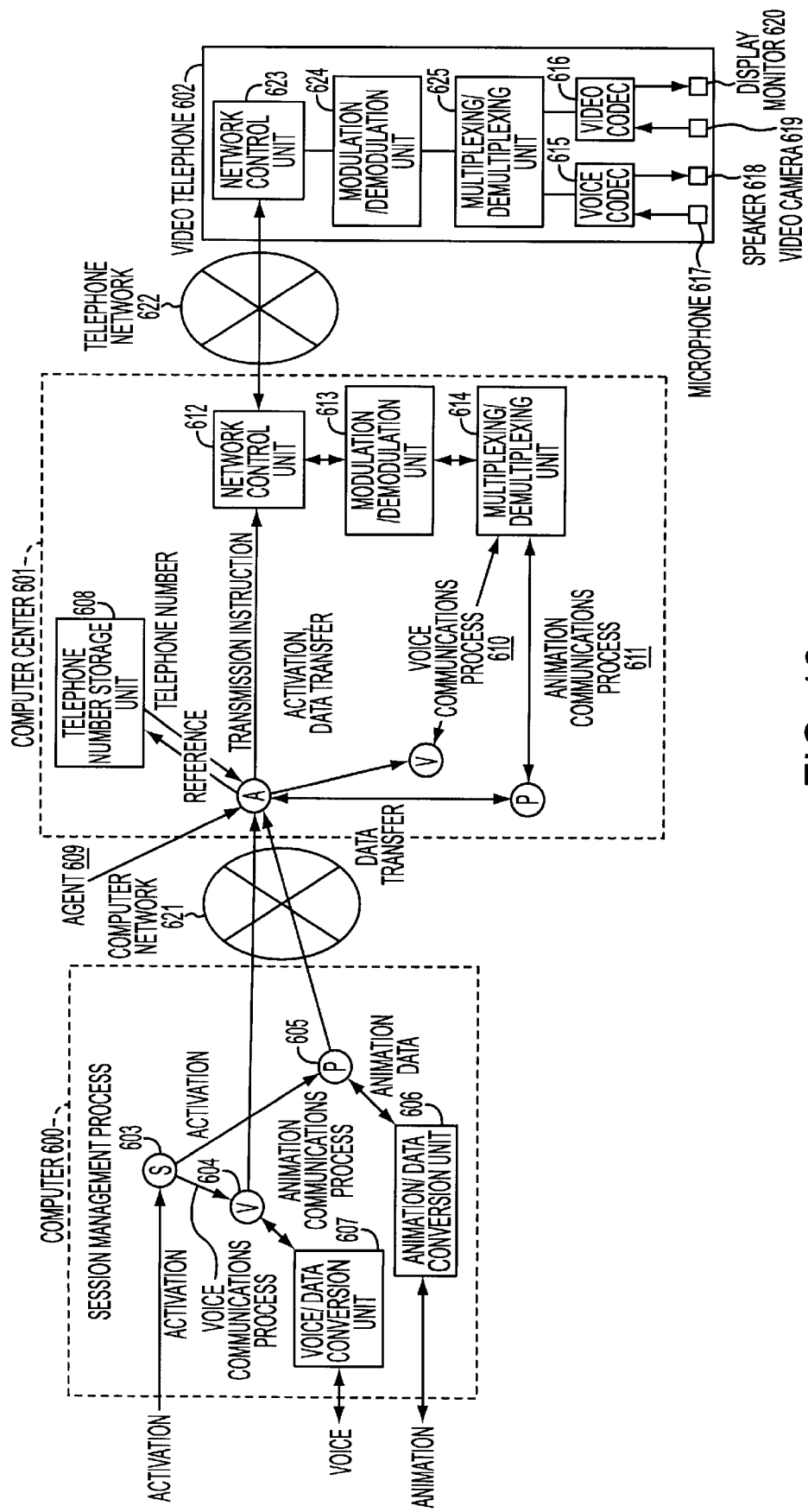
FIG. 12 shows the configuration corresponding to the first aspect of the present invention for transferring animation data as well as voice data.

FIG. 12 shows the configuration corresponding to the first aspect of the present invention for transferring animation data as well as voice data.

A computer 600 is connected to a computer center 601 through a computer network 621. The computer center 601 is connected to a video telephone 602 through a telephone network 622.

The computer 600 is provided with a voice communications process 604 as described above. That is, the voice input through a voice/data conversion unit 607 is received as voice data and transmitted to an agent 609 of the computer center 601. Additionally, according to the present embodiment, the computer 600 is provided with an animation communications process 605 for transmitting and receiving animation data. Like the voice communications process 604, the animation communications process 605 receives animation data through an animation/data conversion unit 606, and transmits the data to the agent 609 of the computer center 601. These voice communications process 604 and the animation communications process 605 are controlled by a session management process 603, and the user of the computer 600 activates the, session management process 603, thereby the voice communications process 604 and the animation communications process 605 are activated.

In the computer center 601, the agent 609 activates a voice communications process 610 and an animation communications process 611, and transfers a voice packet and an animation packet received from the computer 600 to the voice communications process 610 and the animation communications process 611 respectively. The agent 609 obtains a telephone number from a telephone number storage unit 608 and instructs a network control unit 612 to issue a telephone call. The network control unit 612 connects the video telephone 602 to the network control unit 612 through the telephone network 622. The voice data or animation data transferred respectively to the voice communications process 610 and the animation communications process 611 are transmitted to a multiplexing unit 614 to be multiplexed into a single data packet, and are modulated by a modulation/demodulation unit 613 and transmitted by the network control unit 612 to the telephone network 622.

In the video telephone 602, the voice data and the animation data transmitted through the telephone network 622 are received by a network control unit 623 and demodulated by a modulation/demodulation unit 624. Furthermore, a multiplexing/demultiplexing unit 625 demultiplexes the multiplexed voice data and animation data. The voice data is reconstructed as voice by a voice CODEC 615 while the animation data is reconstructed as dynamic images by a video CODEC 616. The voice is output through a speaker 618 and the dynamic images are displayed on a display monitor 620.

Voice and animation are transmitted from the computer 600 to the video telephone 602 as described above. When suitable lines are connected, they also can be transmitted from a video telephone to the computer 600. In this case, voice is input through a microphone 617 and animation is input through a video camera 619. The voice and animation are encoded by the voice CODEC 615 and the video CODEC 616 respectively and multiplexed by the multiplexing/demultiplexing unit 625. Furthermore, the multiplexed data is modulated by the modulation/demodulation unit 624 and transmitted to the telephone network 622 through the network control unit 623. The computer center 601 and the computer 600 perform the converse processes to the above described processes on the voice data and animation data transmitted through the video telephone 602 so that voice and animation can be output from the voice/data conversion unit 607 and the animation/data conversion unit 606.

Figure 13:
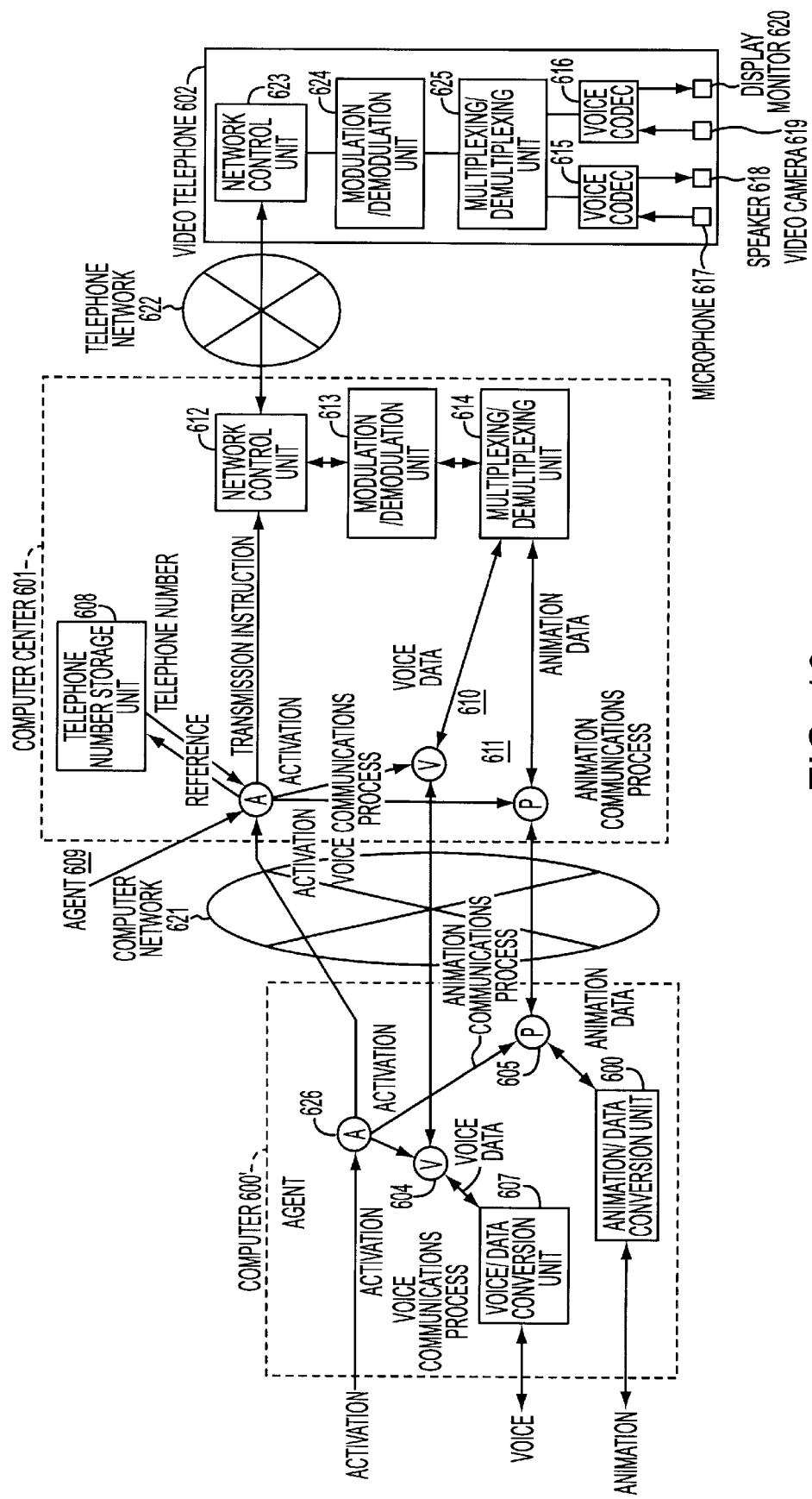
FIG. 13 shows the configuration capable of transferring animation data corresponding to the second aspect of the present invention.

FIG. 13 shows the configuration corresponding to the second aspect of the present invention to transfer animation data as well as voice data.

FIG. 13 shows the configuration with which an agent 626 of the computer 600' first communicates with the agent 609 of the computer center 601, and then communications are established between voice communications processes or between animation communications processes. That is, FIG. 13 shows the configuration corresponding to the second aspect of the present invention in which animation can be transferred. Items also shown in FIG. 12 are assigned the same reference numbers.

In the case shown in FIG. 13, a connection can be set from the computer 600'. It is also possible to set a connection from the video telephone 602, and to transmit voice and animation from the video telephone 602 to the computer 600'. Described below is the connection established from the computer 600' as in FIG. 12.

When the user of the computer 600' activates the agent 626, the agent 626 communicates with the agent 609 of the computer center 601, and inquires whether or not the connection can be made. If the connection can be made, then the voice communications process 604 and the animation communications process 605 are activated. The voice communications process 604 and the animation communications process 605 transmit packets respectively to the voice communications process 610 and the animation communication process 611 of the computer center 601, and confirm that the communications can be established.

The voice and animation input through the computer 600' are converted into data respectively by the voice/data conversion unit 607 and the animation/data conversion unit 606, and provided for the voice communications process 604 and the animation communications process 605 respectively. When it is confirmed that communications can be established with the computer center 601, the voice communications process 604 and the animation communications process 605 transfer voice data and animation data to the voice communications process 610 and the animation communication process 611 of the computer center 601.

The voice communications process 610 and the animation communication process 611 are preliminarily activated by the agent 609 when it is determined that a connection can be made through the communications between the agent 626 and the agent 609. Thus, the received voice and animation data are transmitted to the multiplexing unit 614. When the agent 609 receives a connection request from the agent 626 and answers the request, it obtains a telephone number from the telephone number storage unit 608, instructs the network control unit 612 to issue a telephone call, and establishes a connection to the video telephone 602 through the telephone network 622.

The voice data and animation data transmitted to the multiplexing unit 614 are multiplexed, modulated by the modulation/demodulation unit 613, and transmitted to the telephone network 622 by the network control unit 612.

The video telephone 602 receives data from the telephone network 622 by the network control unit 623. The data is demodulated by the modulation/demodulation unit 624 and provided for the multiplexing/demultiplexing unit 625. The multiplexing/demultiplexing unit 625 multiplexes the voice data and animation data, and provides them for the voice CODEC 615 and the video CODEC 616 respectively. The voice CODEC 615 and the video CODEC 616 demodulate the voice data and the animation data respectively, and output them in such a way that the speaker 618 outputs voice and the display monitor 620 displays animation.

As described above, voice can be input through the microphone 617, and animation can be input through the video camera 619, and the voice and animation can be transmitted to the computer 600'.

Figure 14:
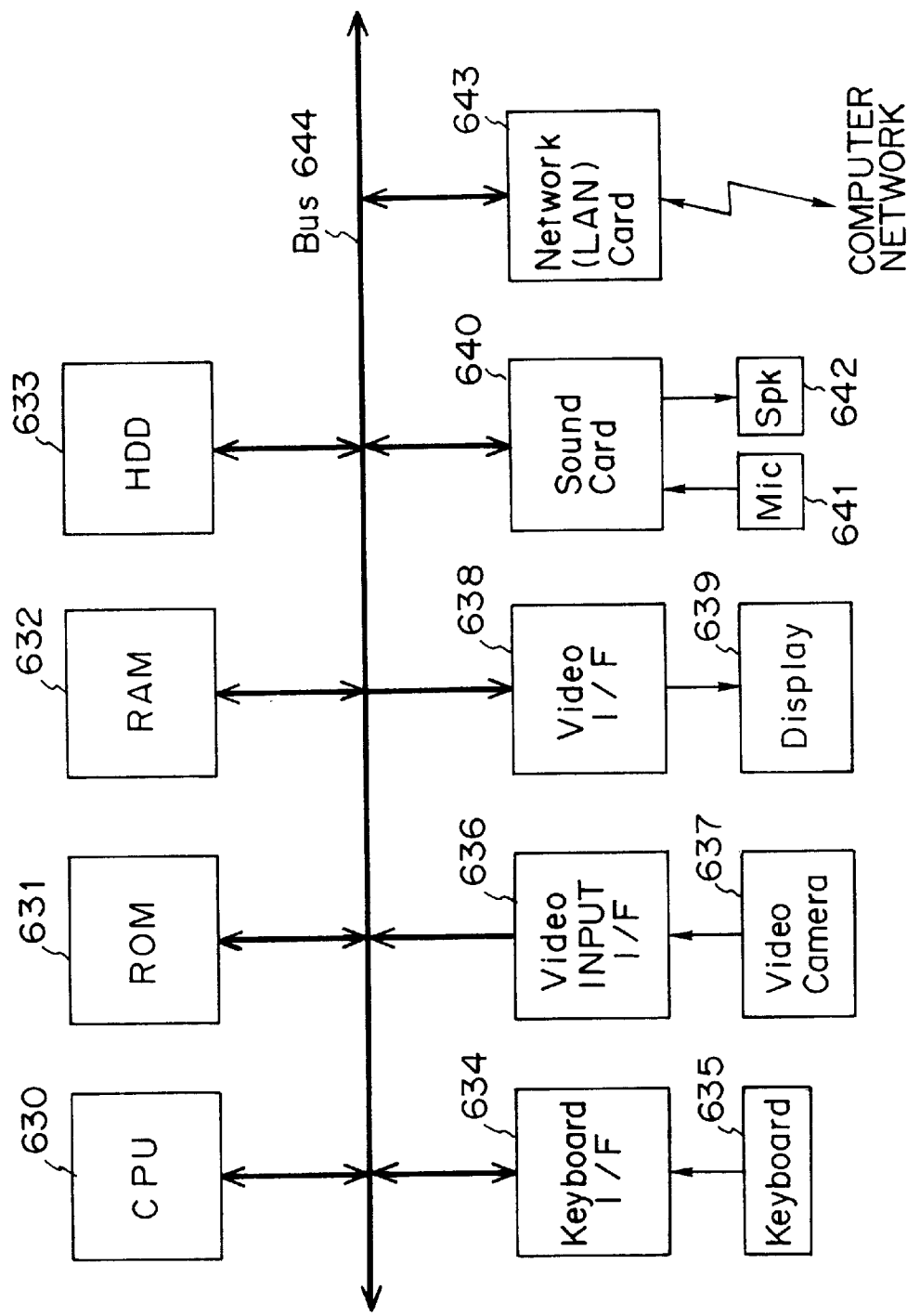
FIG. 14 shows the configuration of the hardware of the computer with the configuration shown in FIGS. 12 and 13.

FIG. 14 shows the configuration of the hardware of the computer with the configuration shown in FIGS. 12 and 13.

As the configuration of a computer, a CPU 630 is normally connected to a bus 644 to issue an instruction to another component connected to the bus 644. A ROM 631 stores an I/O system, etc. A RAM 632 stores application programs such as an OS, an agent, etc. in an executable form. A hard disk 633 is a storage medium for storing application programs, etc. A keyboard 635 interface 634 and a keyboard connected thereto are provided to input an instruction from a user of the computer. A video input interface 636 and a video camera 637 connected thereto are provided to input animation. A video interface 638 and a display 639 provide a user with various information and display received animation. A sound card 640 and a microphone 641 connected thereto, and a speaker 642 are provided to input/output voice signals. A network (LAN) card 643 is provided for connection to a computer network through which voice data and animation data are transmitted and received. Each of the components is connected to the bus 644 and controlled by the CPU 630.

Figure 15:
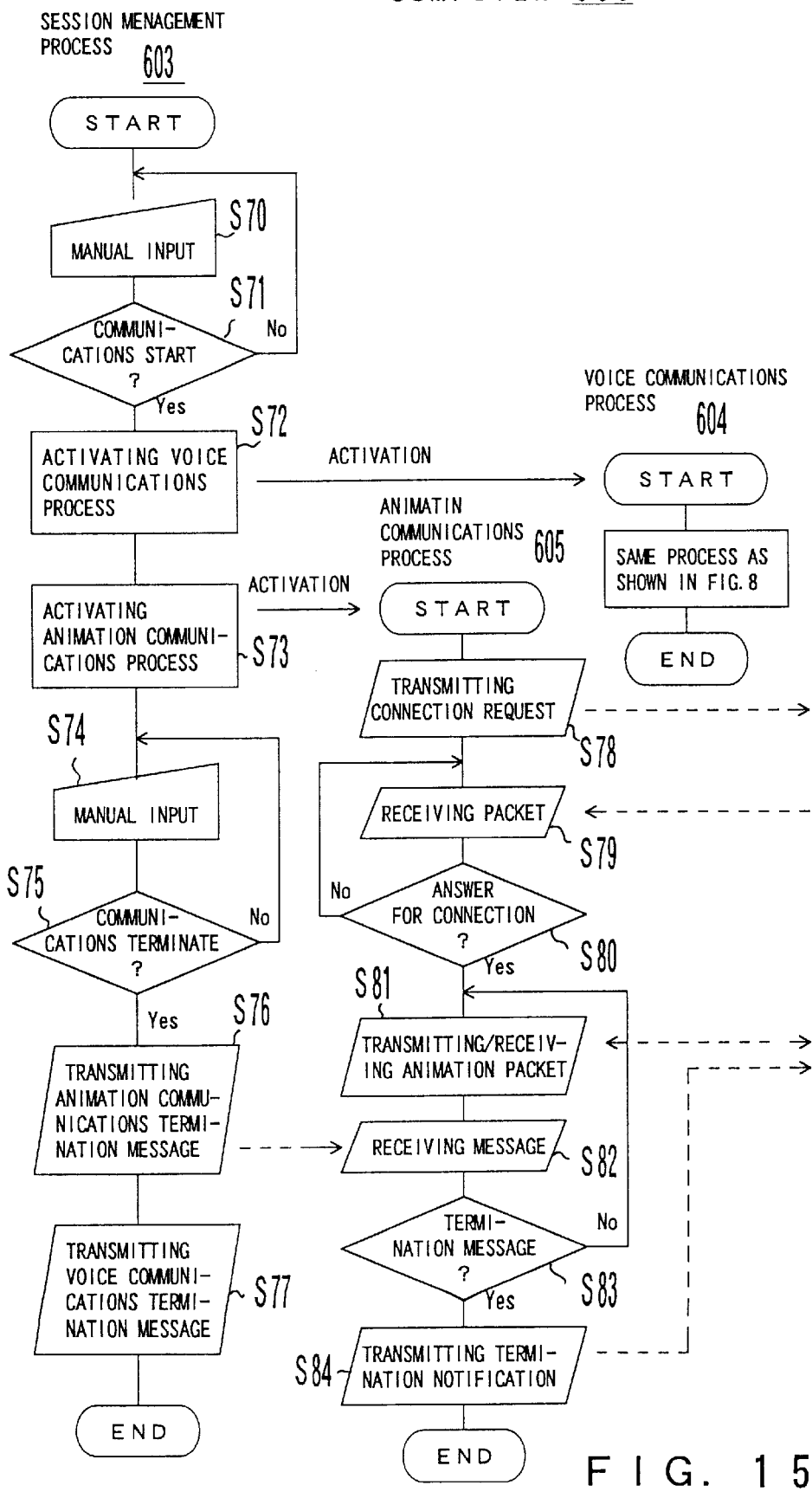
FIG. 15 is a flowchart (1) of the processes performed by the computer and the computer center shown in FIG. 12.
Figure 16:
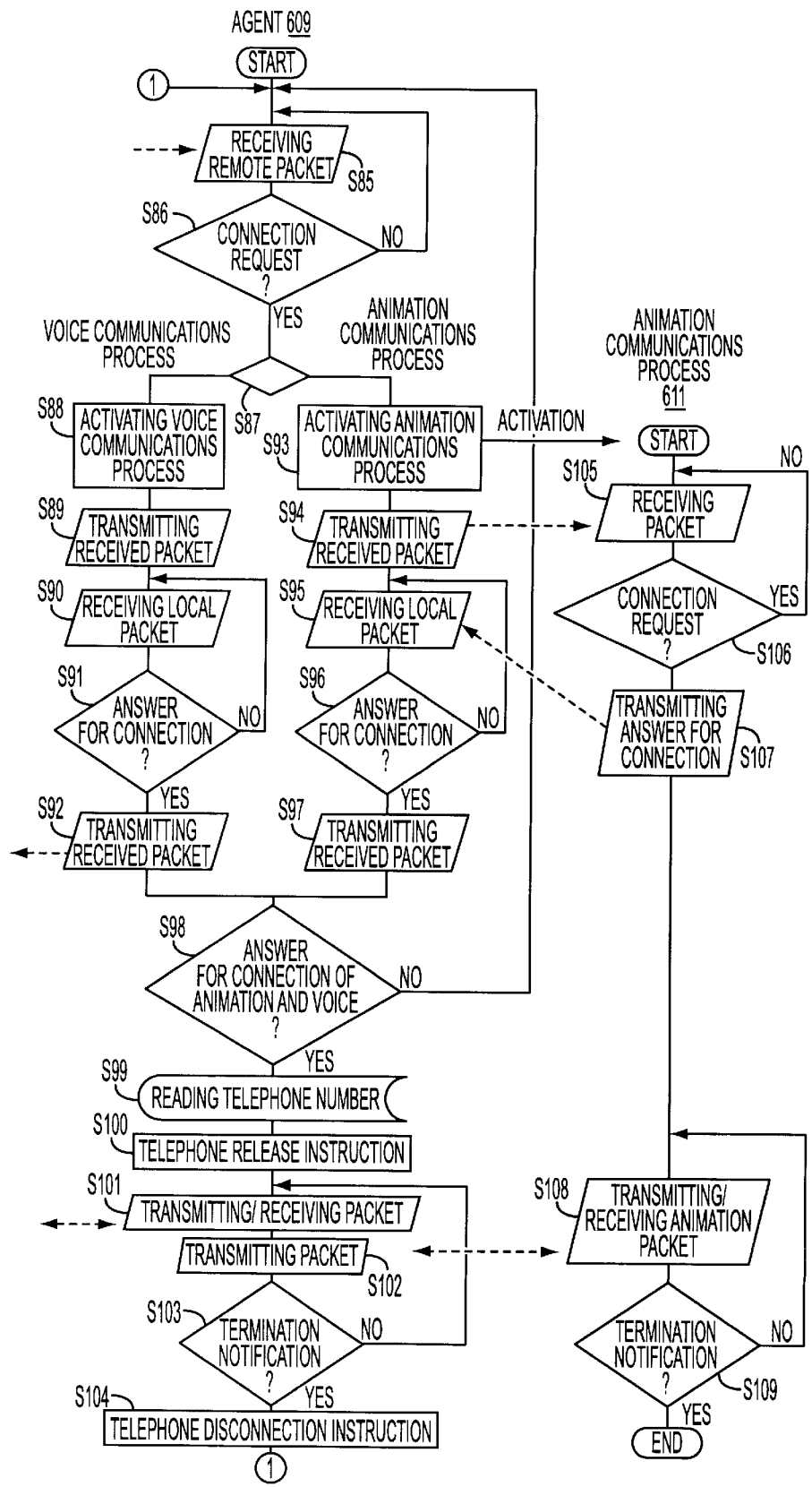
FIG. 16 is a flowchart (2) of the processes performed by the computer and the computer center shown in FIG. 12.

FIGS. 15 and 16 show the process flow on the computer side and the computer center side shown in FIG. 12.

FIG. 15 is a flowchart of the session management process 603 and the animation communications process 605 of the computer 600. Since the flowchart of the voice communications process 604 is the same as that of the animation communications process of the computer shown in FIG. 7, the descriptions and the related drawings are omitted here.

When the session management process 603 starts the process, an input is awaited from a user in step S70. When any input is received, it is determined in step S71 whether or not it is an instruction to start communications. If it is not an instruction to start communications, processing is returned to step S70 to wait for a communications start instruction. If it is determined in step S70 that an input instruction is a communications start instruction, then the voice communications process 604 is activated in step S72, and an animation communications process is activated in step S73. In FIG. 15, the flow of the voice communications process 604 is omitted.

When the processes are activated, the session management process 603 awaits an input from a user (step S74). When any input is received, it is determined in step S75 whether or not it is an instruction to terminate communications. If it is not an instruction to terminate communications, processing is returned to step S74 to wait for a communications termination instruction. If it is determined in step S75 that an input instruction is a communications termination instruction, then processing is passed to step S76 and an animation communications termination message is transmitted to the animation communications process 605. In step S77, a voice communications termination message is transmitted to the voice communications process 604. After the transmission, the process terminates.

The animation communications process 605 is activated by the session management process 603 in step S73. When it is activated, a connection request is transmitted to the agent 609 of the computer center 601 in step S78. In step S79, the process awaits a packet to be received. If any packet is received, it is determined in step S80 whether or not the packet contains an answer to a connection request. If it is not an answer to a connection request, then processing is returned to step S79, and the process is repeated until an answer for a connection request arrives. If it is determined in step S80 that the received packet contains an answer for a connection request, an animation packet is transmitted or received in step S81. In step S82, a message from the session management process 603 is awaited, and it is determined in step S83 whether or not a received message is a termination message. If it is not a termination message, processing is returned to step S81 to continue transmitting and receiving an animation packet. If it is determined in step S83 that the packet contains a termination message, then a termination notification is transmitted in step S84 to the agent 609 of the computer center 601, thereby terminating the process.

The processes of the voice communications process 604 are not explained here because they are similar to the processes shown in FIG. 7.

FIG. 16 is a flowchart showing the processes performed by the agent 609 and the animation communication process 611 of the computer center 601 shown in FIG. 12.

When the agent 609 is activated, it awaits a remote packet containing a connection request from the voice communications process 604 or the animation communications process 605 of the computer 600 in step S85. When a remote packet is received, it is determined whether or not the packet contains a connection request (step S86). If the packet does not contain a connection request, then processing is returned to step S85 and a remote packet containing a connection request is awaited.

When a remote packet contains a connection request in step S86, it is determined in step S87 whether the connection request is received from a voice communications process or an animation communications process. If it is received from a voice communications process, then the voice communications process 610 of the computer center 601 is activated in step S88, and the received packet is transmitted to the voice communications process 610 in step S89. In step S90, a local packet from the voice communications process 610 is awaited. When a local packet is received, it is determined in step S91 whether or not the packet contains an answer to the connection request. If the packet does not contain an answer for connection, then processing is returned to step S90 and an answer for connection is awaited. If it is determined in step S91 that the packet contains an answer for connection, the received packet (answer for connection) is transmitted to the voice communications process 604 (step S92).

In step S98, it is determined whether or not an answer for connection has been received for animation and voice. In the present case, the determination is 'No', and processing is returned to step S85 and a remote packet from the animation communications process 605 is awaited.

If a connection request is received in step S85, the determination in step S86 is 'Yes', and it is determined that a connection request is received from the animation communications process 605 (step S87), then the animation communication process 611 is activated in step S93. A packet received in step S94 is transmitted to the animation communication process 611, and a local packet from the animation communication process 611 is awaited in step S95. When a local packet is received, it is determined whether or not it contains an answer for connection (step S96). If it does not contain an answer for connection, then processing is returned to step S95 and an answer for connection is awaited. If the received local packet contains an answer for connection, the local packet is transmitted to the animation communications process 605 of the computer 600 (step S97).

It is determined in step S98 whether or not an answer for connection has been issued for both animation and voice. Since the answer has been issued, processing is passed to step S99. In step S99, a telephone number is read from the telephone number storage unit 608. In step S100, an instruction to issue a telephone call is transmitted to the network control unit 612. In step S101, a packet is transmitted to and received from the computer 600. When a packet is received, it is transferred in step S102 to the animation communication process 611. At this time, if a packet contains voice data, it is transferred to the voice communications process 610 (not shown in the attached drawings). In step S103, it is determined whether or not the packet contains a termination notification. If it does not contain a termination notification, processing is returned to step S101, and a packet is transmitted and received. In step S102, a packet received from the animation communication process 611 or the voice communications process 610 not shown in the attached drawings is transmitted to the computer 600 when processing is returned to step S101. If a packet received in step S103 contains a termination notification, then a telephone disconnection instruction is transmitted to the network control unit 612 in step S104, and processing is returned to step S85 in preparation for the next session.

When the animation communication process 611 is activated by the agent 609 in step S93, it awaits a packet from the agent 609 in step S105. When the animation communication process 611 receives a packet, it is determined in step S106 whether or not the packet contains a connection request. If the packet does not contain a connection request, then processing is returned to step S105 and a connection request is awaited. If it is determined in step S106 that the packet contains a connection request, then an answer to the connection request is transmitted to the agent 609 in step S107. In step S108, an animation packet is transmitted to and received from the agent 609.

It is determined whether or not the packet received in step S108 contains a termination notification (step S109). If the packet does not contain a termination notification, then processing is returned to step S108 and an animation packet is continuously transmitted and received. If it is determined that the packet received in step S109 contains a termination notification, then the process terminates.

The voice communications process 610 is similar to the animation communication process 611 shown in FIG. 16 except that the transmitted or received packet is a voice packet. Therefore, the related drawings and descriptions are omitted here.

FIG. 17 is a flowchart showing the process of transmitting/receiving a packet in step S101 shown in FIG. 16.

When the process starts, a remote packet is awaited in step S110. Passing to step S111, it is determined whether or not a packet has been received, and if a packet has been received, then it is determined in step S112 whether the received packet is a voice packet or an animation packet. If it is a voice packet, then the packet is transmitted to the voice communications process 610 and the process terminates in step S113. If it is an animation packet, then the packet is transmitted to the animation communication process 611 and the process terminates in step S114.

If no packets are received in step S111, a local packet is awaited in step S115. In step S116, it is determined whether or not any packet has been received. If no packets have been received, processing is returned to step S110. If a packet is received in S116, it is determined in step S117 whether the received packet is a voice packet or an animation packet. If it is a voice packet, the packet is transmitted to the voice communications process 604 of the computer 600 in step S118. If it is an animation packet, the packet is transmitted to the animation communications process 605 of the computer 600 in step S119 and the process terminates.

Figure 18:
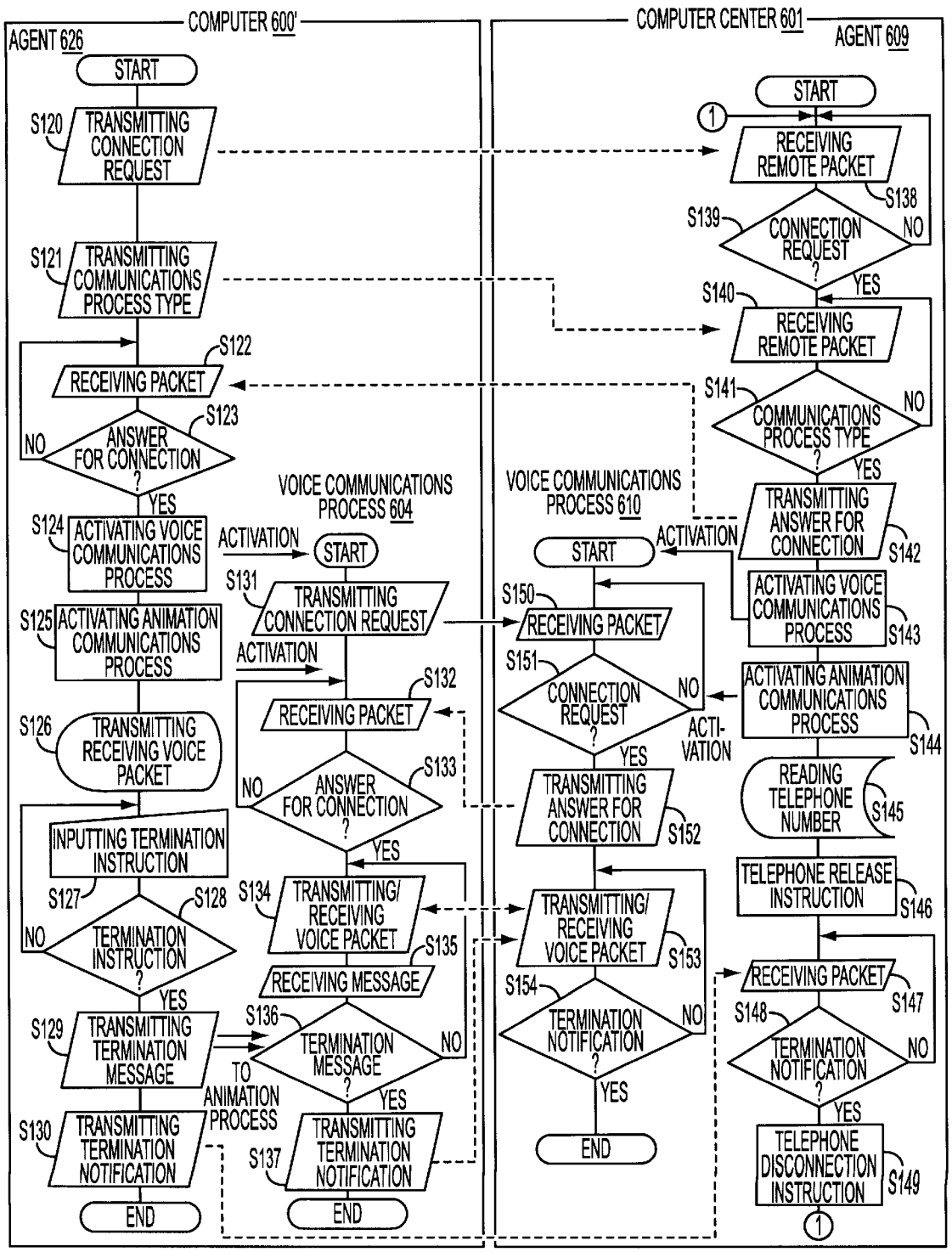
FIG. 18 is a flowchart showing the communications process between the computer and the computer center shown in FIG. 13.

FIG. 18 is a flowchart showing the communications process between the computer and the computer center shown in FIG. 13.

In FIG. 18, the animation communications processes in the computer and the computer center are similar to the voice communications process respectively in the computer and the computer center. Therefore, the related drawings and the descriptions are omitted here.

When the agent 626 of the computer 600' is activated by a user and a connection request instruction is input, the connection request is transmitted to the agent 609 of the computer center 601 in step S120. It is assumed that the agent 609 of the computer center 601 is preliminarily activated.

When a connection request is transmitted in step S120, the type of communications process is transmitted to the agent 609 of the computer center 601 in step S121. In step S122, a packet from the agent 609 of the computer center 601 is awaited, and it is determined whether or not the packet received in step S123 contains an answer for connection. If the packet does not contain an answer for connection, then processing is returned to step S122 and an answer for connection is awaited. If it is determined in step S123 that the received packet contains an answer to the connection request, then the voice communications process 604 is activated in step S124 and the animation communications process 605 is activated in step S125. The animation communications process 605 is not shown in the attached drawings.

In step S126, the display screen of the computer 600' shows that communications can be established, and a termination instruction from the user is awaited in step S127. It is determined in step S128 whether or not a termination instruction has been input. If no termination instructions have been input, processing is returned to step S127, and a termination instruction is awaited. If it is determined in step S128 that a termination instruction has been input, then a termination message is transmitted to the voice communications process 604 and the animation communications process 605 in step S129, and a termination notification is transmitted to the agent 609 of the computer center 601 in step S130.

When the voice communications process 604 is activated by the agent 626 in step S124, it transmits a connection request to the voice communications process 610 of the computer center 601 in step S131.

The voice communications process 604 awaits a packet from the voice communications process 610 in step S132. When it receives a packet, it is determined in step S133 whether or not the packet contains an answer for connection. If the packet does not contain an answer for connection, processing is returned to step S132 and an answer for connection is awaited. If it is determined in step S133 that the packet contains an answer for connection, then a voice packet is transmitted to and received from the voice communications process 610 of the computer center 601 in step S134. In step S135, a message from the agent 626 in the computer 600' is awaited, and it is determined in step S136 whether or not the received message is a termination message. If it is not a termination message, processing is returned to step S134, and voice packets are transmitted and received. If it is determined in step S136 that the received message is a termination message, then a termination notification is transmitted in step S137 to the voice communications process 610 of the computer center 601. Thus, the process terminates.

On the other hand, when the agent 609 of the computer center 601 is activated, it awaits a remote packet from the agent 626 of the computer 600' in step S138. When it receives a remote packet, it is determined in step S139 whether or not the packet contains a connection request. If the packet does not contain a connection request, then processing is returned to step S138 and a remote packet is awaited. If it is determined in step S139 that the received remote packet contains a connection request, then a remote packet from the agent 626 is awaited in step S140. When a remote packet is received, it is determined in step S141 whether or not the packet contains the information about the type of communications process. If it does not contain the information about the type, processing is returned to step S140, and a remote packet is awaited.

If it is determined in step S141 that the packet contains the information about the type of communications process, then an answer to the connection request is transmitted to the agent 626 of the computer 600' in step S142. Then, the voice communications process 610 is activated in step S143, and the animation communication process 611 (not shown in the attached drawings) is activated in step S144. In step S145, a telephone number is read from the telephone number storage unit 608, and a telephone call issue instruction is issued to the network control unit 612 (step S146).

In step S147, a packet from the agent 626 of the computer 600' is awaited. When a packet is received, it is determined in step S148 whether or not the packet contains a termination notification. If the packet does not contain a termination notification, then processing is returned to step S147 and another packet is awaited. If it is determined in step S148 that the received packet contains a termination notification, then a telephone disconnection instruction is issued to the network control unit 612 (step S149), and processing is returned to step S138 in preparation for the next session.

When the voice communications process 610 is activated by the agent 609 in step S143, it awaits a packet from the voice communications process 604 of the computer 600' in step S150. When a packet is received, it is determined in step S151 whether or not the packet contains a connection request. If the packet does not contain a connection request, then processing is returned to step S150 and a packet is awaited. If it is determined in step S151 that the received packet contains a connection request, then an answer to the connection request is transmitted to the voice communications process 604 in step S152. In step S153, a voice packet is transmitted to and received from the computer 600'. In step S154, it is determined whether or not the transmitted voice packet contains a termination notification. If the packet does not contain a termination notification, then processing is returned to step S153, and a voice packet is transmitted and received. If it is determined in step S154 that the received packet contains a termination notification, then the process terminates.

Figure 19:
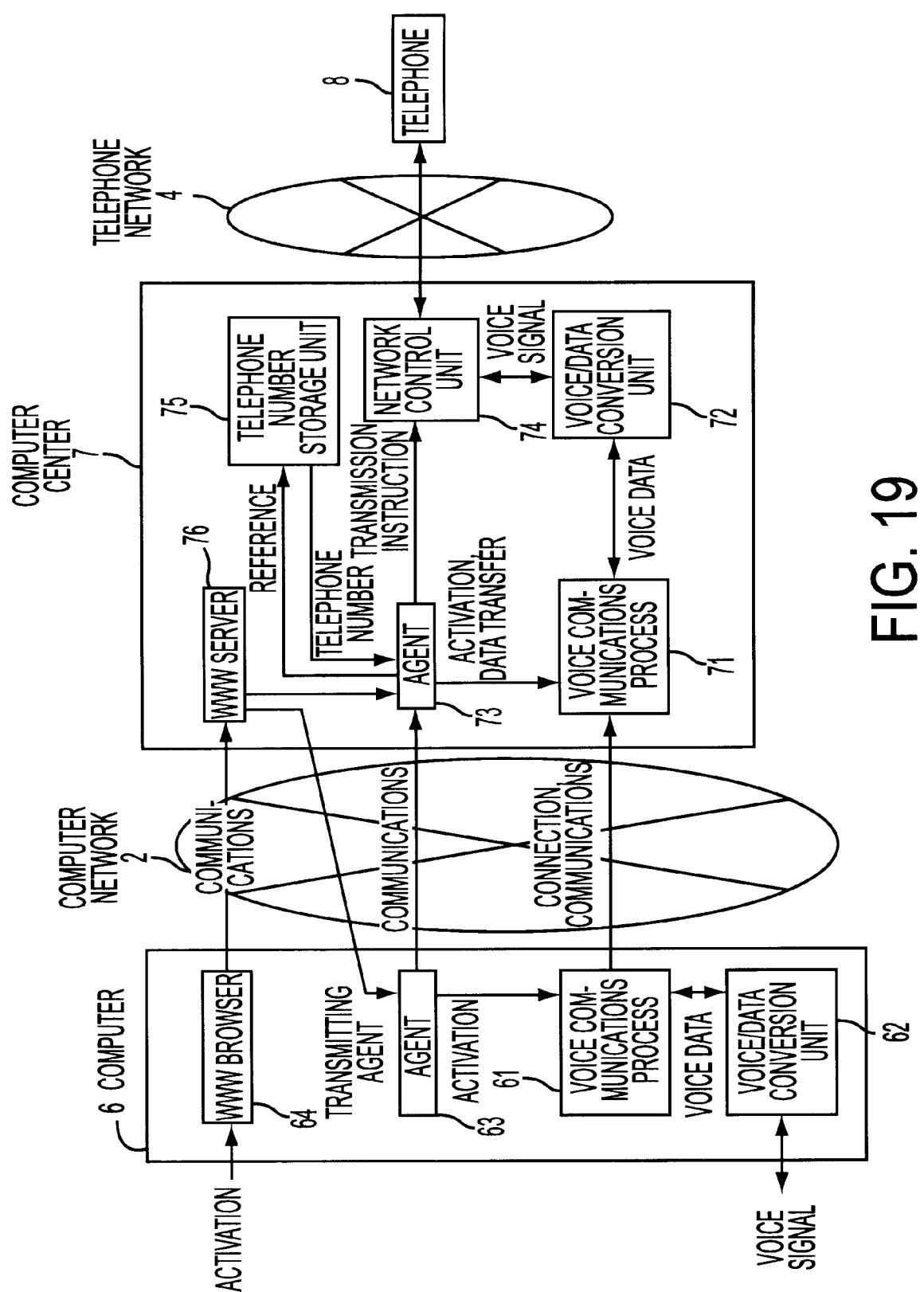
FIG. 19 shows the configuration according to an embodiment of the third, fifteenth, and eighteenth aspects of the present invention.

FIG. 19 shows the configuration according to an embodiment of the third, fifteenth, and eighteenth aspects of the present invention. In FIG. 19, voice communications are established between one computer and a computer center comprising another computer.

In FIG. 19, the computer 6 comprises the voice communications process 61, the voice/data conversion unit 62, the agent 63, and a WWW (World Wide Web) browser 64. The computer center 7 comprises the voice communications process 71; the voice/data conversion unit 72, the agent 73, the network control unit 74, the telephone number storage unit 75, and a WWW (World Wide Web) server 76.

The WWW browser 64 transmits a specific instruction to establish voice communications to the WWW server 76. Upon receipt of the specific instruction from the WWW browser 64, the WWW server 76 transmits to the computer 6 the agent 63 to be activated in the computer 6, and activates the agent 73 in the computer center 7. The agent 63 transmitted from the WWW server 76 and activated in the computer 6 activates the voice communications process 61.

Figure 20:
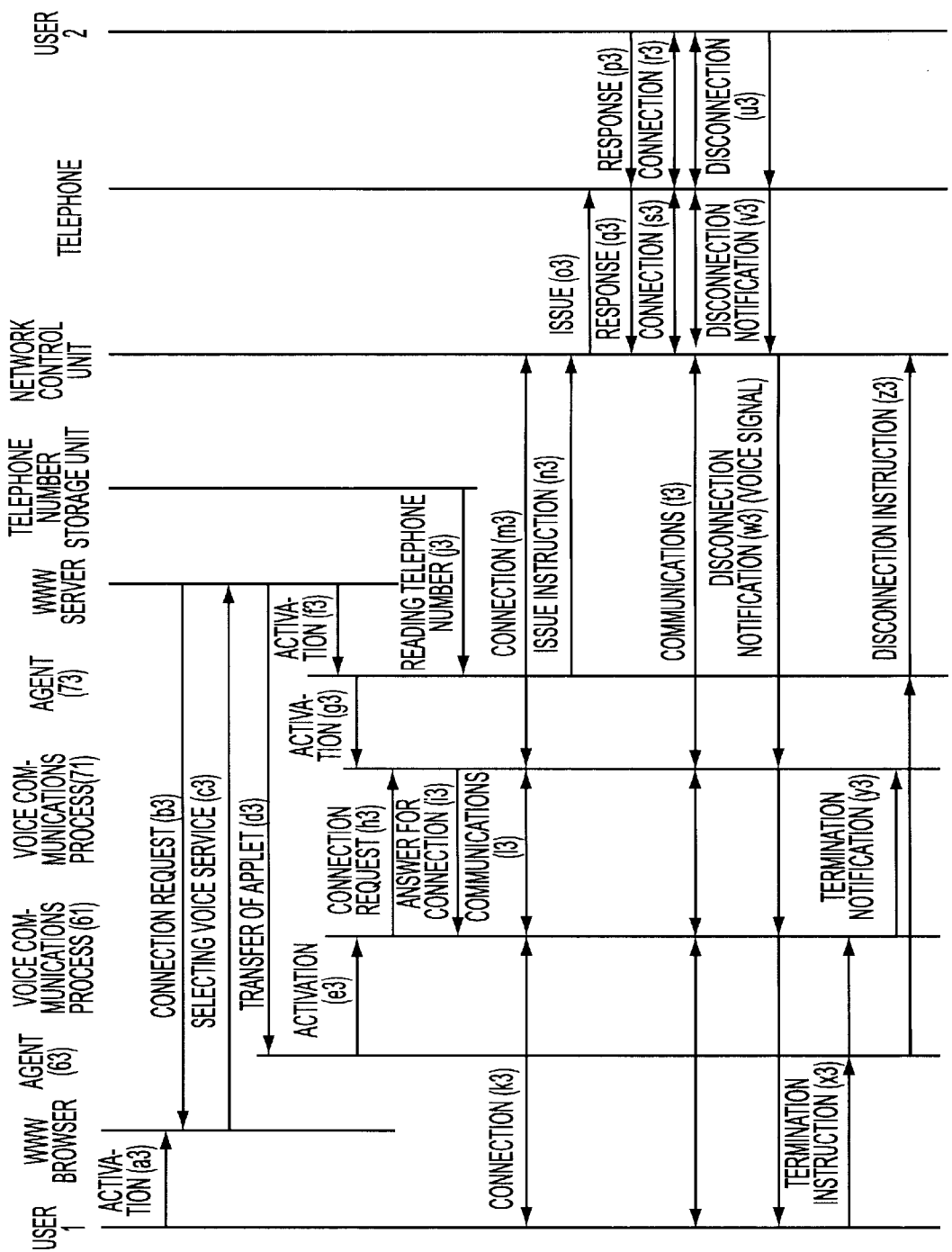
FIG. 20 shows the sequence of the operations with the configuration shown in FIG. 19.

FIG. 20 shows the sequence of the processes performed when the user U1 of the source subscriber's computer 6 calls up the user U2 of the telephone 8 with the configuration shown in FIG. 19.

First, the user U1 activates the WWW browser 64 (a3), the WWW browser 64 transmits a connection request to the WWW server 76 (b3), and a selection instruction is transmitted by selecting a voice service from among the menu items (c3). Then, the agent 63 is transmitted from the WWW server 76 to the user computer 6 and is activated (d3). This agent 63 is described in, for example, Java, and is transferred as an applet.

The agent 63 activates the voice communications process 61 (e3) and the WWW server 76 activates the agent 73 through the mechanism such as a CGI (common gateway interface), etc. (f3). The subsequent sequence (g3 through z3) is similar to the sequence e2 through x2 shown in FIG. 9.

Figure 21A:
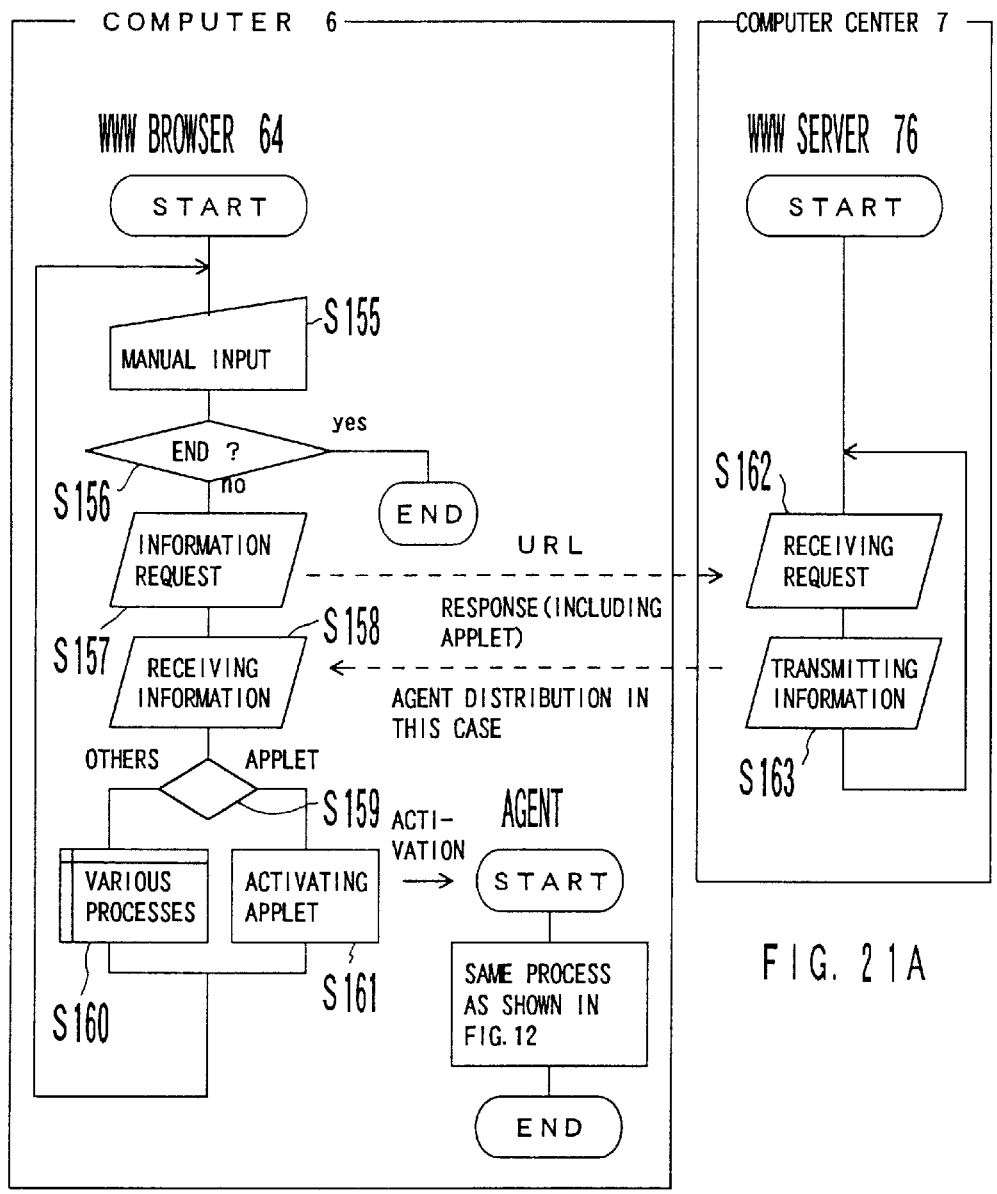
FIG. 21A is a flowchart showing the processes performed by the computer and the computer center according to the embodiment shown in FIG. 19.

FIG. 21A is a flowchart showing the process flow on the computer side and the computer center side according to the embodiment shown in FIG. 19.

FIG. 21A shows the processes of the WWW browser and the WWW server. Since the processes of other components are similar to the processes shown in FIG. 11, the drawings and the related descriptions are omitted here. The flowchart in FIG. 21A describes the minimal components required in understanding the present embodiment. Much more process steps are provided in actual cases.

It is assumed that the WWW browser 64 is activated in the computer 6 and accesses the WWW server of the computer center 7. The WWW browser 64 awaits an input from the user in step S155. If any instruction is input from the user, it is determined in step S156 whether or not it is a termination instruction.

If it is determined in step S156 that the input in step S155 is a termination instruction, then the process terminates. If it is determined in step S156 that it is not a termination instruction, an information request is transmitted to the WWW server 76 in step 157. The information request is issued to request for various communications parameters, etc. for connection of the computer 6 to the telephone 8 through the computer center 7. The information contains a request for an agent to be transmitted as an applet from the computer center 7. To be more common, the information refers to common input from a user of the WWW browser 64. For example, when an icon is selected from the home page of the WWW server 76 through the WWW browser 64, the URL, etc. of the icon is transmitted and the information required for the communications with the destination specified by the selected icon is received.

When an information request is issued in step S157, the information from the WWW server 76 is awaited in step S158. When information is received, then it is determined in step S159 whether the received information relates to an agent transmitted as an applet or other information. If the information relates to other descriptions than the agent, then various processes are performed in step S160 according to the received information. Then, processing is returned to step S155. Since the contents of the processes are not directly associated with understanding the present embodiment, the descriptions are omitted here. If it is determined in step S159 that the received information is an applet, the applet is activated in step S161, and processing is returned in step S155.

Since an agent is transmitted as an applet according to the present embodiment, the agent is activated in step S161. Since the contents of the processes of the agent are similar to those shown in FIG. 11, the drawings and the descriptions are omitted here.

In the computer center 7, the WWW server 76 is activated, and a request from the user of the WWW browser 64 is awaited in step S162. When a request is received in step S162, the information about the request is transmitted to the WWW browser 64 in step S163. According to the present embodiment, since a request for connection to the telephone 8 is issued, an agent to be activated in the computer 6 is transmitted as an applet. At this time, the WWW server 76 awaits an information request from the WWW browser 64 back in step S162.

The processes performed by the WWW browser 64 and the WWW server 76 are described above, and the subsequent connection processes to the telephone 8 are performed by an agent, etc. not shown in the attached drawings. The process flow is described above by referring to the embodiments of the present invention. For example, the process shown in FIG. 11 is performed.

Figure 21B:
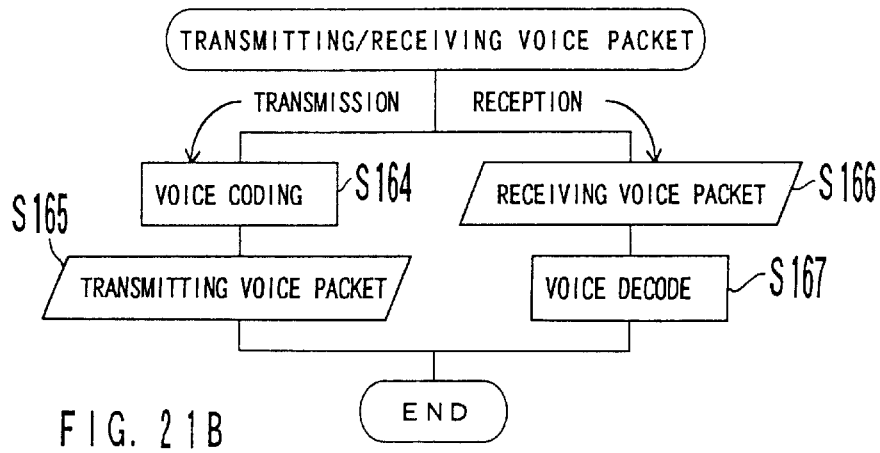
FIG. 21B is a flowchart showing the process of transmitting and receiving a voice packet according to the above described embodiments.

FIG. 21B shows the flow of the processes performed to transmit and receive voice packets described in the explanation of the embodiments.

The process of transmitting and receiving a voice packet is divided into two steps depending on whether an event of receiving a voice packet occurs at the first stage or an event of transmitting a voice packet occurs at the first stage.

When a voice packet is transmitted, voice data is encoded in step S164 and transmitted in step S165, and then the process terminates.

When a voice packet is received, it is received in step S166 and decoded in step S167, and then the process terminates.

Figure 22:
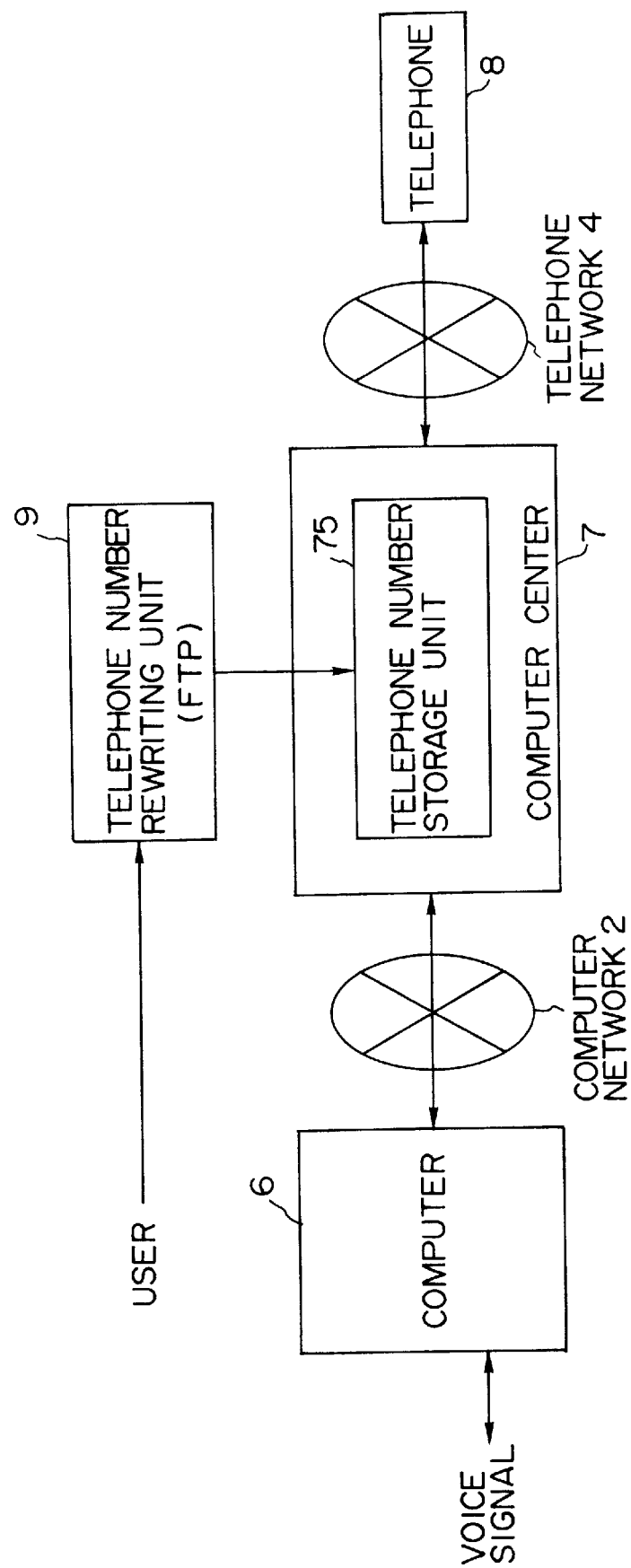
FIG. 22 shows the configuration according to an embodiment of the fourth aspect of the present invention.

FIG. 22 shows the configuration according to an embodiment of the fourth aspect of the present invention. In the fourth aspect of the present invention, a telephone number rewriting unit 9 is provided as shown in FIG. 22.

The configuration of the computer 6 and the computer center 7 shown in FIG. 22 can be any of the configurations shown in FIGS. 4, 8, and 19. The telephone number storage unit 75 is an independent file and updated by being overwritten by the telephone number rewriting unit 9.

An FTP (file transfer protocol) is used in the telephone number rewriting unit 9, but can be substituted by electronic mail, Telnet, etc. If electronic mail is adopted, the telephone number storage unit 75 functions as a file containing text data only, and the contents transmitted through electronic mail are replaced with a file of telephone numbers. In this example, data can be rewritten by the source subscriber, but it is also possible to preliminarily rewrite data by a destination subscriber.

Figure 23:
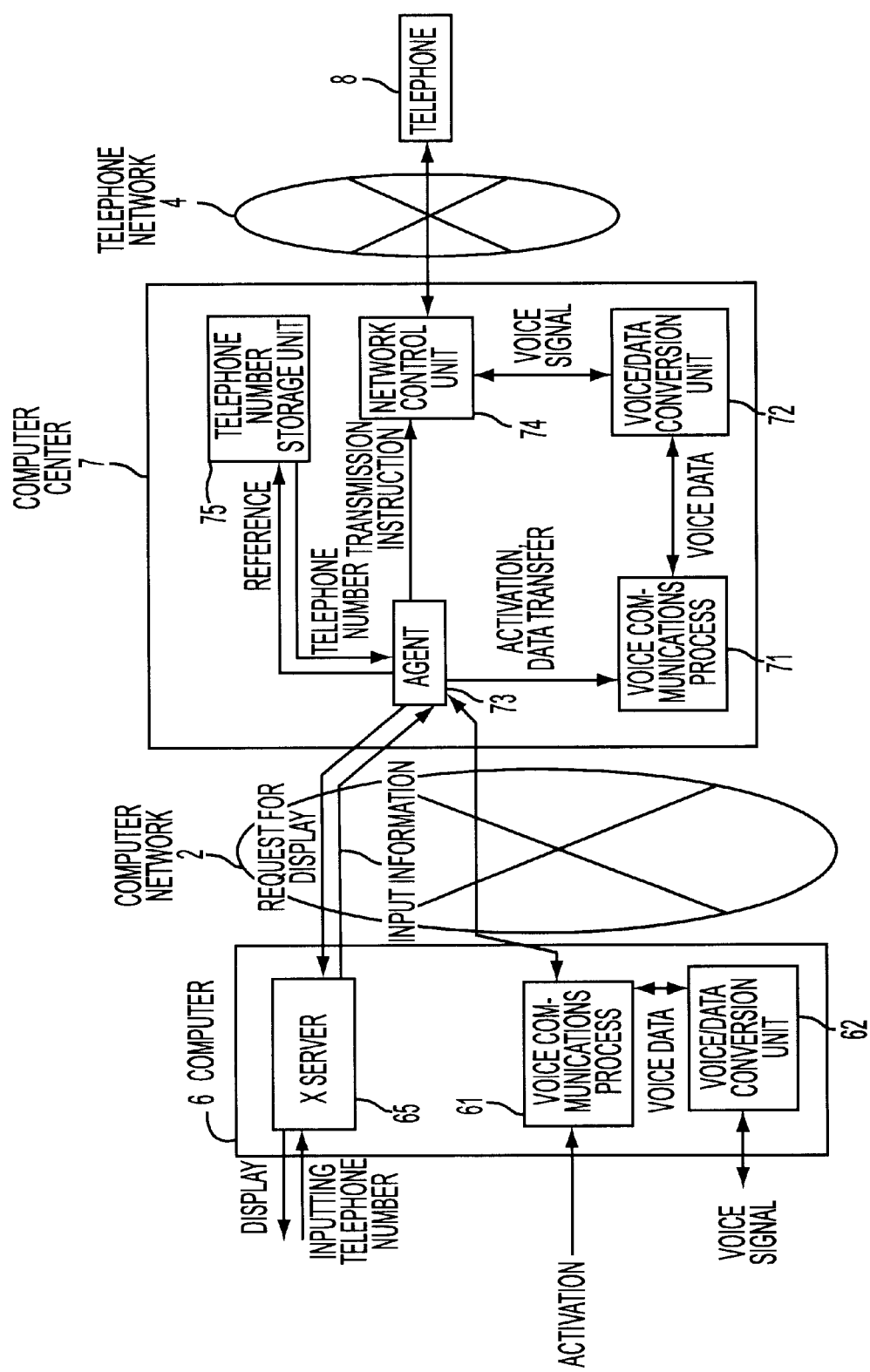
FIG. 23 shows the configuration of an embodiment according to the fifth aspect of the present invention.

FIG. 23 shows the configuration according to an embodiment of the fifth aspect of the present invention. In the fifth aspect of the present invention, a telephone number can be input online through the computer 6 in any of the first through the third aspects of the present invention.

In the example shown in FIG. 23, the operating system (OS) of the computer 6 is UNIX under which the X Window system is operated.

The agent 73 requests an X server 65 of the computer 6 to display a prompt for a telephone number during communications. At this request, the computer 6 opens a display window and transfers to the agent 73 a telephone number input by the user.

The agent 73 temporarily writes the number to the telephone number storage unit 75, reads the telephone number, and instructs the network control unit 74 to call up the telephone 8. In this case, the agent 73 functions as an X client to the X server 65.

Figure 24:
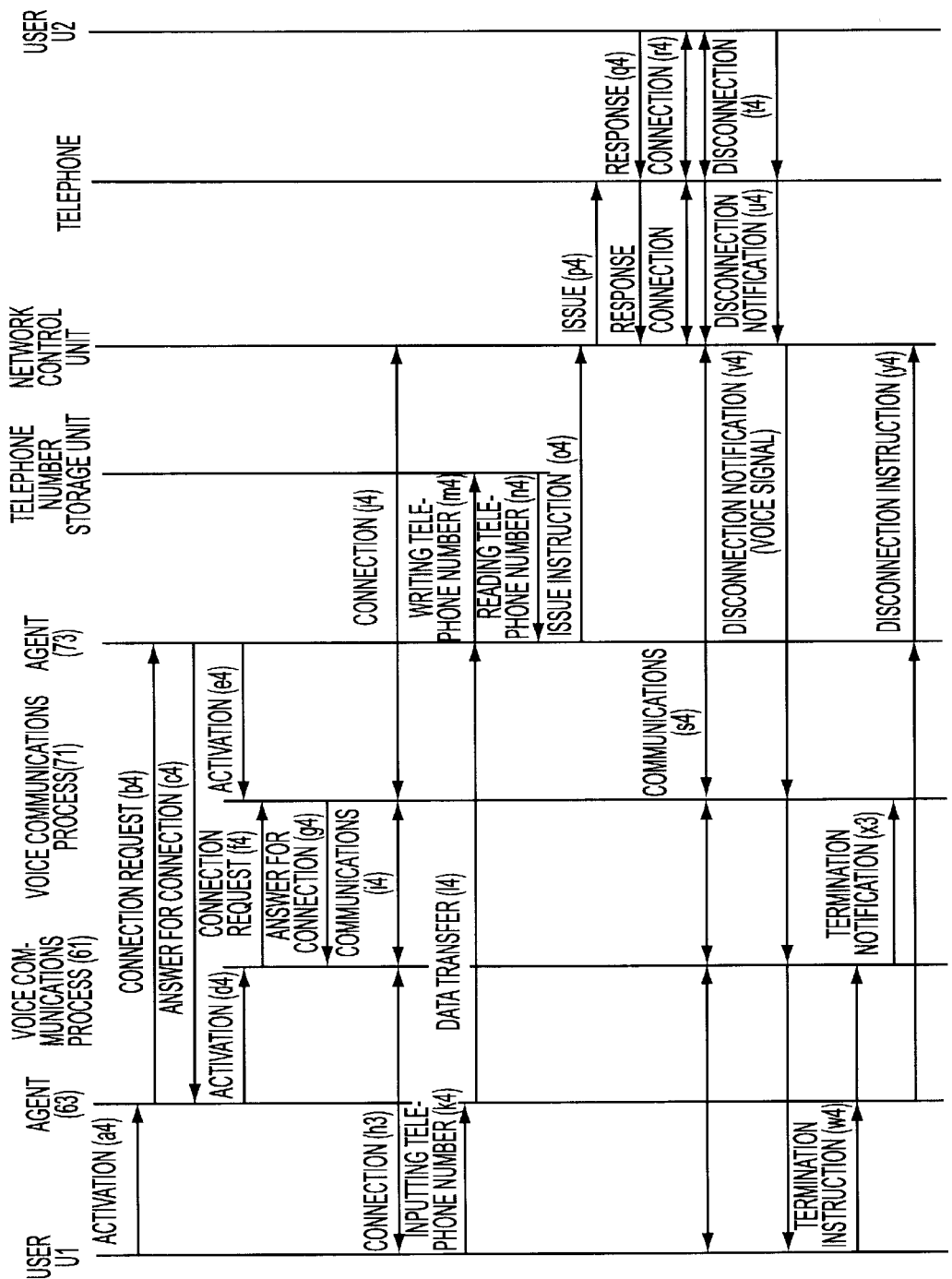
FIG. 24 shows the sequence of the operations with the configuration shown in FIG. 23.

FIG. 24 shows an example of the sequence of the processes when the user U1 of the source computer 6 inputs a telephone number online.

In this example, agents are provided for both the computer 6 (client) and the computer center 7 (server) for communications. Therefore, a telephone number can be input online without a special system such as an X Window system as shown in the example of the configuration shown in FIG. 23.

The sequence from the activation (a4) of an agent of the user U1, the establishment (j4) of a connection and communications from the user U1 to the network control unit 74 shown in FIG. 24 is similar to the sequence of a2 through g2 and i2 through k2 shown in FIG. 9.

When connections and communications from the user U1 to the network control unit 74 are established, the user U1 inputs a telephone number (k4). The agent 63 transfers the input data to the agent 73 (l4), and the agent 73 writes a telephone number to the telephone number storage unit 75 (m4). Furthermore, the agent 73 reads a destination telephone number (n4).

The sequence from the call issue instruction (o4) to the disconnection instruction (y4) of the agent 73 is similar to the sequence of l2 through x2 shown in FIG. 9.

Figure 25:
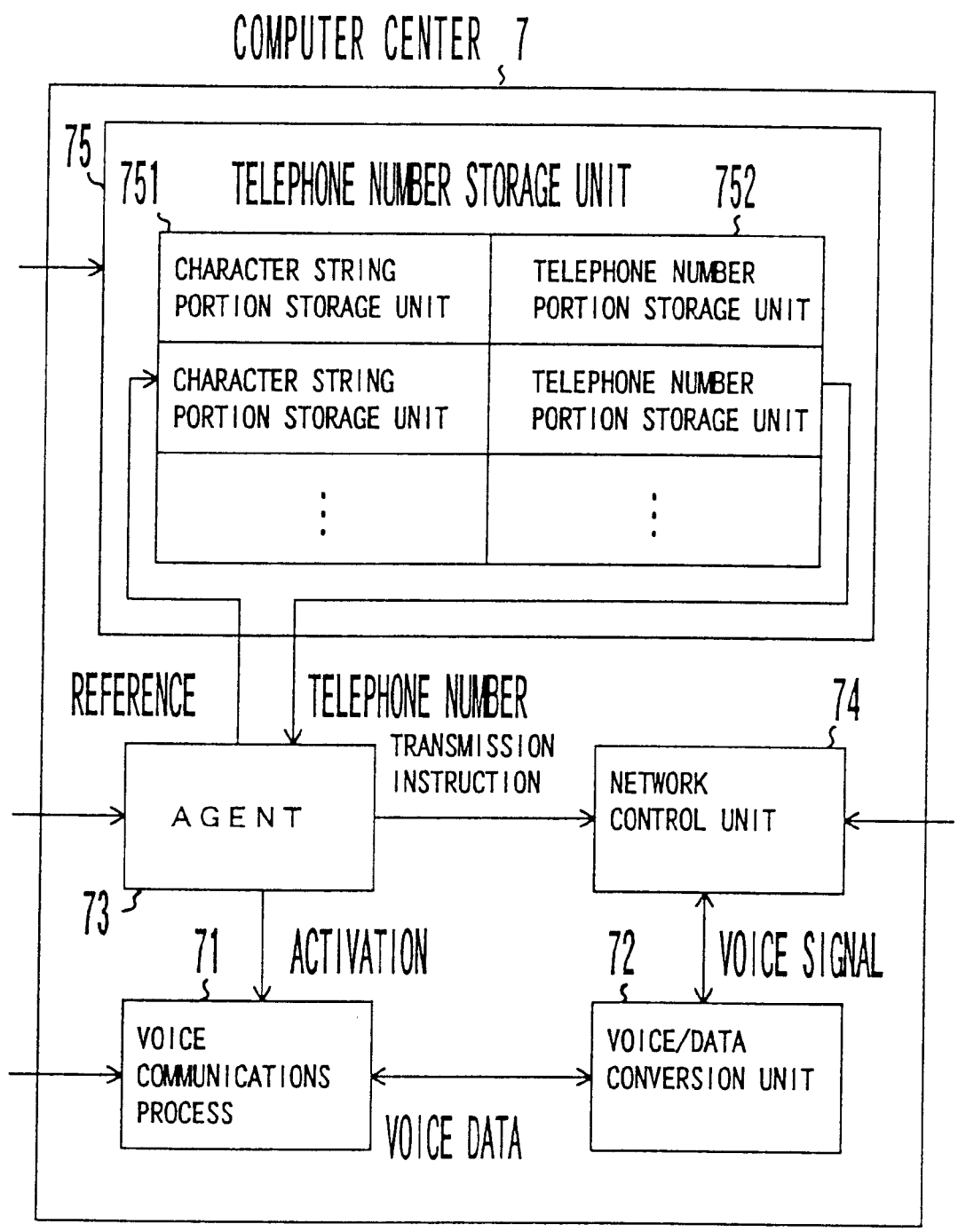
FIG. 25 shows an example of the configuration of the computer center according to an embodiment of the sixth aspect of the present invention.

FIG. 25 shows the configuration according to an embodiment of the sixth aspect of the present invention. In the sixth aspect of the present invention, the telephone number storage unit 75 of the computer center 7 in any of the first through the third aspects of the present invention comprises a character string portion storage unit 751 and a telephone number portion storage unit 752.

When a source subscriber inputs a character string specifying a destination subscriber, the agent 73 converts the input character string into a corresponding telephone number in the telephone number portion storage unit 752 by searching the character string portion storage unit 751, and instructs the network control unit 74 to issue a call to the telephone number.

Figure 26:
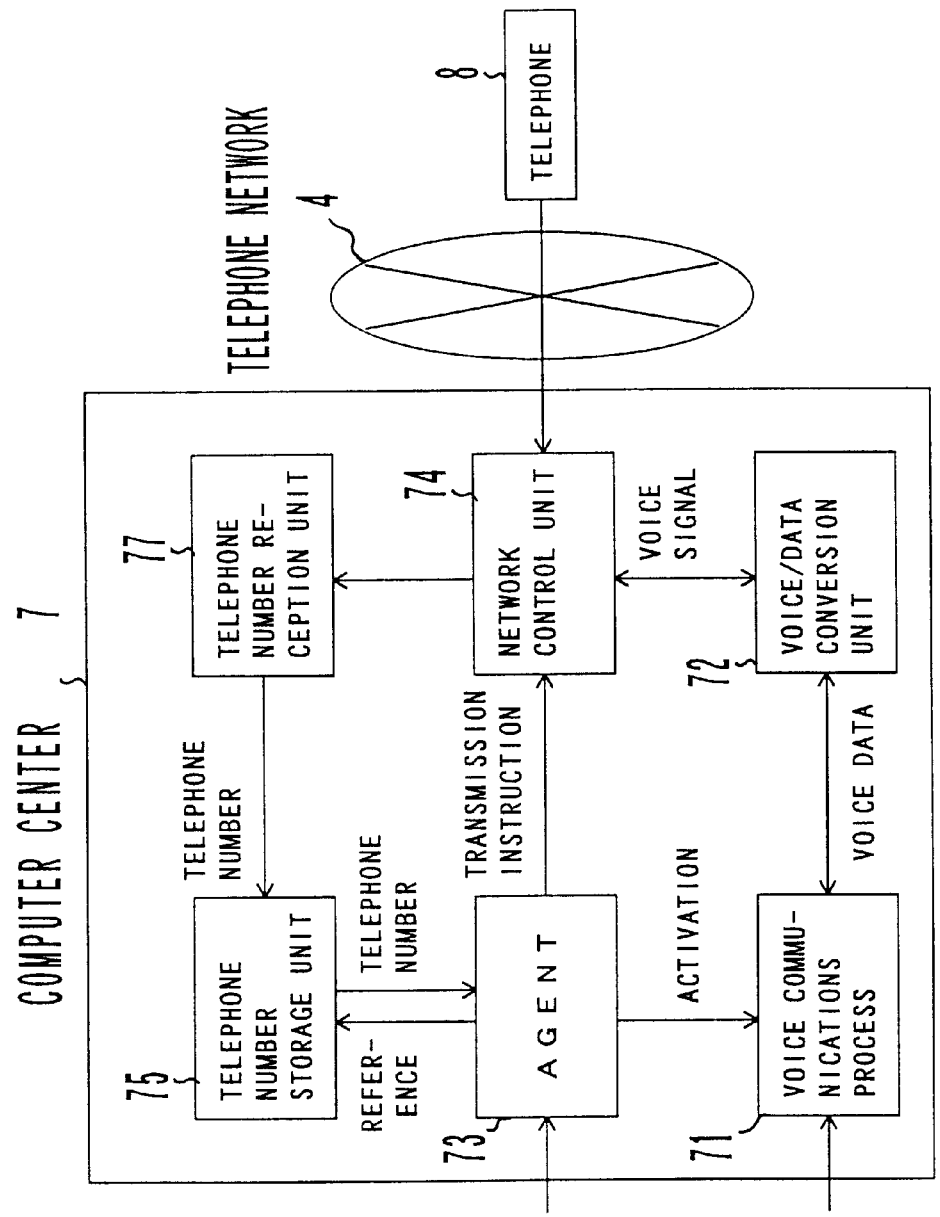
FIG. 26 shows an example of the configuration of the computer center according to an embodiment of the seventh aspect of the present invention.

FIG. 26 shows the configuration according to an embodiment of the seventh aspect of the present invention. In the seventh aspect of the present invention, a telephone number reception unit 77 for receiving a telephone number from the telephone 8 of a user who requests to receive a call from the computer 6 is provided in addition to the configuration of the computer center 7 of any of the first through the third aspects of the present invention.

When the telephone network 4 is based on an analog system, a DTMF receiver is used as the telephone number reception unit 77, a telephone number is input by a push button signal tone (DTMF signal) through the telephone 8, the signal tone is received by a DTMF receiver, and the reception result is written to the telephone number storage unit 75. When the telephone network 4 is a digital telephone network such as an ISDN, etc., the DTMF receiver is replaced with a unit for obtaining source subscriber number notification data to obtain a source subscriber number and write it to the telephone number storage unit 75.

Figure 27:
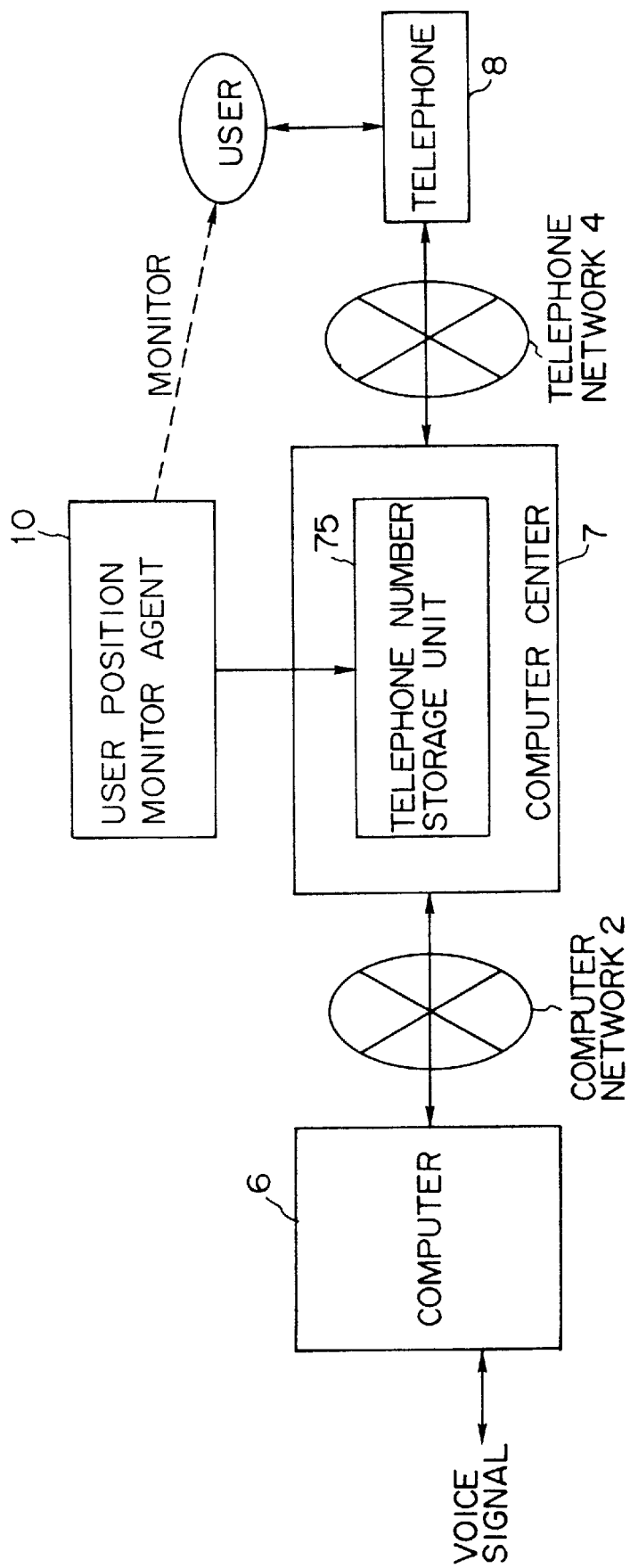
FIG. 27 shows the configuration of an embodiment according to the eighth aspect of the present invention.

FIG. 27 shows the configuration according to an embodiment of the eighth aspect of the present invention. In the eighth aspect of the present invention, a user position monitor agent 10 is provided in addition to the configuration of any of the first through the third aspects of the present invention.

The user position monitor agent 10 monitors the current position of the destination subscriber, and writes a possible destination telephone number to the telephone number storage unit 75. The method of monitoring the position of the user position monitor agent 10 uses, for example, the 'personal communications service distribution control system' (Tokukaihei 08-056263).

Figure 28:
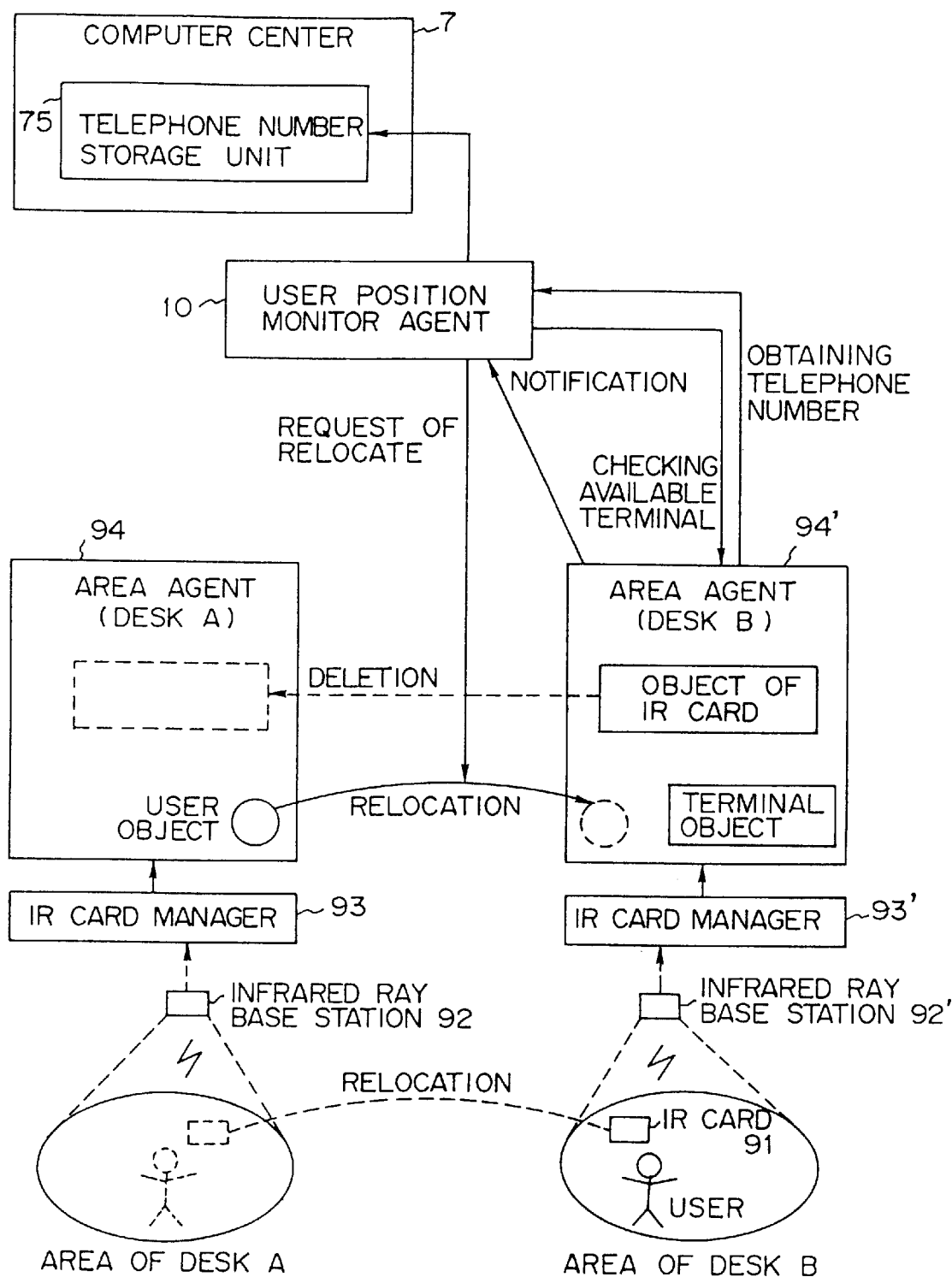
FIG. 28 shows the method of monitoring the position of a user with the configuration shown in FIG. 27.

FIG. 28 shows the operation of the user position monitor agent 10.

For example, assume that a destination subscriber (user) is located in an area within a position control network using an infrared ray (IR), and the user carries an IR card 91 and moves from a desk A to a desk B.

When the infrared ray base station 92' having the desk B as an area detects a new IR card 91, it notifies an IR card manager 93' of the detected card. The IR card manager 93' notifies an area agent (desk B) 94' for managing the area (of the desk B) of the detected card. Each of the area agents 94 and 94' manages a user object and a terminal object in the area.

The area agent 94' of the desk B writes the object of the IR card 91 to itself, and requests the area agent 94 of the desk A to delete data. It also checks the attribute of the IR card 91, and notifies the user position monitor agent 10 of the attribute because the user is registered.

The user position monitor agent 10 detects from the area agent 94' of the desk B that the telephone is provided as an available terminal, and writes the telephone number in the telephone number storage unit 75.

Thus, the user position monitor agent 10 can be informed of the position of a user, an available telephone number, and the existence of a computer.

The above described technology is described in detail in the 'Personal Communications Service Distribution Control System' (Tokukaihei 08-056263), or the 'Study of Mobility Management System in Personal Communications Network DUET' (Technology Report CS94-2 of Electronic Information Communications Association).

Figure 29:
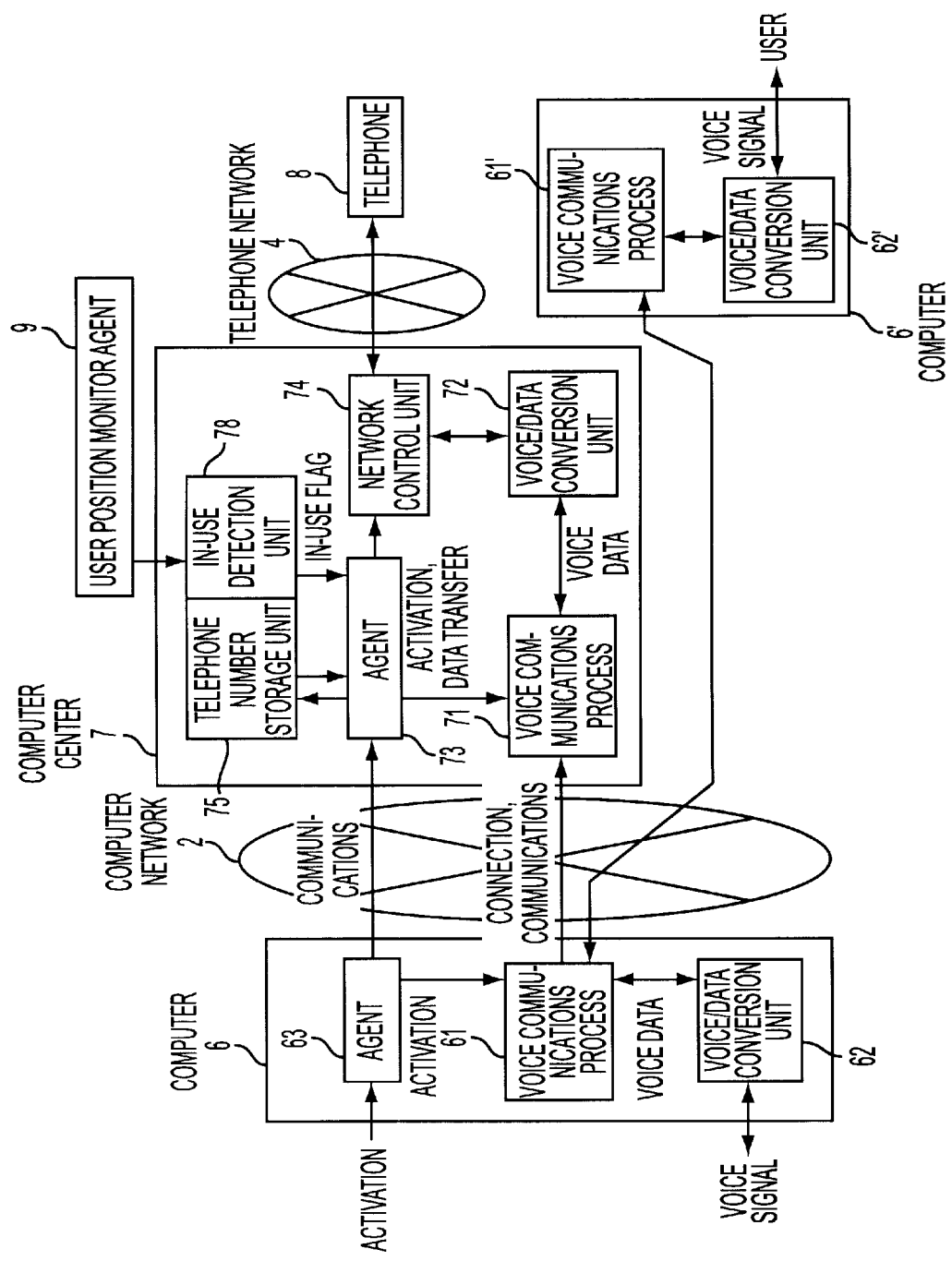
FIG. 29 shows the configuration of an embodiment according to the ninth aspect of the present invention.

FIG. 29 shows the configuration according to an embodiment of the ninth aspect of the present invention. In the ninth aspect of the present invention, an in-use detection unit 78 is provided in addition to the configuration of the computer center 7 of any of the first through the third aspects of the present invention.

If communications can be established with the destination subscriber through the computer 6' in addition to the telephone 8, the in-use detection unit 78 notifies the agent 73 of it. The availability of the computer 6' can be notified by, for example, querying the user position monitor agent 10 shown in FIG. 27.

The agent 73 writes to the telephone number storage unit 75 the information that the destination subscriber can use a computer. If information that the destination subscriber is using the computer is written, a call is not issued to the telephone 8, but an input/output of the voice/data conversion unit 72 is connected to the voice input unit and the voice output unit (not shown in the attached drawings) connected to the computer 6'.

Figure 30:
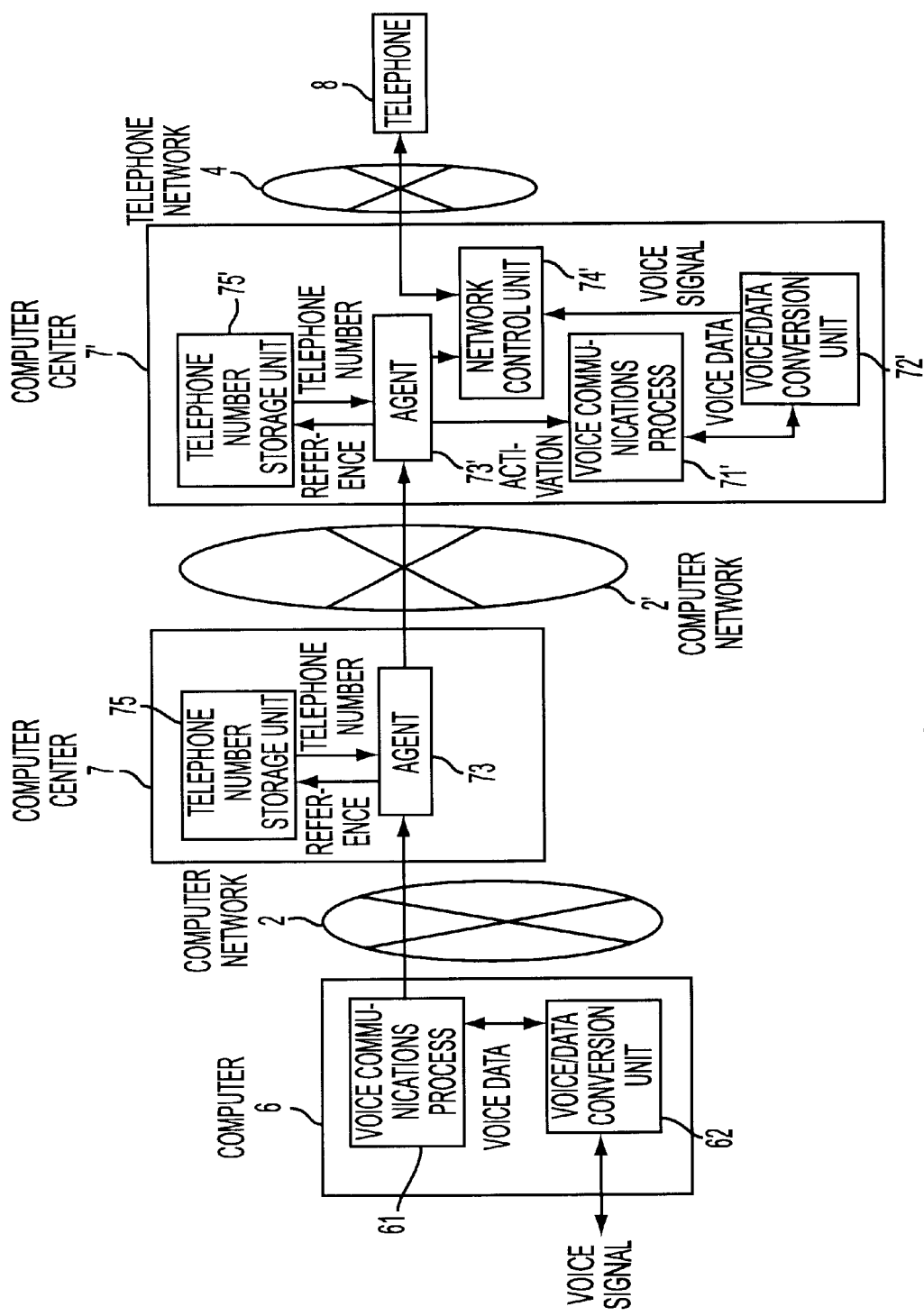
FIG. 30 shows the configuration of an embodiment according to the tenth aspect of the present invention.

FIG. 30 shows the configuration according to an embodiment of the tenth aspect of the present invention. It shows an example of transfer between the computer center 7 of the first aspect of the present invention and another computer center 7'.

First, the user of the computer 6 activates the voice communications process 61 for the computer center 7. When the user inputs the telephone number, the agent 73 refers to the telephone number storage unit 75 according to the input number of the station, and determines whether a call should be issued from its own computer center 7 or from another computer center 7'. If it is to be issued from the other computer center 7', then a data packet is transferred to the computer center 7'. If it is to be issued from its own computer center 7, then it is issued to the telephone network 4.

Figure 31:
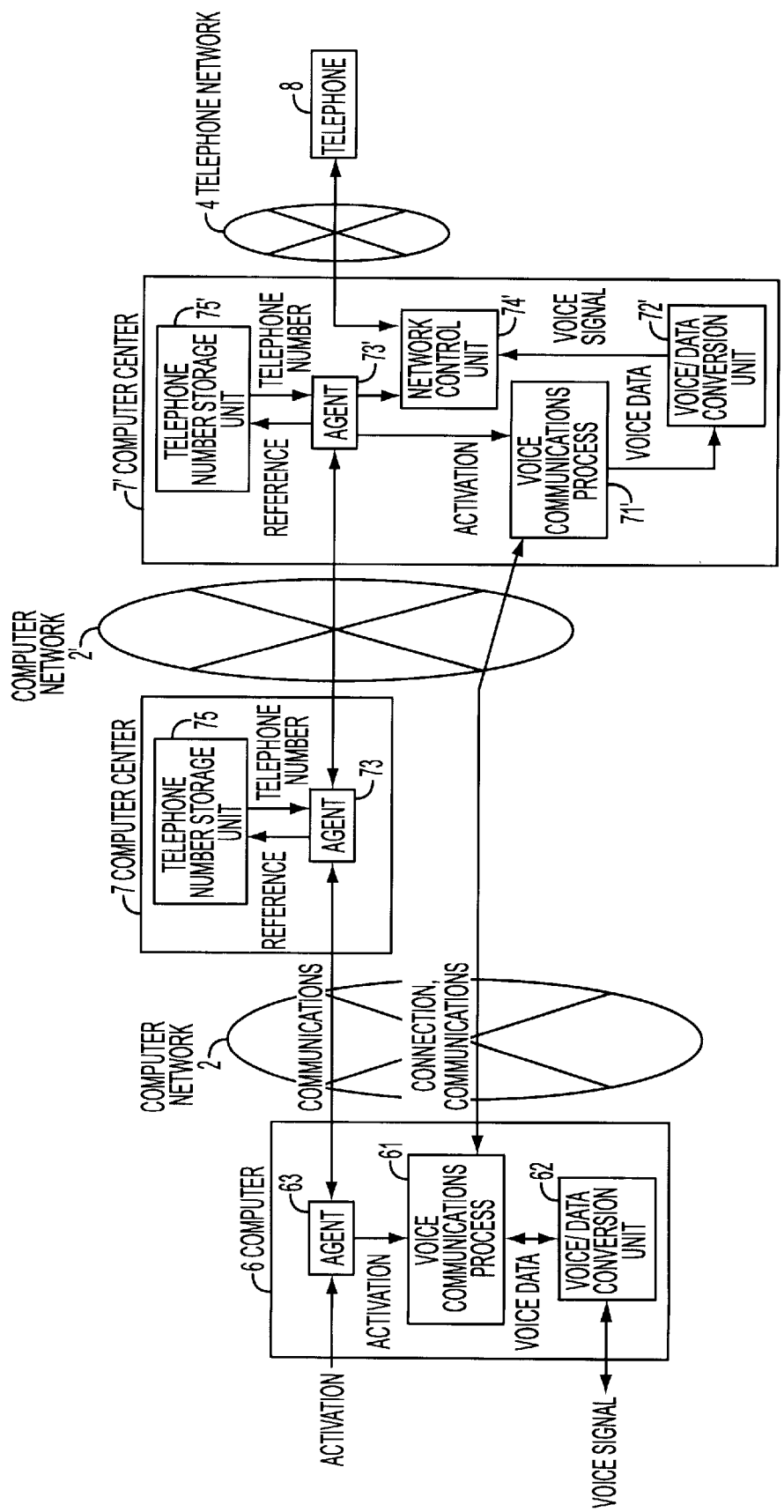
FIG. 31 shows the configuration of another embodiment according to the tenth aspect of the present invention.

FIG. 31 shows an example of the configuration according to another embodiment of the tenth aspect of the present invention, and shows an example of transfer between corresponding computer centers according to the second aspect of the present invention.

First, the user of the computer 6 activates the agent 63 for the computer center 7. When the user inputs the telephone number, the agent 73 refers to the telephone number storage unit 75 according to the input number of the station, and determines whether a call should be issued from its own computer center 7 or from another computer center 7'. If it is to be issued from the other computer center 7', then a data packet is transferred to the computer center 7'. If it is to be issued from its own computer center 7, then a response is returned to the source agent 63.

Finally, each agent activates the source voice communications process 61 and the voice communications process 71' in the last computer center 7' with the two processes set as each other's destination subscriber, and the agent 73' of the last computer center 7' issues a call to the telephone 8 through the telephone network 4.

Figure 32:
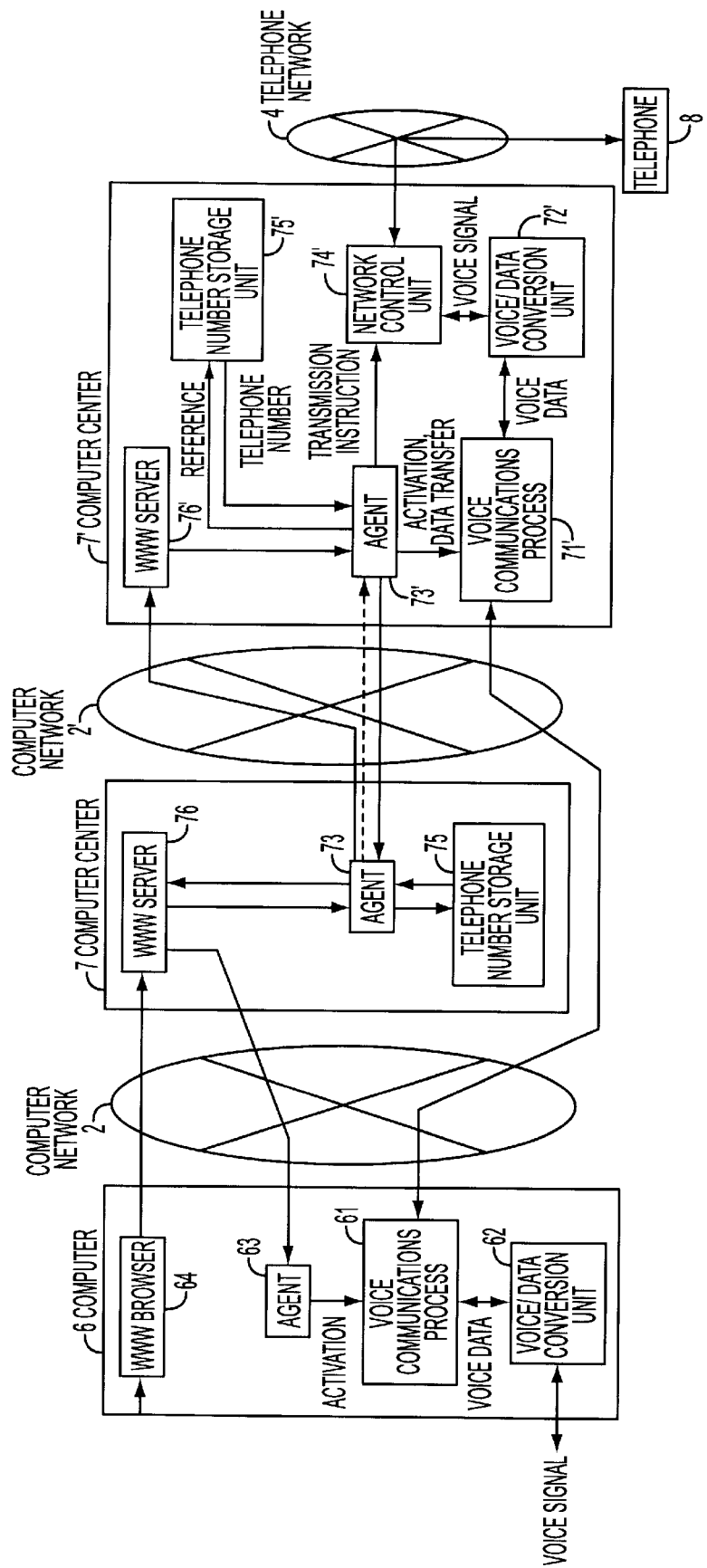
FIG. 32 shows the configuration of a further embodiment according to the tenth aspect of the present invention.

FIG. 32 shows an example of the configuration according to another embodiment of the tenth aspect of the present invention, and shows an example of transfer between corresponding computer centers according to the third aspect of the present invention.

First, the user of the computer 6 activates the WWW browser 64 and accesses the WWW server 76 of the computer center 7. By specifying the telephone service, the agent 63 is transferred to the computer 6 and activated therein. In the computer center 7, the CGI (Common Gateway Interface) activates the agent 73. When the agent 73 checks the telephone number storage unit 75 to find that a call should be issued from another computer center 7', the agent 73 accesses the WWW server 76' of the other computer center 7' with the HTTP (HyperText Transfer Protocol).

The WWW server 76' of the computer center 7' accessed by the agent 73 recognizes that it has been accessed by the agent 73 according to any means such as descriptions in an appropriate HTML (HyperText Markup). No agents are transmitted to the source of the access, but the agent 73' is activated by the CGI in the computer center 7'. The agent 73 can directly communicate with the destination agent 73' as indicated by dotted lines if the agent 73' has been activated.

The agent 73' checks the telephone number storage unit 75'. If the computer center 7' is appropriate, the voice communications process 71' is activated with a source computer 6 specified as a destination subscriber, and a call is issued to the telephone 8 from the computer center 7' through the telephone network 4. The source agent 63 communicates with the agent 73' of the last computer center 7', and activates the voice communications process 61 with the last computer center 7' specified as a destination subscriber.

In the examples shown in FIGS. 30 through 32, the telephone number storage unit 75 is provided in the computer center 7, but it can be provided in a computer independent of the computer center 7. The computer network 2 and the computer network 2' can be identical with each other or different from each other.

In the examples shown in FIGS. 30 through 32, the telephone number storage unit 75 can be provided as a telephone number database. FIGS. 33 and 34 show examples of the configuration of the telephone number database.

In FIG. 33, a telephone number and an address of the computer center 7 corresponding to the station number are entered. The agent 73 of the computer center 7 refers to the telephone number storage unit 75. If another computer center 7' is entered, then a packet is transferred to another computer center 7'. If the computer center 7 is entered, then a call is issued from the computer center 7 to the telephone 8 through the telephone network 4. As shown in FIG. 34, another database can be referred to so that a corresponding computer center can be retrieved from a station number regardless of the telephone number storage unit 75.

In FIGS. 33 and 34, a center address is input as an IP address, but it can also be input as a machine name plus a domain name.

Figure 35:
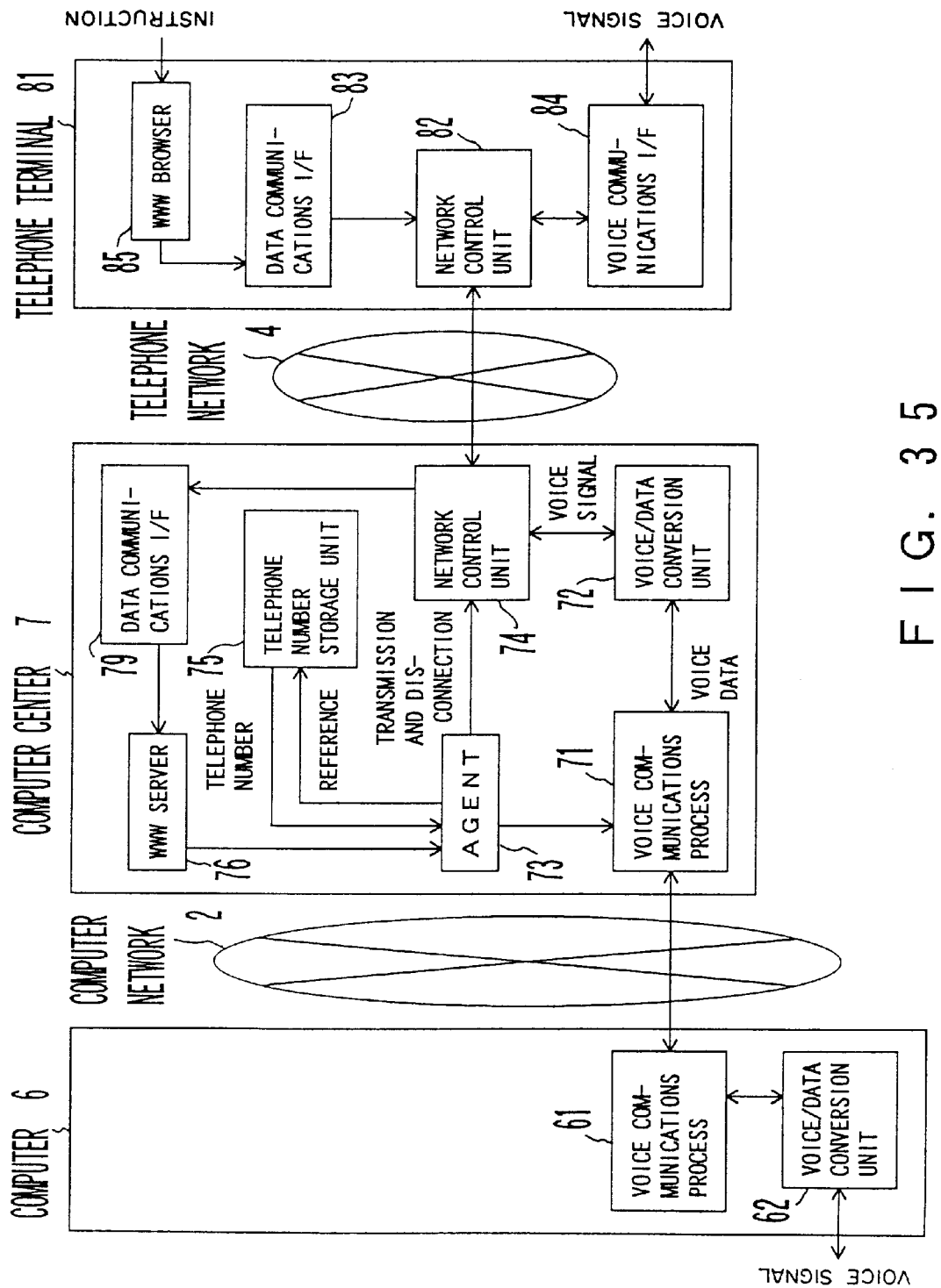
FIG. 35 shows the configuration according to an embodiment of the eleventh, sixteenth, and nineteenth aspects of the present invention.

FIG. 35 shows an example of the configuration according to another embodiment of the eleventh, sixteenth, and nineteenth aspects of the present invention.

The user first accesses the WWW server 76 of the computer center 7 through a WWW browser 85 using a data communications interface (I/F) 83 of a telephone terminal 81. At this time, the network control unit 74 is connected to a data communications interface (I/F) 79.

When the user selects, for example, an Internet telephone from the menu items and clicks the mouse button, the WWW server 76 activates the agent 73 based on the system of the CGI, etc. The agent 73 then activates the voice communications process 71 in such a way that it can communicate with the voice communications process 61 of a specified destination subscriber, and temporarily disconnects the telephone line.

Then, the agent 73 connects the network control unit 74 of the computer center 7 to the voice/data conversion unit 72, and issues a call to the telephone terminal 81.

The telephone terminal 81 connects the network control unit 82 to a voice communications interface (I/F) 84 to enter a call waiting state. Therefore, when a call is received from the computer center 7, voice communications with the computer 6 can be established.

When a telephone line is an analog line, the data communications interface (I/F) 83 can comprise a modem, etc. When the telephone line is a digital line, the data communications interface (I/F) 83 can comprise a terminal adapter. When a telephone line is an analog line, the voice communications interface (I/F) 84 can comprise an amplifier, a 2-line/4-line converter, etc. When the telephone line is a digital line, the voice communications interface (I/F) 84 can comprise a CODEC.

Figure 36:
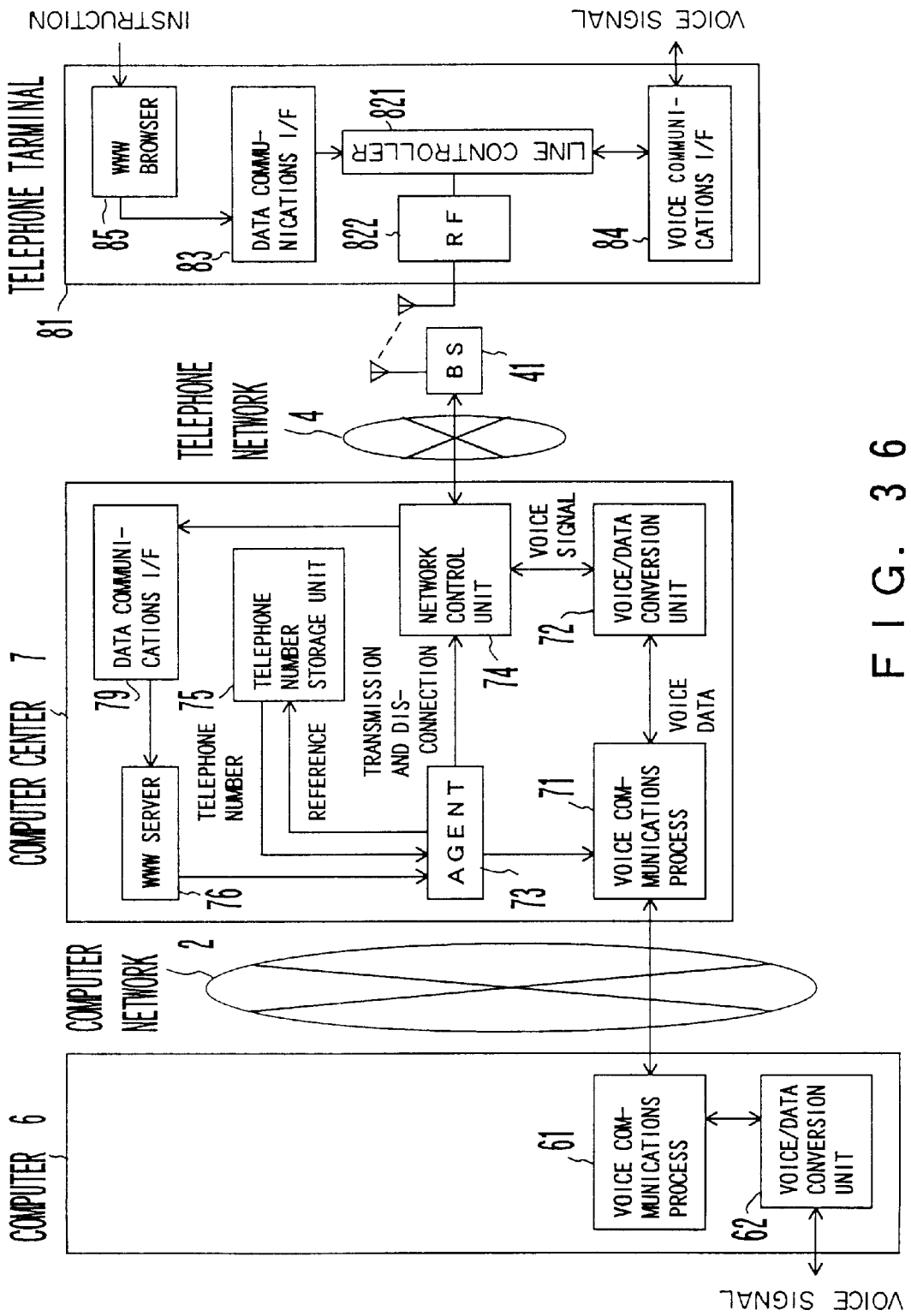
FIG. 36 shows the configuration according to another embodiment of the eleventh aspect of the present invention.

FIG. 36 shows an example of the telephone terminal 81 as a built-in radio PDA (Personal Digital Assistant). In the present example, the telephone network 4 contains a radio-telephone network including a radio receiving station 41. A network control unit 82 shown in FIG. 35 can be realized by a line controller 821 and a wireless unit (RF) 822.

Figure 37:
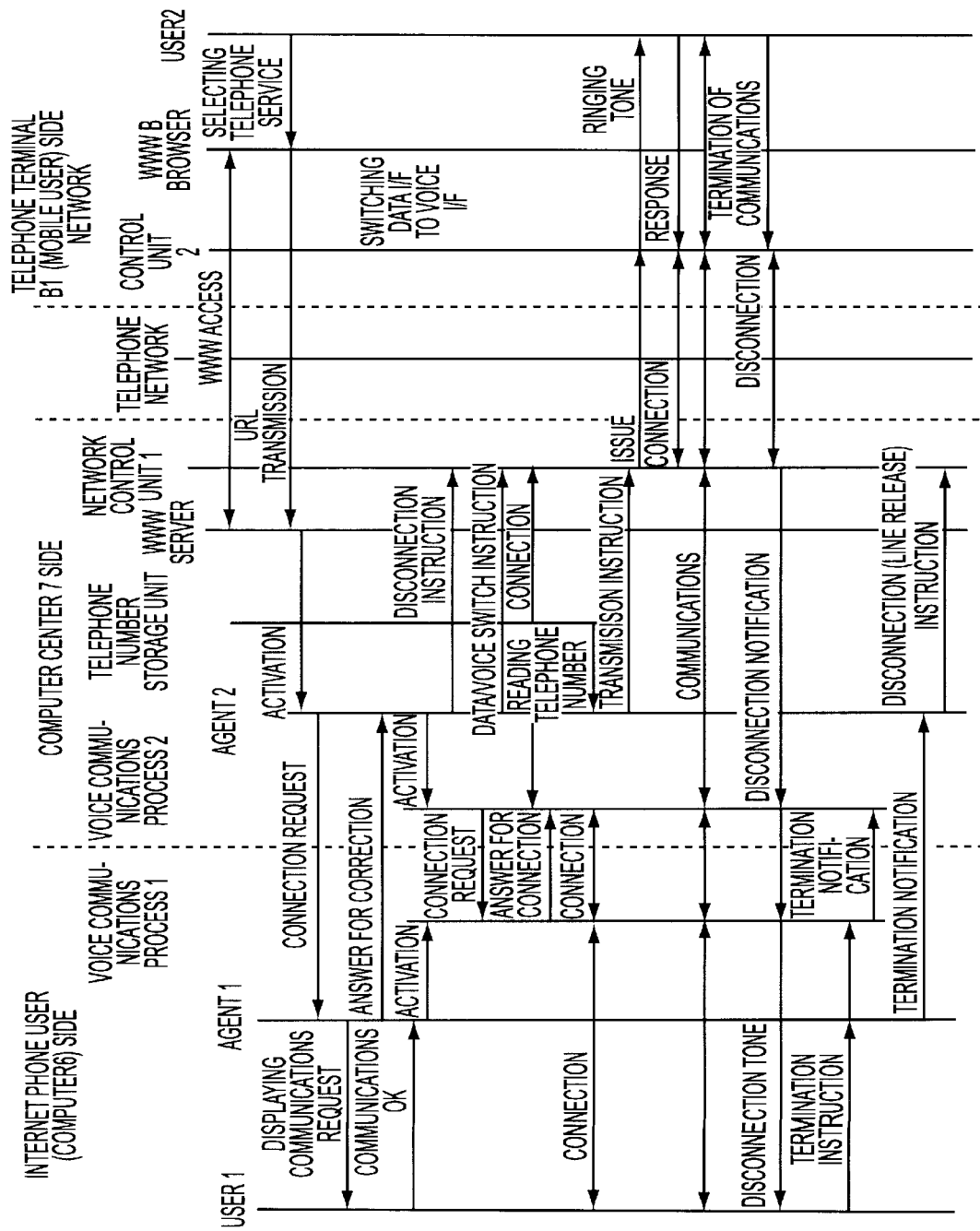
FIG. 37 shows the sequence of the process flow according to an embodiment shown in FIGS. 35 and 36.

FIG. 37 shows the sequence of the processes according to the embodiment shown in FIGS. 35 and 36.

In FIG. 37, the computer 6 has an agent 1 not shown in FIG. 35 or 36. That is, the agent 1 is omitted in FIGS. 35 and 36.

First, assume that a user 2 accesses the computer center 7 using the telephone terminal 81 having a data communications capability. At this time, the WWW browser and the WWW server establish WWW access through network control units 1 and 2 and a telephone network.

When the user 2 selects a telephone service from the WWW browser, a destination URL is transmitted from the WWW browser to the WWW server. In return, the WWW server activates an agent 2. The agent 2 issues a connection request to the agent 1 of the computer 6. The agent 1 displays that there is a communications request to the user 1 of the computer 6. When the user 1 sees the display and transmits an instruction to the agent 1 to accept the communications request, an answer for connection is transmitted to the agent 2.

Upon receipt of the answer for connection, the agent 2 activates the voice communications process 2. The agent 1 transmits the answer for connection and activates the voice communications process 1. Thus, the voice communications processes 1 and 2 of the computer 6 and the computer center 7 are activated, and a connection request is transmitted from the voice communications process 2 to the voice communications process 1. If the answer for connection is transmitted from the voice communications process 1 to the voice communications process 2, then the voice communications process 1 is connected to the voice communications process 2.

After the agent 2 activates the voice communications process 2, it issues a disconnection instruction to the network control unit 1 and terminates the data communications between the WWW server and the WWW browser. Then, the agent 2 issues a data/voice conversion instruction to the network control unit 1, and connects the voice communications process 2 to the network control unit 1. Thus, the user 1 is connected to the network control unit 1.

Next, the agent 2 reads a telephone number from the telephone number storage unit, and instructs the network control unit 1 to issue a call. Upon receipt of the instruction, the network control unit 1 issues a call to the network control unit 2, and a ringing tone is output to the user 2. When the user 2 answers the ringing tone, the network control unit 1 is connected to the network control unit 2, and the voice communications can be established between the users 1 and 2.

When a terminating process is performed from the user 1 or 2, the voice communications line is disconnected. Described below is the case shown in FIG. 37 in which the user 2 performs the terminating process.

When the user 2 performs a voice communications terminating process, the network control unit 2 is notified of the process, and the network control units 1 and 2 are disconnected from each other. When the network control unit 1 detects the disconnection of a line, it notifies the voice communications process 2 of the disconnection, and then notifies the voice communications process 1 of the disconnection. Thus, a disconnection tone is output to the user 1, and the user 1 instructs the agent 1 to terminate the communications. Then, the voice communications process 1 is notified of the termination instruction, and a termination notification is transmitted from the voice communications process 1 to the voice communications process 2, thereby the voice communications processes 1 and 2 terminate the process.

Upon receipt of the termination instruction from the user 1, the agent 1 transmits a termination notification to the agent 2. The agent 2 issues a disconnection (line release) instruction to the network control unit 1, thereby releasing the line being used for voice communications and terminating the process.

An embodiment of the twentieth aspect of the present invention is described by referring to FIG. 3. According to the twentieth aspect of the present invention, the computer center 3 of the first aspect of the present invention further comprises plural types of voice communications processes (voice communications units 31a, 31b, . . . ).

When the agent process unit (agent) 33 recognizes the type of the voice communications unit 11 (voice communications process) from the data stream received from the voice communications unit 11 (voice communications process), it selects a voice communications unit 31x capable of communicating with the voice communications unit 11 (voice communications process) of the computer 1 from plural types of voice communications units 31a, 31b, 31c, 31d, . . . (voice communications processes) in the computer center 3, activates these units, and transfers the data stream for communications.

Figure 38:
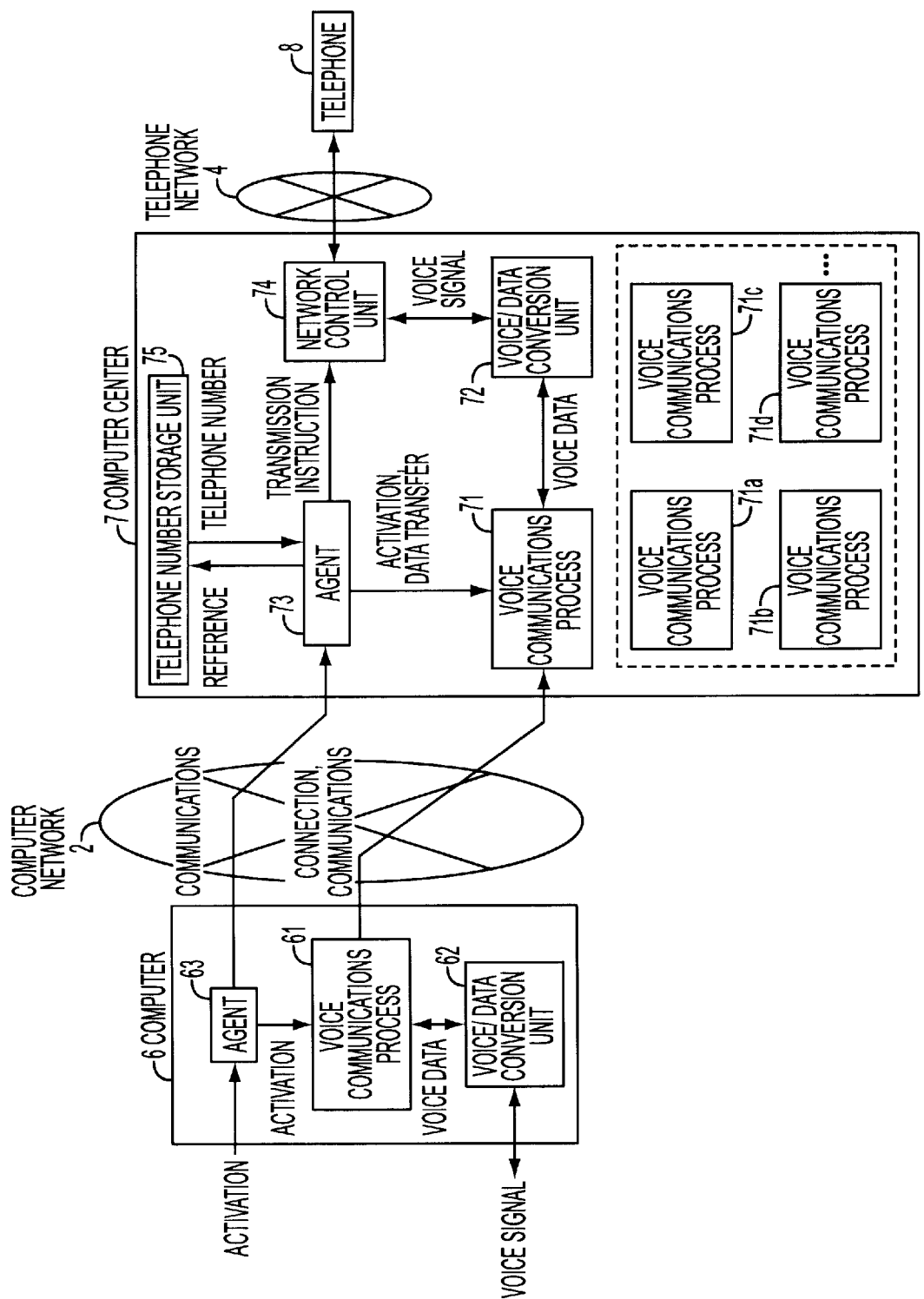
FIG. 38 shows the configuration according to an embodiment of the twenty-first aspect of the present invention.

FIG. 38 shows the configuration according to an embodiment of the twenty-first aspect of the present invention. In FIG. 38, the computer center 7 according to the second or third aspect of the present invention further comprises plural types of voice communications processes.

Before activating the voice communications process 61, the agent 63 transmits the type of the voice communications process 61 to the agent 73. The agent 73 selects a voice communications unit 71x capable of communicating with the voice communications unit 61 from plural types of voice communications units 71a, 71b, 71c, 71d, . . . in the computer center 7, activates these units, and transfers the data stream for communications.

Figure 39:
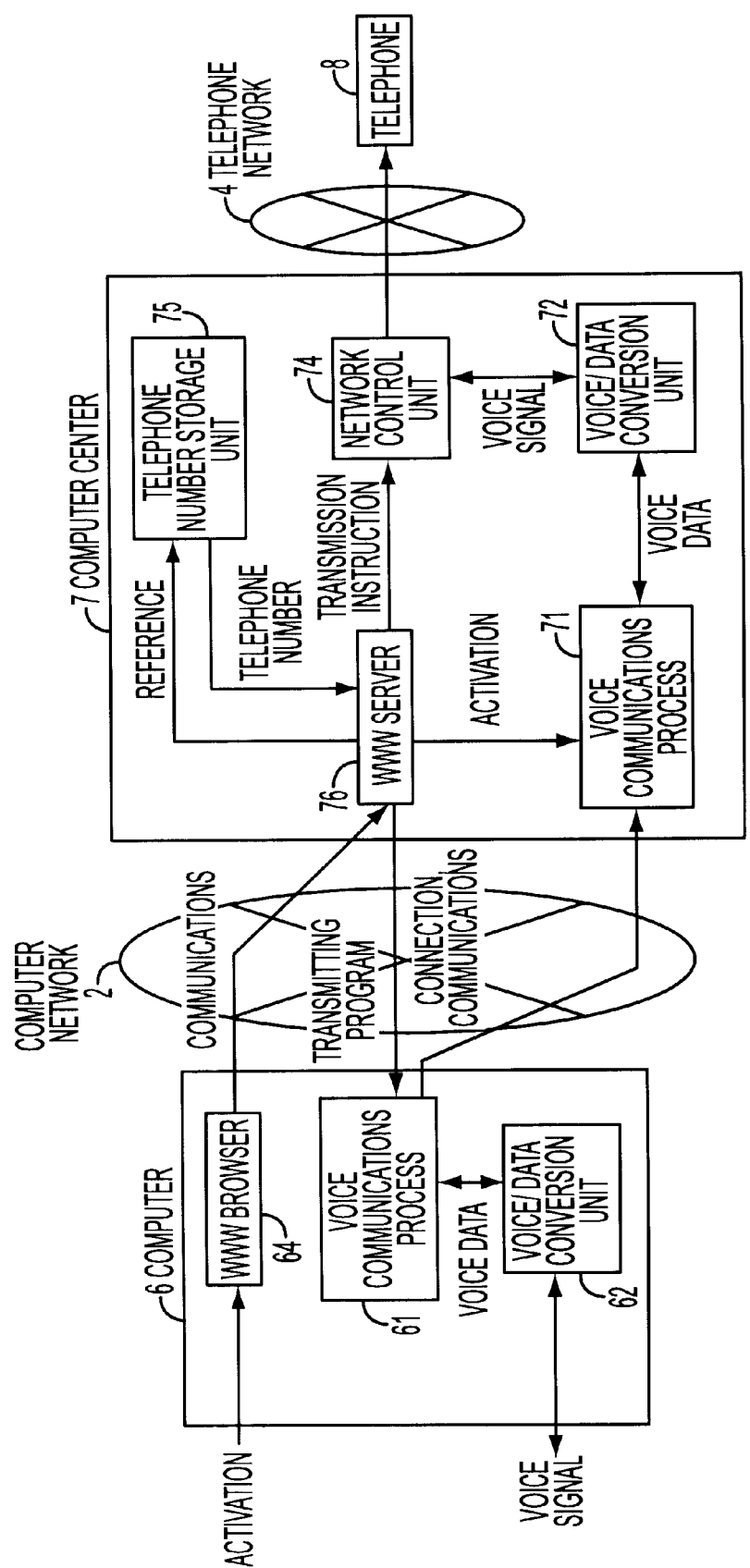
FIG. 39 shows the configuration according to an embodiment of the twenty-second aspect of the present invention.

FIG. 39 shows the configuration according to an embodiment of the twenty-second aspect of the present invention, and shows an example of establishing communications between a telephone and a computer not originally provided with a voice communications process.

As shown in FIG. 39, the computer 6 comprises the voice/data conversion unit 62, and the WWW (World Wide Web) browser 64. The computer center 7 comprises the voice communications process 71, the voice/data conversion unit 72, the network control unit 74, the telephone number storage unit 75, and the WWW server 76.

The WWW browser 64 transmits to the WWW server 76 a specific instruction to establish voice communications. Upon receipt of the specific instruction from the WWW browser 64, the WWW server 76 transmits the voice communications process 61 to be activated in the computer 6, and activates the voice communications process 71 in the computer center 7. The communications can be established between the computer 6 and the telephone 8 through the voice communications process 61 and the voice communications process 71 activated through the transmission of the WWW server 76.

Figure 40:
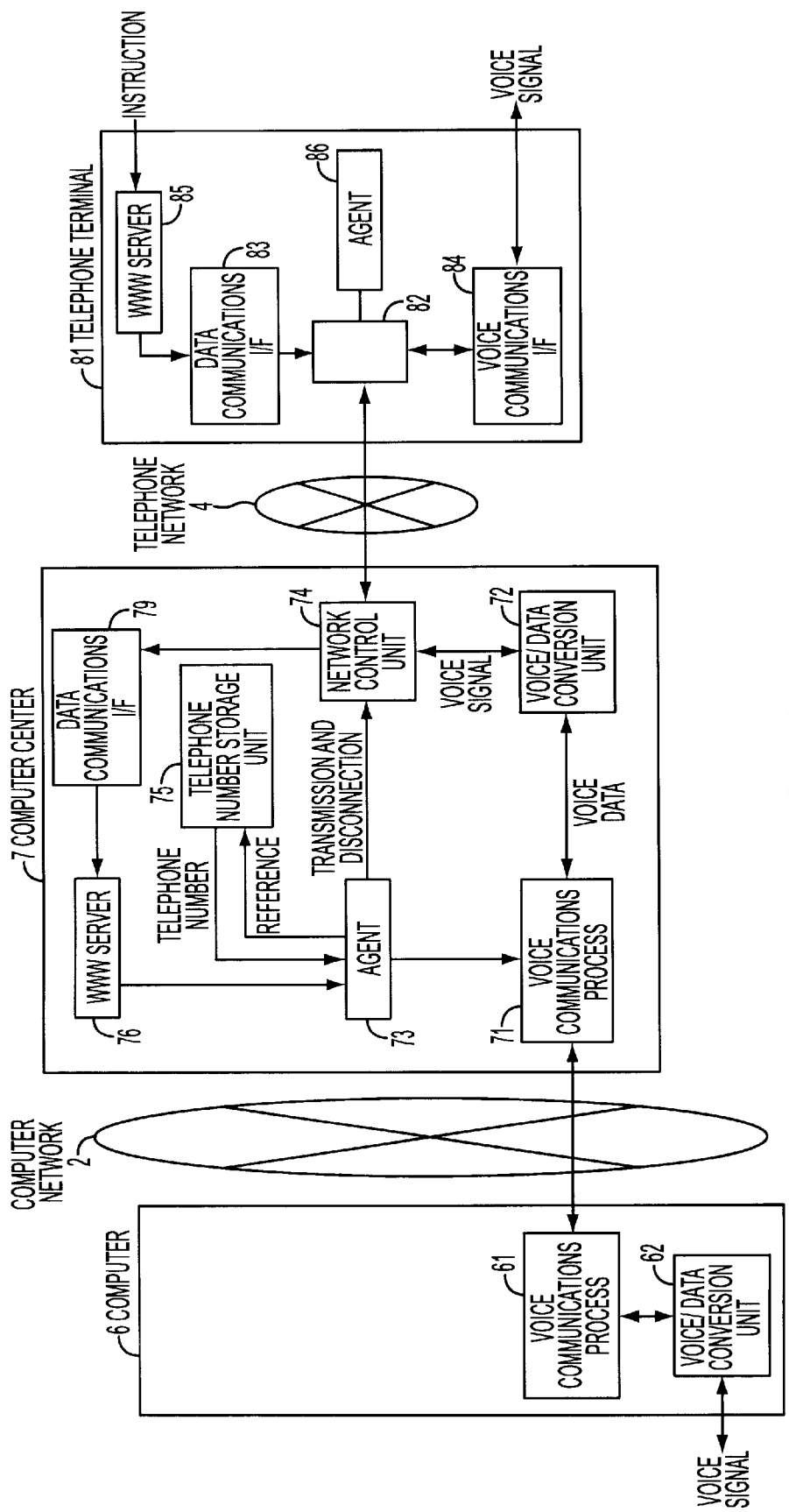
FIG. 40 shows the configuration according to an embodiment of the twenty-third aspect of the present invention.
Figure 41:
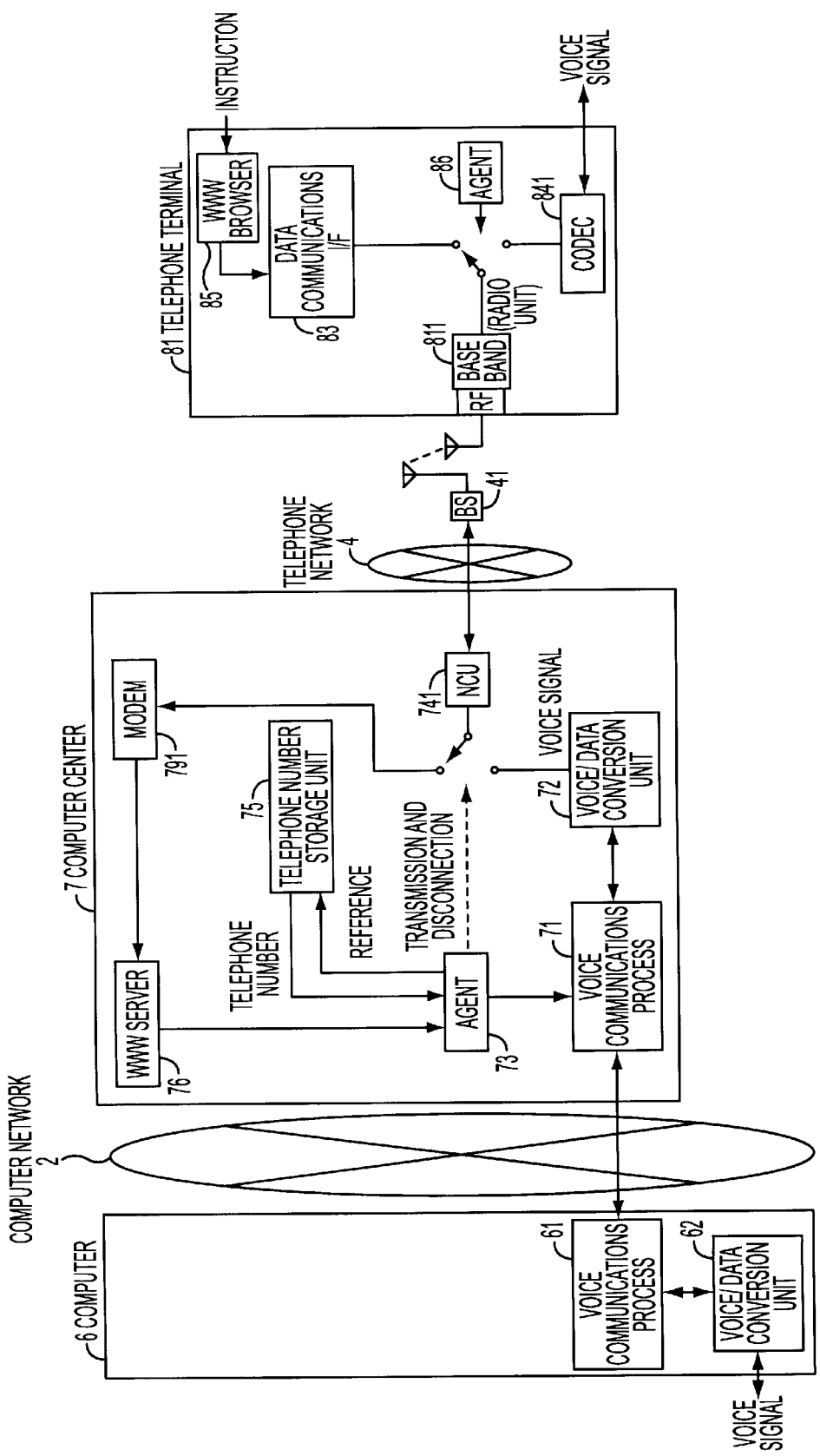
FIG. 41 shows the configuration according to another embodiment of the twenty-third aspect of the present invention.

FIGS. 40 and 41 show the configuration according to an embodiment of the twenty-third aspect of the present invention. In FIGS. 40 and 41, the telephone terminal 81 according to the eleventh aspect of the present invention shown in FIGS. 35 and 36 further comprises an agent 86. In FIG. 41, the telephone terminal 81 is used as a built-in radio PDA (personal digital assistant). Since the basic operations are similar to those shown in FIG. 40, explanation is made for both figures in common.

After receiving a specific instruction from the WWW browser 85, the agent 73 of the computer center 7 switches the connection of the network control unit 74 (NCU 741) from the data communications interface (I/F) 79 to the voice/data conversion unit 72. The agent 86 of the telephone terminal 81 switches the connection of the network control unit 82 (radio unit 811) from the data communications interface (I/F) 83 to the voice communications interface (I/F) 84 (CODEC 841). Then, a telephone is connected from the computer center 7 to the telephone terminal 81, thereby establishing voice communications.

After the voice communications terminate, the agent 73 of the computer center 7 returns the connection of the network control unit 74 (NCU 741) from the voice/data conversion unit 72 to the data communications interface (I/F) 79 (modem 791). The agent 86 of the telephone terminal 81 returns the connection of the network control unit 82 (radio unit 811) from the voice communications interface (I/F) 84 (CODEC 841) to the data communications interface (I/F) 83. Then, the data communications can be established again by issuing and connecting a call from the computer center 7 or the telephone terminal 81. Thus, access by the WWW browser 85 can be successfully gained.

Figure 42:
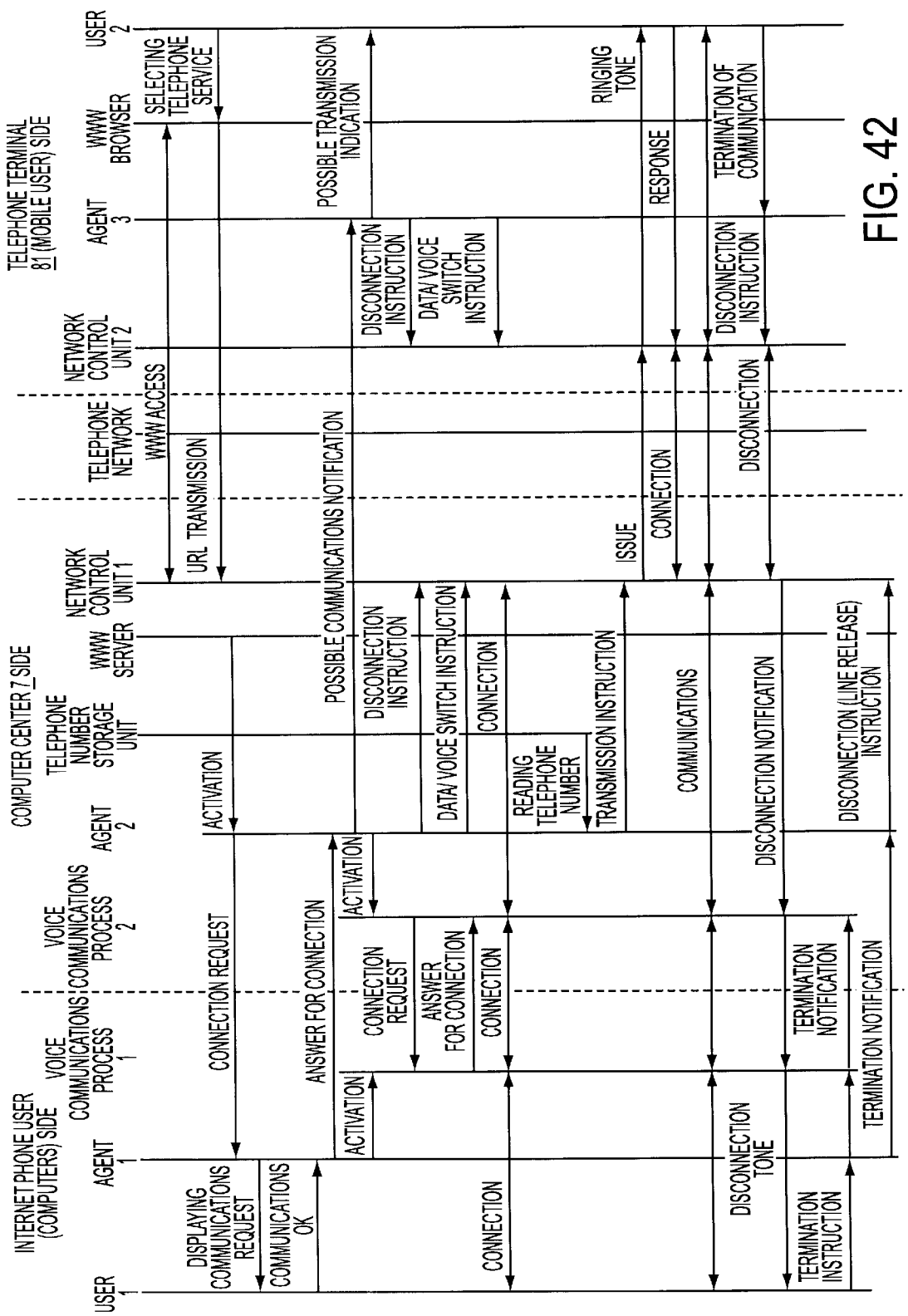
FIG. 42 shows the sequence of the process flow corresponding to an embodiment shown in FIGS. 40 and 41.

FIG. 42 shows the sequence of the processes corresponding to the embodiment shown in FIGS. 40 and 41. In FIG. 42, the agent 1 is also provided in the computer 6. In FIGS. 40 and 41, no corresponding agents are shown. This means that the agent is omitted in FIGS. 40 and 41, and the operations of the agent are described by referring to FIG. 42.

Assume that the user 2 (telephone terminal operator) is WWW-accessing the WWW server through the WWW browser, and that the user 2 selects a telephone service to the WWW server through the WWW browser. Then, the URL of the destination subscriber is transmitted to the WWW server, and the WWW server activates the agent 2. When the agent 2 is activated, it indicates to the user that a communications request has been issued, and waits for an answer from the user 1.

When the user 1 returns an answer for communications in response to the display of the communications request, the agent 1 answers the agent 2 in response to the connection request. Upon receipt of an answer for connection, the agent 2 transmits a possible communications notification to the agent 3 of the telephone terminal 81, and indicates to the user that the communications can be established.

Upon receipt of the possible communications notification, the agent 3 outputs a disconnection instruction to the network control unit 2, and also outputs an instruction to convert data communications into voice communications.

On the other hand, the agent 1 receives a communications acknowledgement, transmits the answer for connection, and activates the voice communications process of the computer 6. The agent 2 receives the answer for connection, transmits a possible communications notification, and activates the voice communications process 2. Thus, a connection request is issued from the voice communications process 2 to the voice communications process 1. Upon receipt of the connection request, the voice communications process 1 answers for connection. Then, the voice communications process 1 is connected to the voice communications process 2. After activating the voice communications 2, the agent 2 issues to the network control unit 1 an instruction to disconnect the data communications, and then issues an instruction to switch from data communications to voice communications. In the series of these processes, the user 1 is connected to the network control unit 1.

Next, the agent 2 reads a telephone number from the telephone number storage unit, and issues an instruction to the network control unit 1 to issue a call. The network control unit 1 calls up the network control unit 2, and a ringing tone is output to the user 2. When the user 2 answers, the network control unit 1 is connected to the network control unit 2 and voice communications can be established between the user 1 and the user 2.

A communications terminating process can be performed by the user 1 or the user 2. However, described below is the terminating process performed by the user 2.

When the user 2 performs the terminating process, the agent 3 is notified of the process, and issues a disconnection instruction to the network control unit 2. Thus, the communications are disconnected between the network control unit 1 and the network control unit 2. When the network control unit 1 detects the disconnection of a line, the voice communications process 2 is notified of the disconnection. A disconnection notification is transmitted from the voice communications process 2 to the voice communications process 1, and a disconnection tone is output from the voice communications process 1 to the user 1. Upon receipt of this disconnection tone, the user 1 issues a termination instruction. In response to the instruction, the agent 1 issues a termination instruction to the voice communications process 1, and a termination notification is issued to the voice communications process 2. Thus, the voice communications processes 1 and 2 terminate the process. Next, the agent 1 issues a termination notification to the agent 2. The agent 2 issues a disconnection instruction (to release a line) to the network control unit 1. After these processes, the related lines are completely disconnected.

Figure 43:
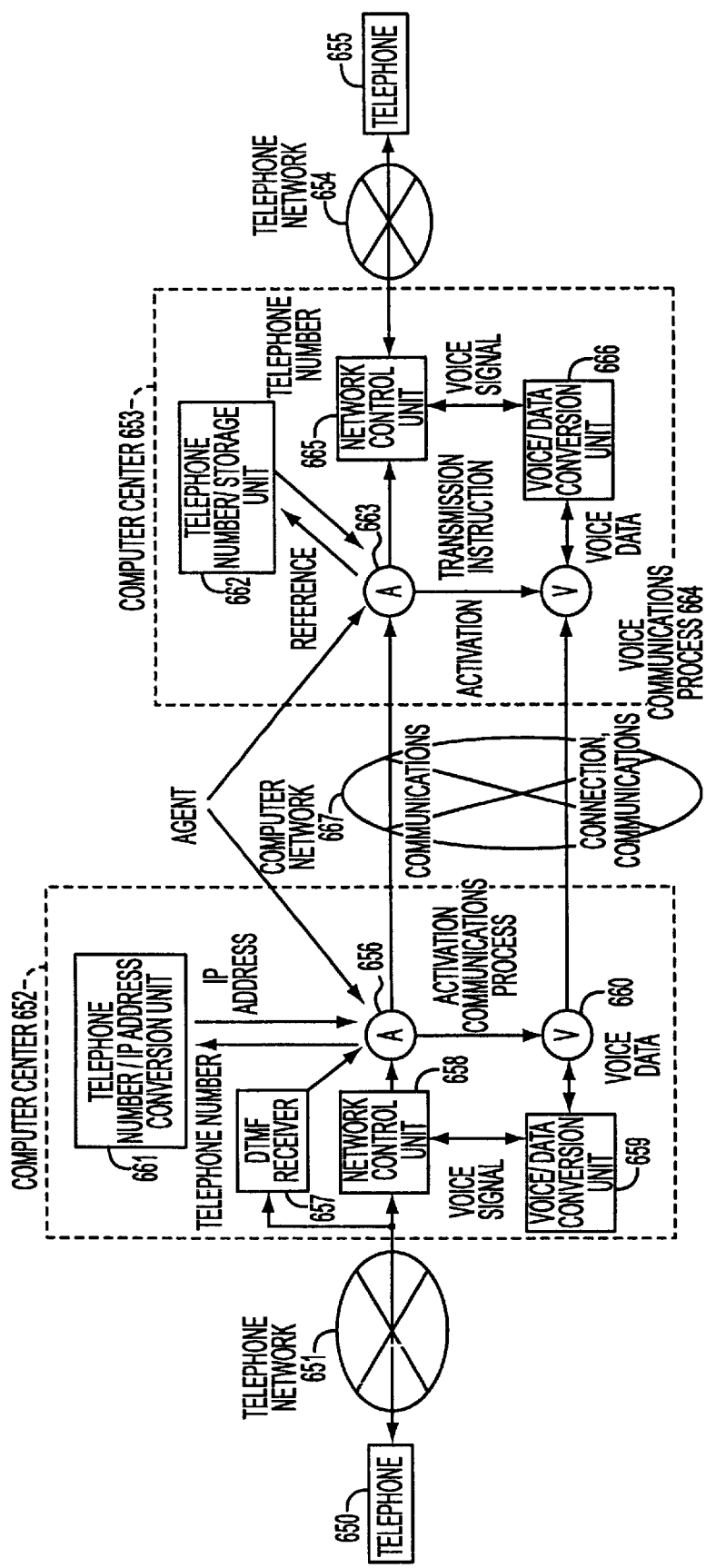
FIG. 43 shows an embodiment of the computer center capable of communicating between telephones through the Internet.

FIG. 43 shows an embodiment of the computer center capable of establishing communications using telephones through the Internet.

FIG. 43 shows the configuration with which a telephone user calls up another telephone user through the Internet. The configuration of the computer center can be that of a computer center 652. The configuration of a computer center 653 is the same as the configuration of the computer center according to the above described embodiment, but can also be the same as that of the computer center 652.

The configuration of the computer center 652 is obtained by adding a DTMF receiver to the network control unit of the computer center 653, and replacing the telephone number storage unit with a telephone-number/IP-address converter. These components are realized as a table. The agent is resident in the computer center.

When a connection request is issued from a telephone 650 through a telephone network 651, a network control unit 658 receives the request and notifies an agent 656 of the connection request. The agent 656 requests the telephone 650 to input a destination telephone number. When the telephone number is input, an IP address corresponding to the telephone number to be read by a DTMF receiver 657 is read from a telephone-number/IP-address conversion unit 661. Then, the agent 656 communicates with an agent 663 of the computer center 653 through a computer network 667, and queries the agent 663 whether or not the communications can be established. If the agent 663 transmits an answer for connection to the agent 656, then the agent 656 activates the voice communications process 660, and the agent 663 activates a voice communications process 664. Thus, a voice communications process 660 can communicate with the voice communications process 664.

As described above, the network control unit 658 is connected to a network control unit 665. If a telephone 655 answers the call, then communications can be established between the telephone 650 and the telephone 655 through the Internet. The voice input from the telephone 650 or the telephone 655 is received by the network control units 658 and 665 through the telephone networks 651 and 654. The received voice packet is converted into a data packet by voice/data conversion units 659 and 666, transferred to the voice communications processes 660 and 664, and transmitted and received between them.

The details of the process flow with the above described configuration are described below by referring to the sequence.

Figure 44:
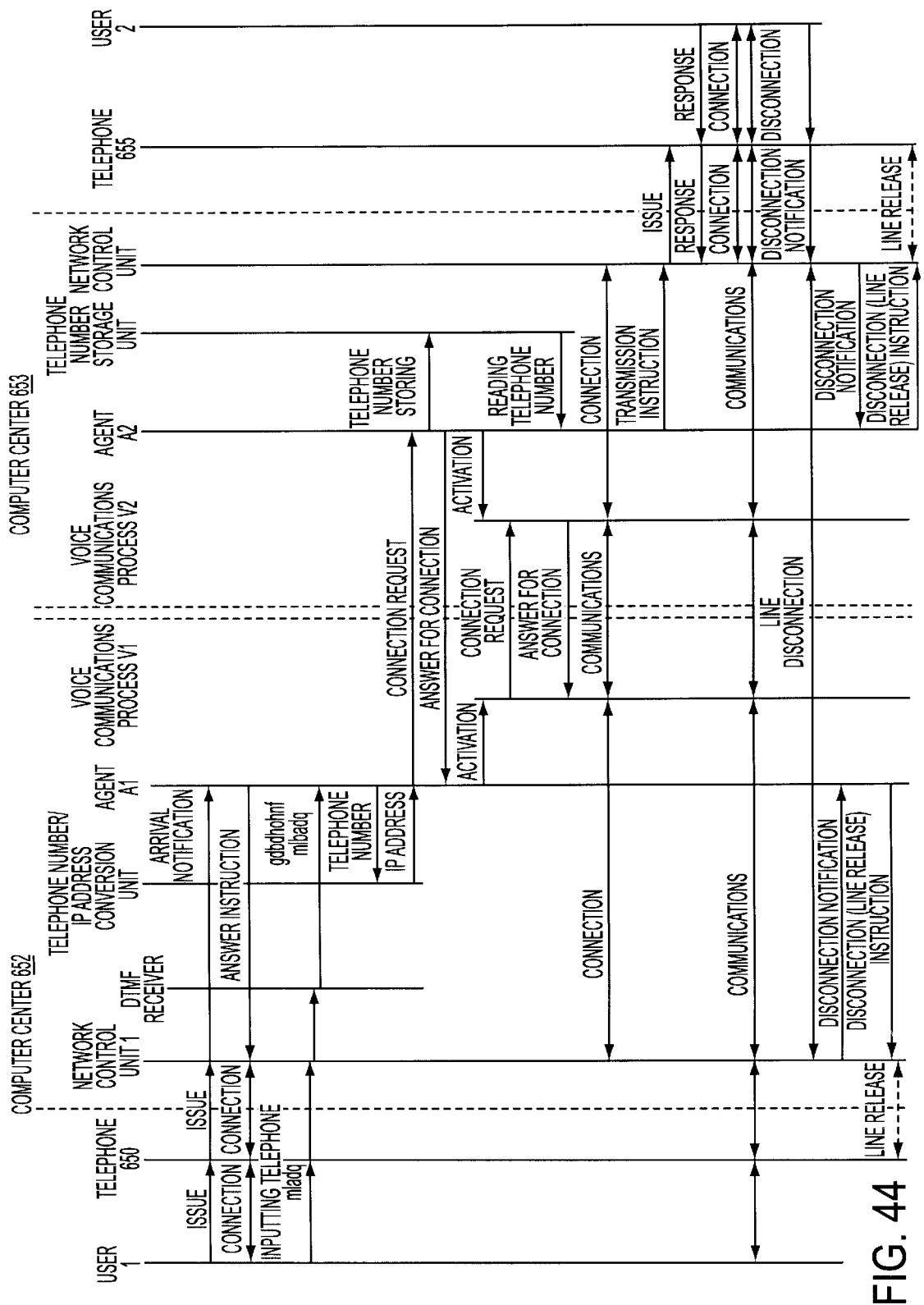
FIG. 44 shows the sequence of the process flow according to the embodiment shown in FIG. 43.

FIG. 44 shows the sequence of the processes according to the embodiment shown in FIG. 43.

The user 1 calls up the computer center 652 through the telephone 650. Then, the network control unit 1 transmits an arrival notification to an agent A1. When the agent A1 detects the arrival of a call it instructs the network control unit 1 to answer the call. When the network control unit 1 receives an answer instruction, the telephone 650 is connected to the network control unit 1. The user inputs the telephone number of the destination subscriber with a push tone. The input telephone number is decoded by the DTMF receiver and provided for the agent A1.

The agent A1 refers to the telephone number/IP address conversion unit and obtains an IP address corresponding to the telephone number. For example, if the leading numbers of the telephone number are 045, the IP address of the computer center in Yokohama (a city in Japan) is retrieved. The agent A1 is connected to the agent A2 in the center (computer center 653) having the IP address. Then, a connection request is issued from the agent A1 to the agent A2. A requested destination telephone number is transferred when a connection request is transmitted between agents, and stored in a telephone number storage unit.

When the agent A2 returns an answer for connection to the agent A1, the agent A1 activates the voice communications process V1, and the agent A2 activates the voice communications process V2. The voice communications process V1 issues a connection request to the voice communications process V2. When an answer for connection is returned from the voice communications process V2, a communications path can be established between the voice communications process V1 and the voice communications process V2. Therefore, the network control unit 1 is connected to the network control unit 2.

The agent A2 of the computer center 653 reads the telephone number stored in the telephone number storage unit, and issues a call issue instruction to the network control unit 2. The network control unit 2 issues a call to the telephone 655 having the read telephone number. When the user 2 answers the call to the telephone 655, the telephone 655 is connected to the network control unit 2. Thus, a further call can be issued to the telephone network 654 from the telephone network 651 through the computer network (Internet) 667.

The user can make a phone call for a fee lower than the fee for the use of only a telephone network because a computer network is normally connected through a private line which is less costly than a public line.

When the user 2 performs a disconnection process on the telephone 655, a disconnection notification is issued to the network control unit 2, and the line between the network control unit 1 and the network control unit 2 is disconnected. The network control unit 2 issues a disconnection notification to the agent A2. In response to this, the agent A2 instructs the network control unit 2 to disconnect the line (release the line), and the line between the network control unit 2 and the telephone 655 is released. On the other hand, when the network control unit 1 detects the disconnection of the line, it issues a disconnection notification to the agent A1. Then, the agent A1 instructs the network control unit 1 to disconnect the line (release the line), and the line is released between the network control unit 1 and the telephone 650. Thus, the line between the telephone 650 and the telephone 655 is disconnected. In FIG. 44, the disconnection process is performed by the user 2, but it is obvious that the process can also be performed by the user 1.

Figure 45A:
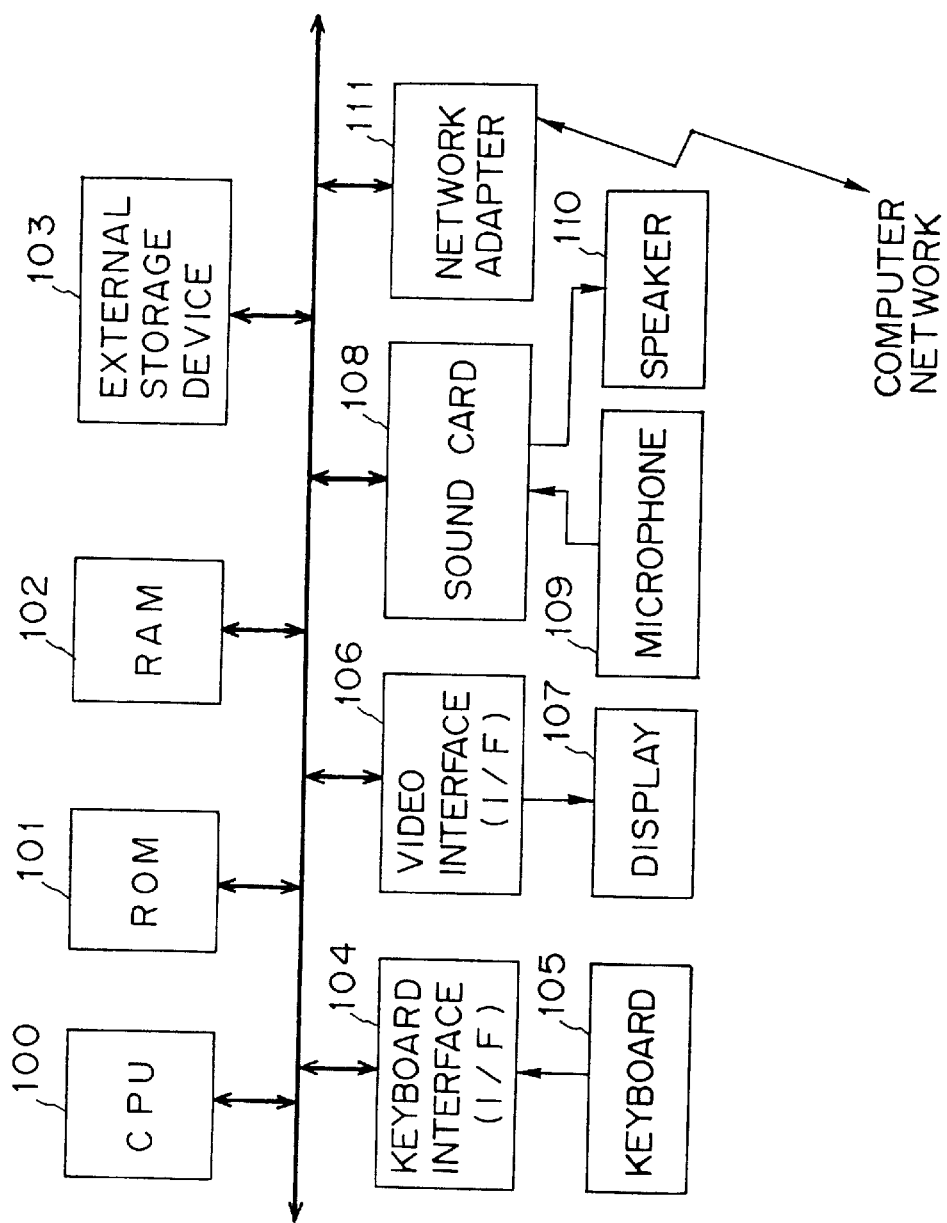
FIGS. 45A and 45B show an example of the configuration of the hardware according to an embodiment of the present invention.
Figure 45B:
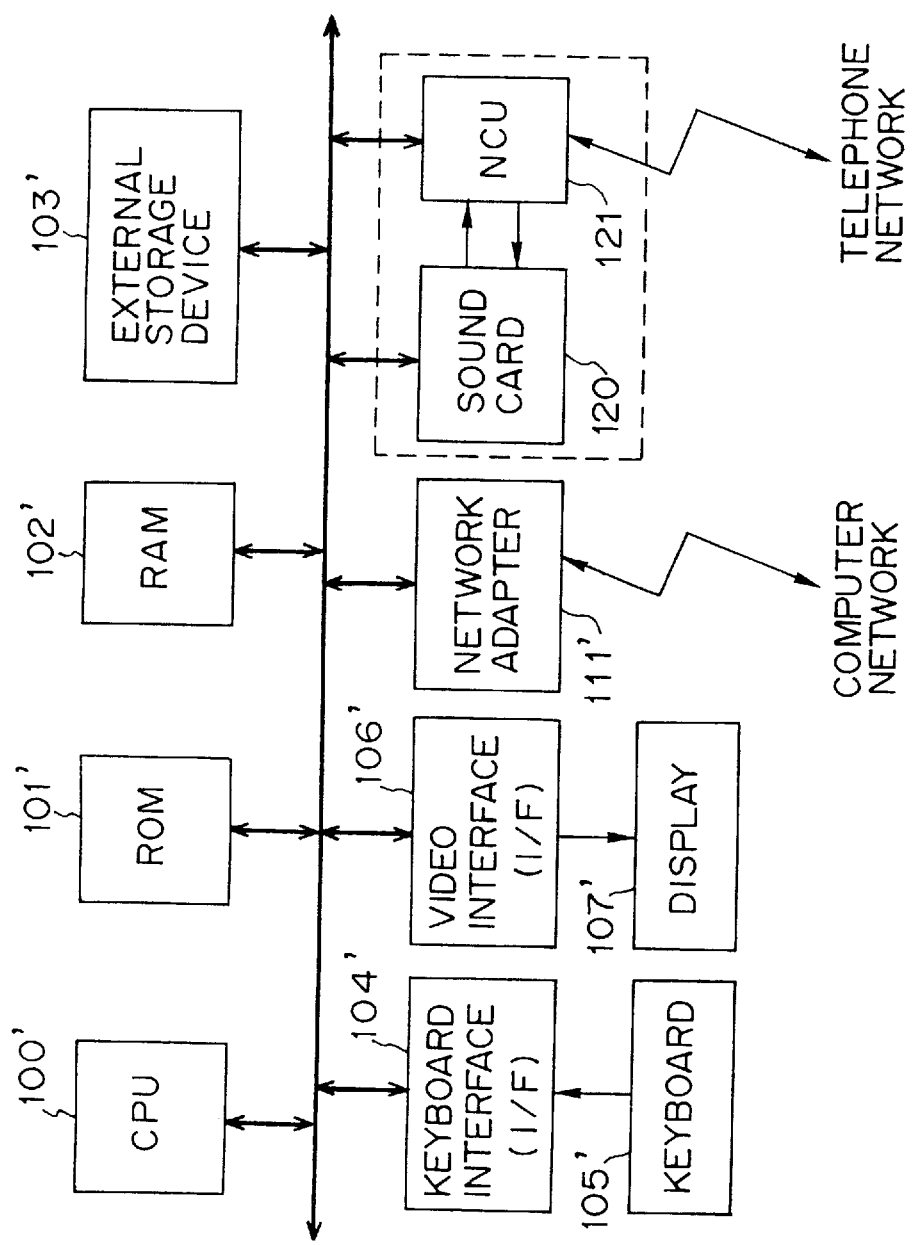
Figure 46:
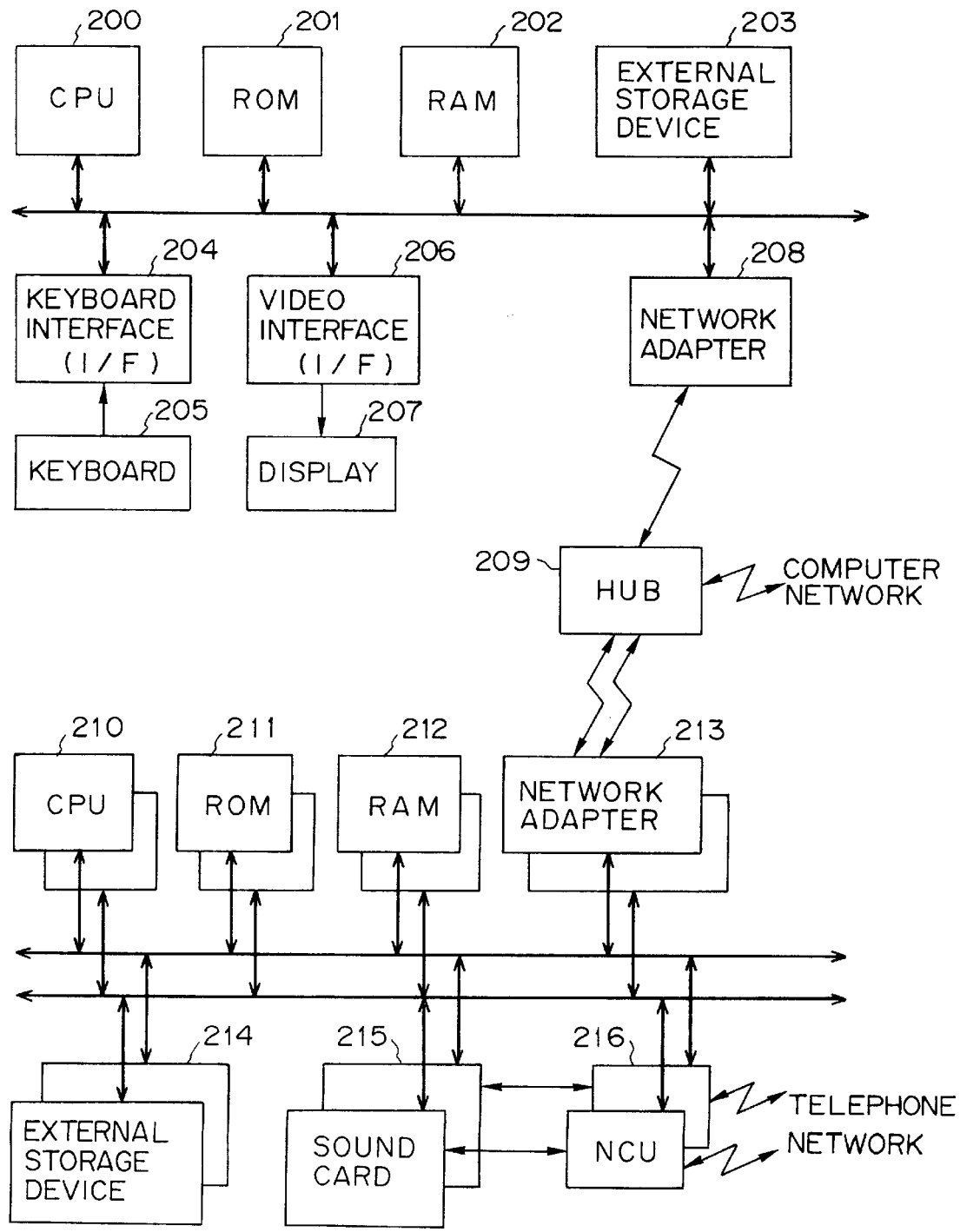
FIG. 46 shows another example of the configuration of the hardware according to the present invention.

FIGS. 45A, 45B, and 46 show examples of the configuration of the hardware of the computer and computer center according to the first aspect of the present invention.

FIG. 45A shows an example of the configuration of the hardware of the computer 1 shown in FIG. 4. The computer 1 comprises a CPU 100; a ROM 101; a RAM 102; an external storage device 103 such as a magnetic disk device, etc.; a keyboard 105 connected to a bus through a keyboard interface (I/F) 104; a display 107 connected to a bus through a video interface (I/F) 106; a sound card 108 for use in inputting and outputting voice to a microphone 109, a speaker 110, etc.; a network adapter 111 for controlling communications with the computer network 2, etc.

FIG. 45B shows an example of the configuration of the hardware of the computer center 3 shown in FIG. 4. The computer of the computer center 3 comprises a CPU 100'; a ROM 101'; a RAM 102'; an external storage device 103' such as a magnetic disk device, etc.; a keyboard 105' connected to a bus through a keyboard interface (I/F) 104'; a display 107' connected to a bus through a video interface (I/F) 106'; a network adapter 111' for controlling the communications with the computer network 2; a sound card 120 for use in controlling the communications through the telephone network 4; an NCU 121, etc.

FIG. 46 shows an example of the configuration of the hardware of the computer center 3 shown in FIG. 6.

The computer for operating the agent 73 shown in FIG. 6 comprises a CPU 200; a ROM 201; a RAM 202; an external storage device 203 such as a magnetic disk device, etc.; a keyboard 205 connected to a bus through a keyboard interface (I/F) 204; a display 207 connected to a bus through a video interface (I/F) 206; a network adapter 208, connected to a HUB 209, for controlling communications with the computer network 2, etc.

The computer for operating the voice communications process 74 (as with the voice communications process 74') shown in FIG. 6 comprises a CPU 210; a ROM 211; a RAM 212, a network adapter 213, connected to a HUB 209, for controlling the communications with the computer network 2; an external storage device 214 such as a magnetic disk device, etc.; a sound card 215, and an NCU 216 for use in controlling communications through the telephone network 4, etc.

Figure 47:
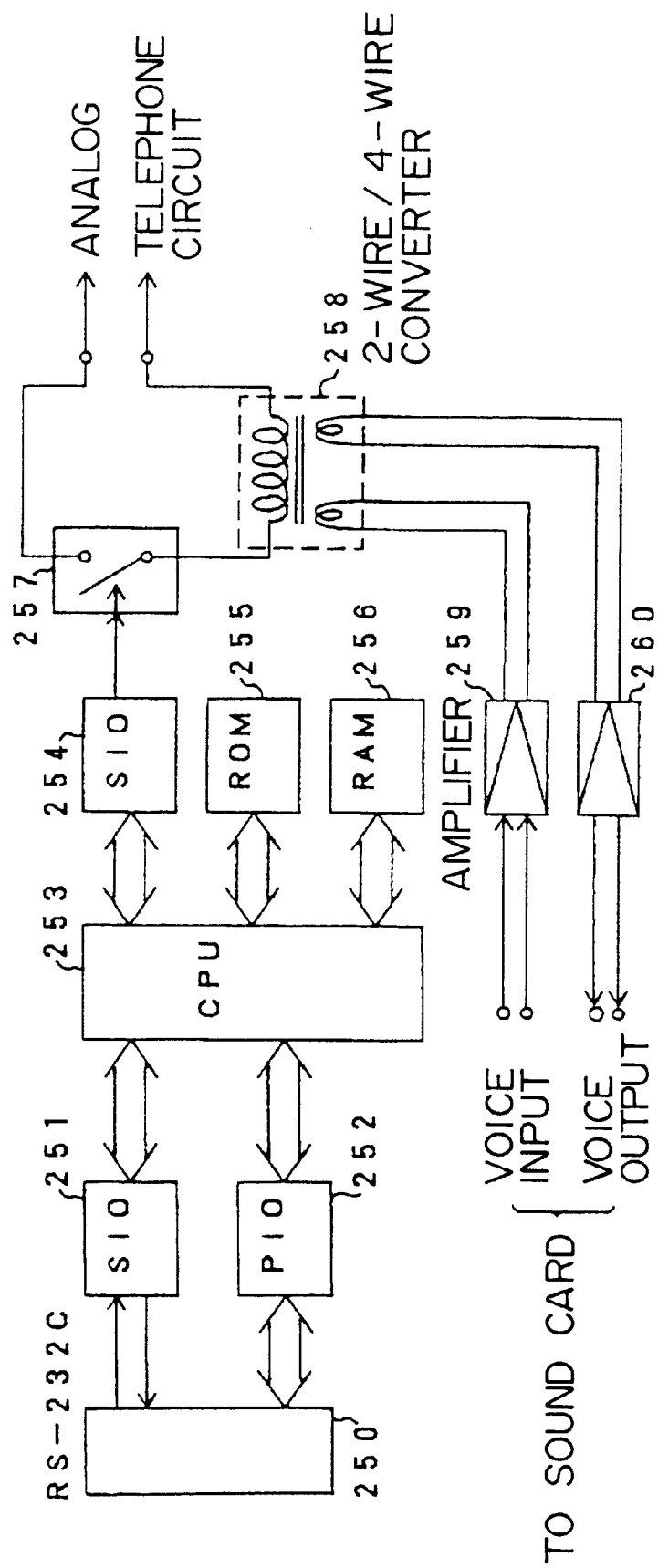
FIG. 47 shows an example of the network control unit according to an embodiment of the present invention.

FIG. 47 shows an example of a network control unit (NCU) for an analog telephone network;

In FIG. 47, 250 is an RS-232C interface; 251 is a serial input/output interface (SIO); 252 is a parameter input/output interface (PIO); 253 is a CPU; 254 is a serial input/output interface (SIO); 255 is a ROM; 256 is a RAM; 257 is a switch; 258 is a 2-line/4-line converter; 259 and 260 are amplifiers for voice input and output.

In the example shown in FIG. 47, a telephone network is controlled by the computer through the RS-232C interface 250, but can be controlled directly through the bus of a computer.

In the explanation above, a computer corresponds one-to-one to a computer center for easy understanding. For example, as shown in FIG. 6 or FIG. 10, computers and computer centers can correspond n-to-m for communications.

Figure 48:
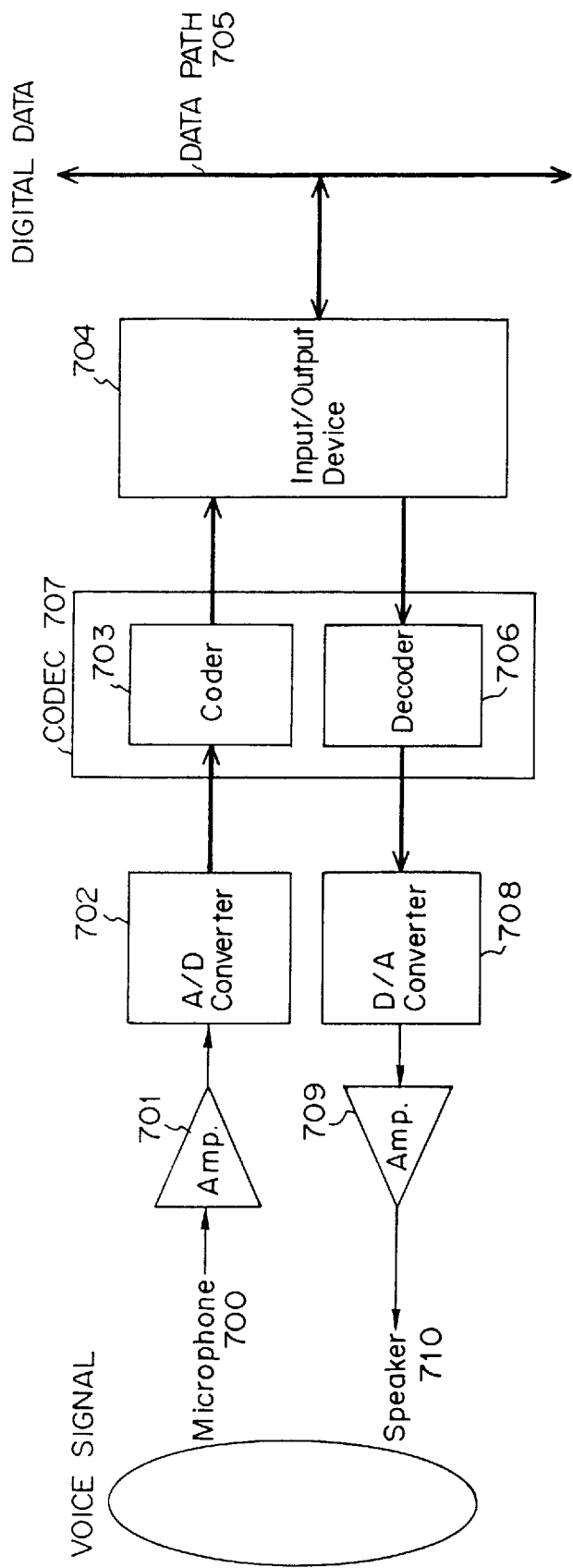
FIG. 48 shows an example of the configuration of the voice/data conversion unit provided in the computer according to the above described embodiments.

FIG. 48 shows an example of the configuration of the voice/data conversion unit provided in the computer according to the above described embodiment.

The computer is provided with a microphone 700 and a speaker 710 as a voice output device. A user of the computer uses the microphone 700 and the speaker 710 to utilize the function of the telephone such as an Internet phone, etc.

The voice input through the microphone 700 is amplified by a speaker 701, and converted into a digital signal by an A/D converter 702. The digital signal is encoded by a coder 703 of a CODEC 707, and output to a data path 705 through an input/output device 704 as digital data.

On the other hand, the digital data of the voice input to the input/output device 704 through the data path 705 is input to a decoder 706 and decoded. The decoded voice data is converted into a digital voice signal, and then into an analog voice signal by a D/A converter 708. The voice signal is amplified by an amplifier 709, and output by a speaker 710.

The configuration of the voice/data converter shown in FIG. 48 is only an example, and can be varied by one of ordinary skill in the art.

According to the above described embodiments, a voice signal is transmitted through a telephone network. Therefore, the deterioration of transmission efficiency and quality can be avoided.

Since an agent retrieves a telephone number and controls the issue of a call to a telephone network, etc., the existing voice communications process can be used without reorganization or amendment, thereby producing an economical effect.

The above described first aspect of the present invention solves the problem of the deterioration of the transmission efficiency and quality when voice communications are established through a computer network, and allows a telephone call to be connected from a computer network through a public network, etc. using an existing voice communications process.

According to the second aspect of the present invention, communications are established between the agent 63 in the source computer 6 and the agent 73 in the destination computer center 7 (refer to FIG. 8) independently of the voice communications process 61. Therefore, contents of communications, protocols, etc. can be optionally extended without restrictions of the voice communications processes between a source computer and a destination computer center. Additionally, each agent simply activates a voice communications process, and has no functions of establishing communications between voice communications processes. Therefore, only changing a name of a voice communications process activated by an agent allows another voice communications process to be appropriately checked.

According to the third aspect of the present invention, the agent 63 is transmitted from the computer center 7 and activated (refer to FIG. 19), and therefore a computer not originally provided with an agent can issue a call to a telephone.

According to the fourth aspect of the present invention, since a telephone number rewriting unit can rewrite a telephone number in a telephone number storage unit, a destination can be easily changed.

According to the fifth aspect of the present invention, a telephone number can be input online when a source subscriber issues a call.

According to the sixth aspect of the present invention, a telephone number storage unit converts a specific character string into a telephone number. Therefore, a source subscriber can specify the destination using a specific character string indicating a destination subscriber.

According to the seventh aspect of the present invention, since a telephone number can be received by a telephone number receiving unit from a telephone terminal through a network control unit, the destination telephone number can be specified only by a telephone terminal.

According to the eighth aspect of the present invention, a user position monitor agent writes the latest destination telephone number of a destination subscriber. Therefore, the destination is automatically specified.

According to the ninth aspect of the present invention, since computers are connected to each other when the destination is a computer, the computers can accept a call.

According to the tenth aspect of the present invention, since a call is issued from a computer center in the area physically closest to the area to which the destination telephone number normally belongs, the fee for the use of public telephone network can be minimized.

According to the eleventh aspect of the present invention, a computer center can call back for connection when it is specified by a telephone terminal. Therefore, the telephone terminal can actually issue a call.

According to the twelfth aspect of the present invention, a TV telephone call can be realized by transmitting animation data as well as voice communications data.

Using a device according to the thirteenth through nineteenth aspects of the present invention, a call can be issued from the above described computer network to a telephone.

According to the twentieth or twenty-first aspect of the present invention, a user can follow an available voice communications process, thereby improving the convenience of the user.

According to the twenty-second aspect of the present invention, a user need not prepare any voice communications process, thereby furthermore improving the convenience of the user.

According to the twenty-third aspect of the present invention, a computer center can be accessed again through a WWW after the termination of voice communications, and the user's convenience can be considerably improved.

What is claimed is:

1. A method of connecting a call from a computer to a telephone in a system including one or more first computers having a voice communications ability, a computer center including one or more second computers connected to the first computers through a computer network, and one or more telephone terminals connected to the computer center and a telephone network, comprising:

providing, in each of the first computers, a first voice communications unit establishing communications between computer networks, a first voice/data conversion unit functionally connected to the first voice communications unit, and a first agent process unit;

providing, in the computer center, one or more second voice communications units establishing communications between computer networks, a second voice/data conversion unit functionally connected to the second voice communications unit, a network control unit connected to the second voice/data conversion unit, a second agent process unit, and a telephone number storage unit functionally connected to the second agent process unit;

activating the first agent process unit in at least one of the first computers, thereby establishing communications between the first agent process unit and the second agent process unit;

activating, by the first agent process unit, the first voice communications unit in such a way that the first voice communications unit can communicate with the second voice communications unit;

activating the second voice communications unit by the second agent process unit, and issuing a call from the network control unit to a telephone terminal designated by a telephone number stored in the telephone number storage unit; and establishing communications between the at least one of the first computers and the telephone terminals, wherein the first agent process unit and the second agent process unit manage communication type and communication status, and control the first and second voice communication units.

2. The method according to claim 1, wherein a telephone number writing unit is provided, writing a destination telephone number to the telephone number storage unit in the computer center, wherein the destination telephone number is preliminarily written to the telephone number storage unit at an instruction from a source subscriber or a destination subscriber.

3. The method according to claim 1, wherein
the destination telephone number is written to the telephone number storage unit in the computer center when an online instruction is input by a source subscriber through the at least one of the first computers.

4. The method according to claim 1, wherein
the telephone number storage unit comprises a storage unit storing a character string indicating a destination subscriber and a storage unit for storing a telephone number corresponding to the character string;

a character string indicating a destination subscriber is input online through the at least one of the first computers;

the agent process unit converts the input character string into a destination telephone number by referring to the telephone number storage unit when a telephone call is issued; and the network control unit issues a call to the destination telephone number.

5. The method according to claim 1, wherein
the computer center comprises a telephone number reception unit receiving a telephone number to be stored in the telephone number storage unit from the network control unit; and the agent process unit or another agent process unit preliminarily receives a call through the network control unit and writes the telephone number received by the telephone number reception unit to the telephone number storage unit.

6. The method according to claim 1, wherein
a user position monitor unit monitoring a position of a destination subscriber is provided;

the position of the destination subscriber is monitored by the user position monitor unit, and a telephone number available to the destination subscriber is written to the telephone number storage unit.

7. The method according to claim 6, wherein
the user position monitor unit writes information indicating a computer being used by a destination subscriber to the telephone number storage unit when the destination subscriber uses the computer, and when the information is written, a call is not issued to a telephone, but communications are established between computers by transferring a packet from the first voice communications unit to a voice communications unit of a computer of a destination subscriber, or by activating, by the first agent process unit, the first voice communications unit in such a way that the first voice communications unit can communicate with the voice communications unit of the destination subscriber.

8. The method according to claim 1, wherein
when two or more computer centers are connected to a computer network, the agent process unit in a first computer center connected to the computer network checks the telephone number storage unit when a connection request is received from a source subscriber, transfers the connection request to a second computer center physically close to an area to which a telephone number of the subscriber belongs, and connects the at least one of the first computers with the voice communications unit in the second computer center.

9. The method according to claim 1, wherein
the first voice communications unit and the second voice communications unit transmit and receive animation data as well as voice data.

10. The method according to claim 1, wherein
the computer center comprises a plurality of second voice communications units;

the second agent process unit recognizes a type of the first voice communications unit used by the at least one of the first computers according to a notification from the first agent process unit of the at least one of the first computers, selects one of the second voice communications units capable of communicating with the first voice communications unit from among the plurality of second voice communications units, activates the selected second voice communications unit, thereby establishing communications between the activated second voice communications unit with the first voice communications unit of the at least one of the first computers.

11. A method of connecting a call from a computer to a telephone in a system including one or more first computers having a voice communications ability, a computer center including one or more second computers connected to the first computers through a computer network, and one or more telephone terminals connected to the computer center and a telephone network, comprising:

providing, in each of the first computers, a first voice communications unit establishing communications between computer networks a first voice/data conversion unit functionally connected to the first voice communications unit and a browser;

providing, in the computer center, one or more second voice communications units for establishing communications between computer networks, a second voice/data conversion unit functionally connected to the second voice communications, a network control unit connected to the second voice/data conversion unit, a second agent process unit a server unit, and a telephone number storage unit;

accessing in at least one of the first computers from the browser unit to unit, issuing a specific instruction, transmitting a first agent process unit from the server unit to the browser unit, and activating the first agent process unit in the at least one of the first computers;

activating the second agent process unit in the computer center by the server unit;

activating, by the first agent process unit, the first voice communications unit in such a way that the first voice communications unit can communicate with the second voice communications unit;

activating the second voice communications unit by the second agent process unit, and issuing a call from the network control unit to a telephone number stored in the telephone number storage unit; and establishing communications between the at least one of the first computers and the telephone terminals.

12. The method according to claim 11, wherein
a telephone number writing unit is provided, writing a destination telephone number to the telephone number storage unit in the computer center, wherein the destination telephone number is preliminarily written to the telephone number storage unit at an instruction from a source subscriber or a destination subscriber.

13. The method according to claim 11, wherein the destination telephone number is written to the telephone number storage unit in the computer center when an online instruction is input by a source subscriber through the at least one of the first computers.

14. The method according to claim 11, wherein the telephone number storage unit comprises a storage unit storing a character string indicating a destination subscriber and a storage unit storing a telephone number corresponding to the character string;

a character string indicating a destination subscriber is input online through the at least one of the first computers;

the agent process unit converts the input character string into a destination telephone number by referring to the telephone number storage unit when a telephone call is issued; and the network control unit issues a call to the destination telephone number.

15. The method according to claim 11, wherein the computer center comprises a telephone number reception unit receiving a telephone number to be stored in the telephone number storage unit from the network control unit; and the agent process unit or another agent process unit preliminarily receives a call through the network control unit and writes the telephone number received by the telephone number reception unit to the telephone number storage unit.

16. The method according to claim 11, wherein a user position monitor unit monitoring a position of a destination subscriber is provided;

the position of the destination subscriber is monitored by the user position monitor unit, and a telephone number available to the destination subscriber is written to the telephone number storage unit.

17. The method according to claim 16, wherein the user position monitor unit writes information indicating a computer being used by a destination subscriber to the telephone number storage unit when the destination subscriber uses the computer, and when the information is written, a call is not issued to a telephone, but communications are established between computers by transferring a packet from the first voice communications unit to a voice communications unit of a computer of a destination subscriber, or by activating, by the first agent process unit, the first voice communications unit in such a way that the first voice communications can communicate with the voice communications unit of the destination subscriber.

18. The method according to claim 11, wherein when two or more computer centers are connected to a computer network, the agent process unit in a first computer center connected to the computer network checks the telephone number storage unit when a connection request is received from a source subscriber, transfers the connection request to a second computer center physically close to an area to which a telephone number of the subscriber belongs, and connects the at least one of the first computers with the voice communications unit in the second computer center.

19. The method according to claim 11, wherein the first voice communications unit and the second voice communications unit transmit and receive animation data as well as voice data.

20. The method according to claim 11, wherein the computer center comprises a plurality of second voice communications units;

the second agent process unit recognizes a type of the first voice communications unit used by the at least one of the first computers according to a notification from the first agent process unit of the at least one of the first computers, selects one of the second voice communications units capable of communicating with the first voice communications unit from among the plurality of second voice communications units, activates the selected second voice communications unit, thereby establishing communications between the activated second voice communications unit with the first voice communications unit of the at least one of the first computers.

21. A method of connecting a call from a computer to a telephone in a system including one or more first computers having a voice communications ability, a computer center including one or more second computers connected to the first computers through a computer network, and one or more telephone terminals connected to the computer center and a telephone network, comprising:

providing, in the first computers, a first voice communications unit for establishing communications between computer networks and a first voice/data conversion unit functionally connected to the first voice communications unit; and providing, in the computer center, one or more second voice communications units for establishing communications between computer networks, a second voice/data conversion unit functionally connected to the second voice communications unit, a first network control unit connected to the second voice/data conversion unit, an agent process unit, a server unit, a telephone number storage unit, and a first data communications interface unit, wherein each of the telephone terminals comprises a second network control unit, a second data communications interface unit, a voice communications interface unit, and a second browser unit;

the second browser unit of the telephone terminal accesses the server unit through the data communications interface unit of the computer center, and issues a specific instruction;

the computer center activates the agent process unit;

the activated agent process unit activates the second voice communications unit in such a way that the second voice communications unit can communicate with the first voice communications unit in at least one of the first computers connected to the computer network, disconnects communications with the telephone terminal, switches a connection to the first network control unit from the first data communications interface unit to the first voice/data conversion unit, and issues a call to the telephone terminal;

communications are disconnected between the telephone terminal and the computer center;

a connection of the second network control unit is switched from the second data communications interface unit to the voice communications interface unit, a call is awaited, and a call from a telephone network is answered; and communications are established between the at least one of the first computers and the telephone terminal.

22. The method according to claim 21, wherein the telephone terminal comprises a third agent process unit;

the browser unit of the telephone terminal accesses the server unit of the computer center through the second data communications interface unit of the telephone terminal and the first data communications interface unit of the computer center, and issues a specific instruction;

the computer center activates the second agent process unit;

the activated second agent process unit activates the second voice communications unit in such a way that the second voice communications unit can communicate with a first voice communications unit in the at least one of the first computers connected to the computer network, the second agent process unit disconnects communications with the telephone terminal, switches a connection to the first network control unit from the first data communications interface unit to the second voice/data conversion unit, issues a call to the telephone terminal, switches a connection to the first network control unit from the voice/data conversion unit to the first data communications interface unit when communications terminates, and issues a call or an acknowledgment answer to the telephone terminal;

the third agent process unit of the telephone terminal disconnects communications with the computer center, switches a connection to the second network control unit from the second data communications interface unit to the voice communications interface unit, answers a call from the computer center, switches a connection to the second network control unit from the voice communications interface unit to the second data communications interface unit when communications terminates, and issues an acknowledgment or a call to the computer center; and communications are established between the at least one of the first computers and the telephone terminal.

23. A method of connecting a call from a computer to a telephone in a system including one or more first computers having a voice communications ability, a computer center including one or more second computers connected to the first computers through a computer network, and one or more telephone terminals connected to the computer center and a telephone network, comprising:

providing a first voice/data conversion unit and a browser unit in each of the first computers; and providing, in the computer center, a second agent process unit, one or more second voice communications units for establishing communications between computer networks, a second voice/data conversion unit functionally connected to the second voice communications unit, a network control unit connected to the second voice/data conversion unit, a server unit, and a telephone number storage unit, wherein the browser unit in at least one of the first computers accesses the server unit, a specific instruction is issued, and the server unit transmits a first agent process unit and a first voice communications unit to the at least one of the first computers;

the first voice communications unit is activated by the first agent process unit in the at least one of the first computers in such a way that the first voice communications unit can communicate with the second voice communications unit;

the second voice communications unit is activated in the computer center by the second agent process unit in such a way that the second voice communications unit can communicate with the first voice communications unit;

the network control unit issues a call to a telephone number stored in the telephone number storage unit; and communications can be established between the at least one of the first computers and the telephone terminal.

24. An apparatus for connecting a computer network to a telephone and having one or more computers connected to a computer network and a telephone network, comprising:

a voice communications unit establishing communications between computer networks;

a voice/data conversion unit, functionally connected to said voice communications unit, converting voice data into a voice signal and vice versa;

a telephone number storage unit storing a destination telephone number;

a network control unit issuing, connecting, and disconnecting a call through a telephone network; and an agent process unit communicating with another agent process unit in another computer of the one or more computers connected to a computer network, activating said voice communications unit when a voice communications connection request is received, and instructing said network control unit to issue a call to a telephone number stored in said telephone number storage unit, wherein said agent process unit manages communication type and communication status and controls said voice communication unit.

25. An apparatus which has one or more computers connected to a computer network and a telephone network, and connects a call from a computer network to a telephone terminal, comprising:

a network control unit issuing, connecting, and disconnecting a call to a telephone network;

a data communications interface unit receiving data or a specific instruction transferred from a telephone terminal capable of communicating data through the network control unit;

a voice communications unit establishing voice communications between computer networks;

a voice/data conversion unit, functionally connected to said voice communications unit, converting voice data into a voice signal and vice versa;

a telephone number storage unit storing a destination telephone number;

an agent process unit activating said voice communications unit in such a way that said voice communications unit can communicate with another computer connected through a computer network, disconnecting communications with a telephone terminal which issued a specific instruction, switching a connection to said network control unit from said data communications interface unit to said voice/data conversion unit, and instructing said network control unit to issue a call to the telephone terminal; and a server unit activating said agent process unit at a specific instruction from said data communications interface unit.

26. A telephone terminal for communicating with a computer connected to a computer network through a computer center connected to a telephone network and a computer network; comprising:
- a data communications interface unit;
- a voice communications interface unit;
- a browser unit accessing a server unit of the computer center through the data communications interface unit, and issuing a specific instruction;
- a network control unit disconnecting communications with the computer center after issuing the specific instruction, switching a connection from said data communications interface unit to said voice communications interface unit, entering a call wait state, and returning an answer in response to an arriving call from a telephone network; and
- an agent process unit switching a connection of said network control unit from said data communications interface unit to said voice communications interface unit after issuing the specific instruction.

* * * * *

UNITED STATES PATENT AND TRADEMARK OFFICE
CERTIFICATE OF CORRECTION

PATENT NO. : 6,339,592 B2
DATED : January 15, 2002
INVENTOR(S) : Nobutsugu Fujino It is certified that error appears in the above-identified patent and that said Letters Patent is hereby corrected as shown below:

Title page,
Item [75], Inventors, change "Fugino" to -- Fujino --

Column 46,
Line 32, insert -- unit -- after "browser";
Line 37, insert -- unit -- after "communications";
Line 39, insert -- , -- after "unit", (first occurrence);
Line 42, insert -- the server -- after "to".

Column 48,
Line 27, insert -- , -- after "networks".

Column 50,
Line 35, insert -- , -- after "status".

Signed and Sealed this

Sixth Day of August, 2002

Attest:

JAMES E. ROGAN
Attesting Officer    Director of the United States Patent and Trademark Office